(12) United States Patent
Sangle et al.

(10) Patent No.: US 11,726,684 B1
(45) Date of Patent: Aug. 15, 2023

(54) CLUSTER REBALANCE USING USER DEFINED RULES

(71) Applicant: Portworx, Inc., Los Altos, CA (US)

(72) Inventors: Ganesh Sangle, Sunnyvale, CA (US); Harsh Desai, San Jose, CA (US); Vinod Jayaraman, San Francisco, CA (US)

(73) Assignee: Pure Storage, Inc., Santa Clara, CA (US)

( * ) Notice: Subject to any disclaimer, the term of this patent is extended or adjusted under 35 U.S.C. 154(b) by 0 days.

(21) Appl. No.: 17/187,340

(22) Filed: Feb. 26, 2021

(51) Int. Cl.
*G06F 3/00* (2006.01)
*G06F 3/06* (2006.01)

(52) U.S. Cl.
CPC .......... *G06F 3/0632* (2013.01); *G06F 3/0604* (2013.01); *G06F 3/067* (2013.01)

(58) Field of Classification Search
CPC ....... G06F 3/0632; G06F 3/0604; G06F 3/067
See application file for complete search history.

(56) References Cited

U.S. PATENT DOCUMENTS

| | | | |
|---|---|---|---|
| 6,718,427 B1 | 4/2004 | Carlson | |
| 6,816,941 B1 | 11/2004 | Carlson | |
| 7,089,395 B2 | 8/2006 | Jacobson | |
| 7,412,583 B2 | 8/2008 | Burton | |
| 7,434,017 B2 | 10/2008 | Maruyama | |
| 7,613,878 B2 | 11/2009 | Mori | |
| 7,617,371 B2 | 11/2009 | Fujimoto | |
| 7,734,888 B1 | 6/2010 | Hamilton | |
| 7,809,917 B2 | 10/2010 | Burton | |
| 7,873,809 B2 | 1/2011 | Kano | |
| 7,945,748 B2 | 5/2011 | Shibayama | |
| 8,055,723 B2 | 11/2011 | Acedo | |
| 8,086,808 B2 | 12/2011 | Ichikawa | |
| 8,225,057 B1 | 7/2012 | Zheng | |
| 8,230,069 B2 | 7/2012 | Korupolu | |
| 8,250,327 B2 | 8/2012 | Fuji | |
| 8,291,159 B2 | 10/2012 | Rajagopal | |
| 8,489,845 B2 | 7/2013 | Ozaki | |
| 8,495,331 B2 | 7/2013 | Matsumoto | |
| 8,516,215 B2 | 8/2013 | Satoyama et al. | |
| 8,539,194 B2 | 9/2013 | Inoue | |
| 8,612,679 B2 | 12/2013 | Schnapp | |
| 8,612,776 B2 | 12/2013 | Hakamata | |
| 8,745,354 B2 | 6/2014 | Mori | |
| 8,769,235 B2 | 7/2014 | Satoyama | |
| 8,775,730 B2 | 7/2014 | Inoue | |
| 8,862,833 B2 | 10/2014 | Noll | |
| 8,863,139 B2 | 10/2014 | Kakeda | |
| 8,880,810 B2 | 11/2014 | Yamamoto | |
| 9,182,926 B2 | 11/2015 | Naganuma | |
| 9,201,607 B2 | 12/2015 | Satoyama | |
| 9,229,860 B2 | 1/2016 | Matsuzawa | |

(Continued)

*Primary Examiner* — Craig S Goldschmidt

(74) *Attorney, Agent, or Firm* — ALG Intellectual Property, LLC

(57) ABSTRACT

Distributed storage systems are implemented with rule based rebalancing mechanisms. Methods includes steps for creating a set of rules for rebalancing data storage space in a storage node cluster, as well as steps for performing a rebalance operation across the storage node cluster using the set of rules. The distributed storage systems include one or more labels for storage pools and storage volumes.

20 Claims, 26 Drawing Sheets

(56) References Cited

U.S. PATENT DOCUMENTS

| | | |
|---|---|---|
| 9,237,131 B2 | 1/2016 | Nahum |
| 9,569,245 B2 | 2/2017 | Iwamatsu |
| 9,747,036 B2 | 8/2017 | Maki |
| 9,760,290 B2 | 9/2017 | Jayaraman |
| 9,760,294 B2 | 9/2017 | Miwa |
| 10,365,980 B1 | 7/2019 | Bromling |
| 10,452,293 B2 | 10/2019 | Yamamoto |
| 10,503,441 B2 | 12/2019 | Israni et al. |
| 10,564,870 B1 | 2/2020 | Greenwood |
| 10,594,571 B2 | 3/2020 | Dippenaar |
| 10,628,088 B2 | 4/2020 | Matsushita |
| 10,628,200 B2 | 4/2020 | Hadas |
| 10,664,182 B2 | 5/2020 | Oohira |
| 10,949,125 B2 | 3/2021 | Liguori |
| 10,956,063 B2 | 3/2021 | Yamamoto et al. |
| 2002/0103889 A1 | 8/2002 | Markson |
| 2003/0069974 A1* | 4/2003 | Lu ................. H04L 67/1001 718/105 |
| 2004/0068611 A1 | 4/2004 | Jacobson |
| 2006/0107016 A1 | 5/2006 | Murotani |
| 2006/0107017 A1 | 5/2006 | Serizawa |
| 2006/0282641 A1 | 12/2006 | Fujimoto |
| 2007/0233987 A1 | 10/2007 | Maruyama |
| 2007/0233992 A1 | 10/2007 | Sato |
| 2008/0028143 A1 | 1/2008 | Murase |
| 2008/0222376 A1 | 9/2008 | Burton |
| 2009/0150639 A1 | 6/2009 | Ohata |
| 2009/0228589 A1 | 9/2009 | Korupolu |
| 2009/0240880 A1 | 9/2009 | Kawaguchi |
| 2009/0254636 A1 | 10/2009 | Acedo |
| 2010/0011185 A1 | 1/2010 | Inoue |
| 2010/0017577 A1 | 1/2010 | Fujimoto |
| 2010/0082900 A1 | 4/2010 | Murayama |
| 2010/0100604 A1 | 4/2010 | Fujiwara |
| 2010/0332882 A1 | 12/2010 | Nayak |
| 2011/0060885 A1 | 3/2011 | Satoyama |
| 2011/0066823 A1 | 3/2011 | Ando |
| 2011/0161406 A1 | 6/2011 | Kakeda |
| 2011/0179247 A1* | 7/2011 | Mine ..................... G06F 3/0685 711/171 |
| 2011/0185135 A1 | 7/2011 | Fuji |
| 2011/0185139 A1 | 7/2011 | Inoue |
| 2011/0191537 A1 | 8/2011 | Kawaguchi |
| 2011/0252214 A1 | 10/2011 | Naganuma |
| 2011/0264868 A1 | 10/2011 | Takata |
| 2011/0276772 A1 | 11/2011 | Ohata |
| 2012/0166751 A1 | 6/2012 | Matsumoto |
| 2012/0173838 A1 | 7/2012 | Noll |
| 2012/0226885 A1 | 9/2012 | Mori |
| 2012/0290714 A1* | 11/2012 | Cohen ................. G06F 11/3055 709/224 |
| 2012/0311260 A1 | 12/2012 | Yamagiwa |
| 2013/0055262 A1* | 2/2013 | Lubsey ............... G06F 9/45558 718/1 |
| 2013/0117448 A1 | 5/2013 | Nahum |
| 2014/0006726 A1 | 1/2014 | Yamamoto |
| 2014/0281339 A1 | 9/2014 | Satoyama |
| 2014/0372723 A1 | 12/2014 | Bobroff |
| 2015/0149605 A1* | 5/2015 | de la Iglesia ......... G06F 3/0617 709/223 |
| 2015/0193154 A1* | 7/2015 | Gong .................... G06F 3/0608 711/103 |
| 2015/0277955 A1 | 10/2015 | Iwamatsu |
| 2015/0331793 A1 | 11/2015 | Matsuzawa |
| 2016/0004476 A1 | 1/2016 | Emaru |
| 2016/0092132 A1 | 3/2016 | Hildebrand |
| 2016/0094410 A1 | 3/2016 | Anwar |
| 2016/0098323 A1* | 4/2016 | Mutha ..................... G06F 3/067 707/654 |
| 2016/0253114 A1 | 9/2016 | Deguchi |
| 2016/0371145 A1* | 12/2016 | Akutsu ............. H03M 13/2906 |
| 2017/0090774 A1 | 8/2017 | Dambal |
| 2017/0220282 A1 | 8/2017 | Dambal |
| 2017/0222890 A1 | 8/2017 | Dippenaar |
| 2017/0308316 A1 | 10/2017 | Yamamoto et al. |
| 2017/0359221 A1 | 12/2017 | Hori |
| 2018/0004447 A1 | 1/2018 | Oohira |
| 2018/0054477 A1* | 2/2018 | Chivukula .......... H04L 67/1008 |
| 2019/0129740 A1 | 5/2019 | Hadas |
| 2019/0266022 A1 | 8/2019 | Israni et al. |
| 2019/0272222 A1 | 9/2019 | Wei |
| 2020/0042213 A1 | 2/2020 | Yamamoto |
| 2020/0073552 A1 | 3/2020 | Sangle |
| 2020/0104151 A1 | 4/2020 | Shibayama |
| 2020/0174672 A1* | 6/2020 | Agetsuma ............. G06F 3/0634 |
| 2020/0264956 A1 | 8/2020 | Thomas |
| 2020/0409600 A1 | 12/2020 | Liguori |

* cited by examiner

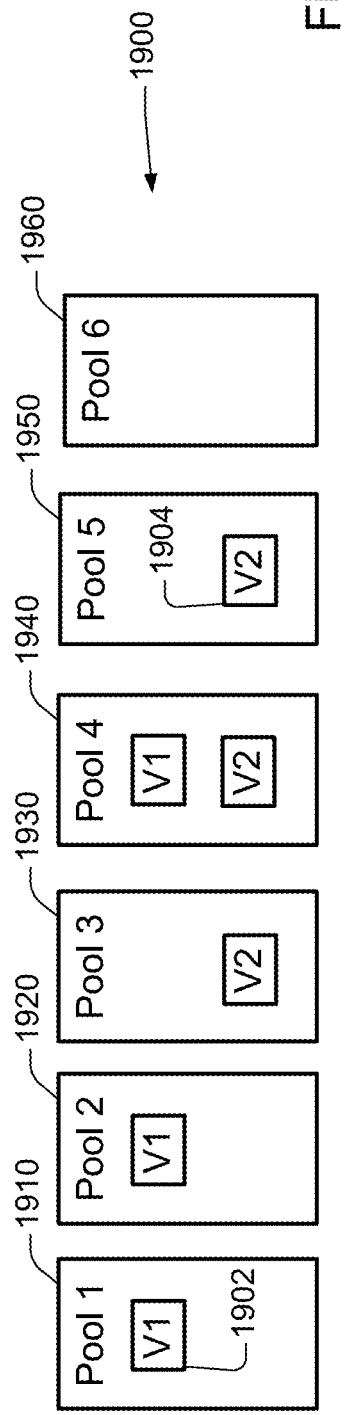
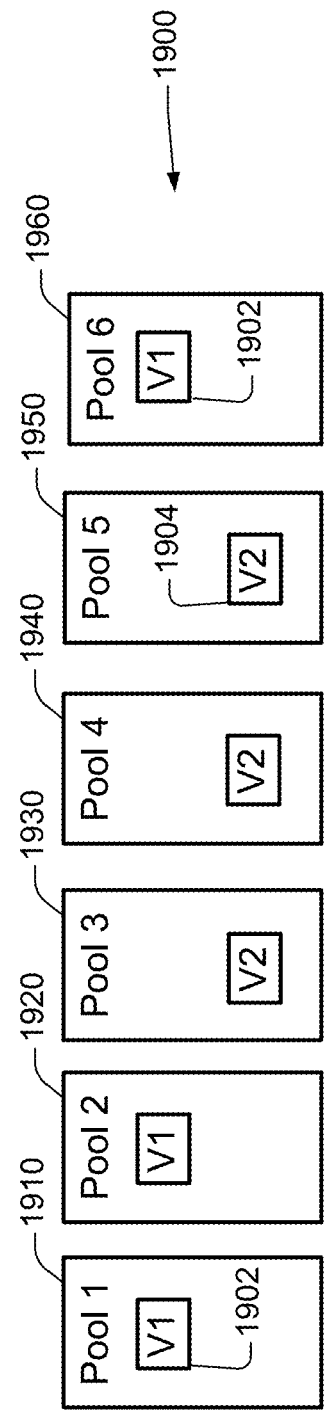

CLUSTER REBALANCE USING USER DEFINED RULES

TECHNICAL FIELD

The present disclosure relates generally to containerized applications and more specifically to containerized scalable storage applications.

BACKGROUND

One of the most difficult challenges facing software developers is interoperability of software between different computing environments. Software written to run in one operating system typically will not run without modification in a different operating system. Even within the same operating system, a program may rely on other programs in order to function. Each of these dependencies may or may not be available on any given system, or may be available but in a version different from the version originally relied upon. Thus, dependency relationships further complicate efforts to create software capable of running in different environments.

In recent years, the introduction of operating-system-level virtualization has facilitated the development of containerized software applications. A system configured with operating-system-level virtualization includes a container engine that operates on top of the operating system. Importantly, the container engine is configured to operate interchangeably in different environments (e.g., with different operating systems). At the same time, the container engine is configured to present a standardized interface to one or more software containers.

Each software container may include computer programming code for performing one or more tasks. Examples of software containers include web servers, email servers, web applications, and other such programs. Each software container may include some or all of the software resources that the software in the container needs in order to function. For example, if a software container includes a web application written in the Python programming language, the software container may also include the Python programming language modules that the web application relies upon. In this way, the software container may be installed and may execute successfully in different computing environments as long as the environment includes a container engine. However, the implementation of such software containers in distributed contexts remains limited.

In many distributed systems, data storage becomes unbalanced over time. This can happen due to many factors, such as over provisioning, volume migration, or adding/removing of storage nodes. Unbalanced storage node clusters can lead to inefficient storage and I/O processing. In addition, many applications today have so many and/or specific requirements that exacerbate unbalancing. Thus, there exists a need for a mechanism to rebalance unbalanced storage node clusters.

SUMMARY

The following presents a simplified summary of the disclosure in order to provide a basic understanding of certain embodiments of the disclosure. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

Various embodiments of the present disclosure relate generally to devices, systems, non-transitory computer readable media, and methods for rebalancing storage in a distributed storage system. The method includes creating a set of rules for rebalancing data storage space in a storage node cluster. The storage node cluster includes a plurality of storage nodes. Each storage node includes one or more storage devices organized into one or more storage pools having storage space allocated for storing data associated with one or more storage volumes. The set of rules includes one or more trigger thresholds. The method also includes determining whether data storage space needs to be rebalanced based on the one or more trigger thresholds. Based on a determination that the data storage space needs to be rebalanced, the method concludes with performing a rebalance operation across the storage node cluster.

In some embodiments, the trigger thresholds are user defined. In some embodiments, the rebalance operation includes selecting from user identified pools or using all pools in the cluster by default. In some embodiments, the rebalance operation includes selecting a set of candidate pools for rebalance, wherein each storage pool in the set of candidate pools is initially marked as "candidate none".

In some embodiments, determining whether data storage space needs to be rebalanced includes: finishing any pending work on all pools; determining a set of candidate pools; calculating a metric mean value for each of a plurality of metrics if a trigger threshold type is delta percent; and for each candidate pool: evaluating a current metric value for each of the plurality of metrics, marking the candidate pool as a candidate source pool if a current metric value is over a source trigger threshold, and marking the candidate pool as a candidate target pool if a current metric value is under a target trigger threshold.

In some embodiments, performing the rebalance operation includes: for each candidate source pool: discovering and sorting allocated volumes on the candidate source pool; nominating a closest fit volume based on how much allocation needs to be moved; and finding an appropriate destination pool to move the closest fit volume. In such embodiments, finding the appropriate destination pool includes: checking volume provisioning rules to see if the closest fit volume can even be moved; checking to see if moving the closest fit volume would keep the candidate source pool within trigger thresholds; and moving the closest fit volume if the volume provisioning rules and the trigger thresholds allow the closest fit volume to be moved.

In some embodiments, performing the rebalance operation includes: for each candidate target pool: finding an appropriate donor pool by finding a closest fit volume that can be moved to the candidate target pool; and moving the closest fit volume from the appropriate donor pool to the candidate target pool if volume provisioning rules and trigger thresholds allow the closest fit volume to be moved. In some embodiments, during the rebalance operation, if a storage pool has a volume moved from or into the storage pool, then the storage pool is subsequently marked as used such that the storage pool cannot be reused during the rest of the rebalance operation. In some embodiments, the one or more trigger thresholds are based on a used size metric or a provisioned size metric. In some embodiments, the rebalance operation includes an internal loop operation that continuously moves volumes from one storage pool to another until it is determined that the data storage space no longer needs to be rebalanced.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

FIGS. 19A-19B illustrate rebalancing in a cluster, configured in accordance with one or more embodiments.

DESCRIPTION OF EXAMPLE EMBODIMENTS

Figure 1:
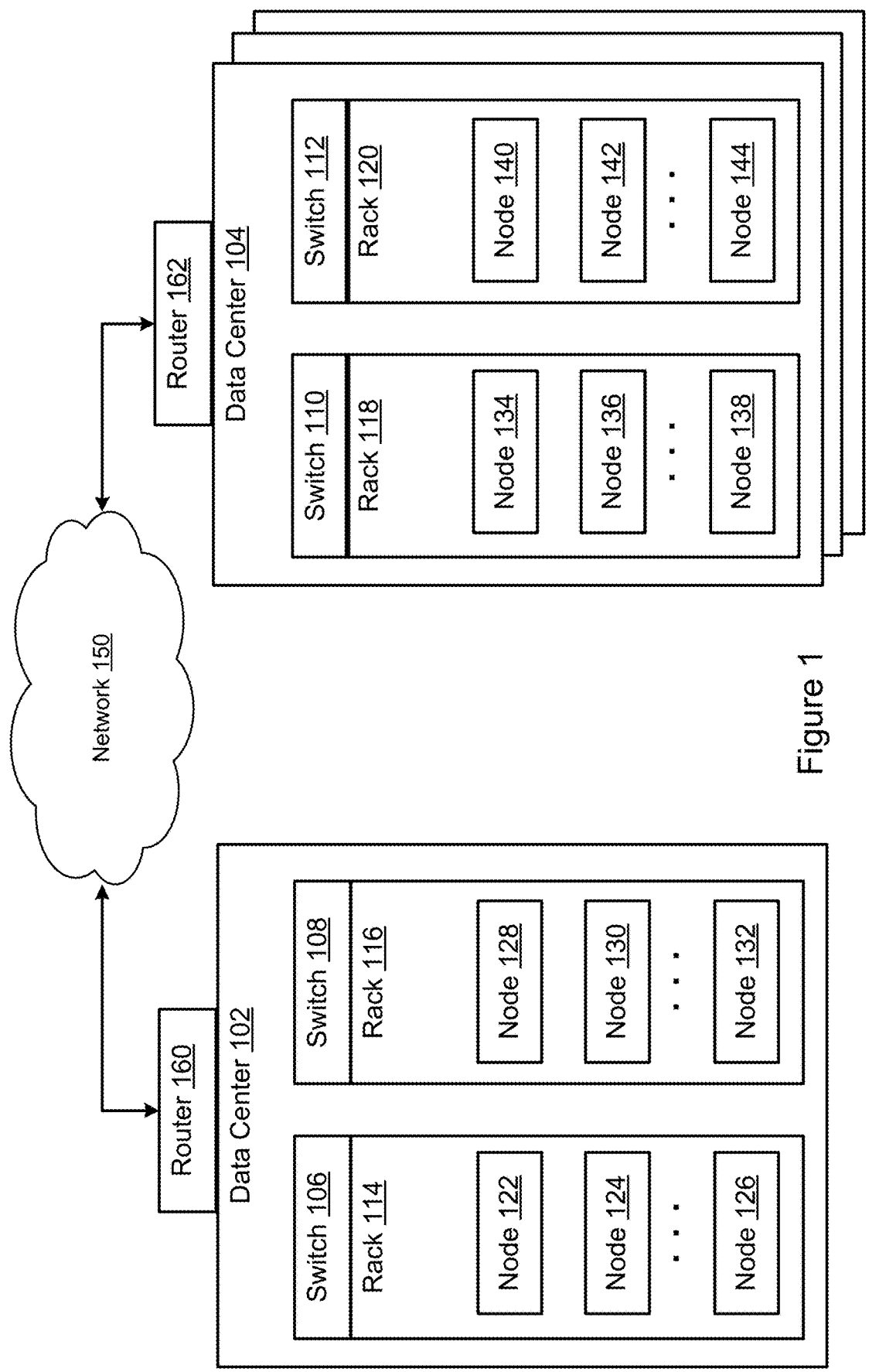
FIG. 1 illustrates an example of an arrangement of components in a containerized storage system, configured in accordance with one or more embodiments.

Reference will now be made in detail to some specific examples of the present disclosure including the best modes for carrying out embodiments of the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

For example, the techniques of the present disclosure will be described in the context of fragments, particular servers and encoding mechanisms. However, it should be noted that the techniques of the present disclosure apply to a wide variety of different fragments, segments, servers and encoding mechanisms. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted. As used herein, the term "drive" and "disk" are used interchangeably.

Overview

Techniques and mechanisms described herein provide for rule based rebalancing of storage nodes in a storage node cluster. The system evaluates pools or nodes with reference to certain metrics and applies a set of rules for determining when to rebalance storage nodes in a cluster. The set of rules includes trigger thresholds which dictate when a rebalance operation is to be performed. Nodes/pools are evaluated as candidates for rebalance based on current metrics in relation to trigger thresholds.

EXAMPLE EMBODIMENTS

Techniques and mechanisms described herein may facilitate the configuration of a scalable storage container node system. In some embodiments, a scalable storage container node system may allow application containers in a virtualized application system to quickly and directly provision and scale storage. Further, the system may be configured to provide one or more user experience guarantees across classes of applications.

According to various embodiments, the system may pool the capacity of different services into virtual storage volumes and auto-allocate storage as application storage traffic scales or bursts. For instance, a single virtual storage volume may include hundreds or thousands of terabytes of storage space aggregated across many different storage devices located on many different physical machines.

In some embodiments, storage containers may communicate directly with server resources such as hardware storage devices, thus reducing or eliminating unnecessary virtualization overhead. Storage containers may be configured for implementation in a variety of environments, including both local computing environments and cloud computing environments.

In some implementations, storage volumes created according to the techniques and mechanisms described herein may be highly failure-tolerant. For example, a virtual storage volume may include data stored on potentially many different storage nodes. A storage node may fail for any of various reasons, such as hardware failure, network failure, software failure, or server maintenance. Data integrity may be maintained even if one or more nodes that make up a storage volume fail during data storage operations.

In some embodiments, a distributed system is heterogeneous. In such embodiments, this means that each node has different characteristics when it comes to the CPU, memory, and storage disks/devices. For example, a disk can be a solid-state drive (SSD), magnetic, non-volatile memory express (NVME), or other form of non-volatile memory. Currently, when creating virtual volumes to be used for containers, users are unable to describe the requirements for volume provisioning and how the replicas are placed for high-availability. For example, virtual volumes for a database application require fast storage, e.g. NVME, while backup applications may require slow disks. The goal of volume provisioning is to select the appropriate storage pools that will host data for a volume.

According to various embodiments, in cases of high-availability systems, the placement of the replicas for the virtual volumes may determine the actual availability, since each cluster can have its own organization of failure domains. For example, a cluster in a public cloud provider application can define failure domains over zones, whereas a private datacenter application may have failure domains as racks. Given such varied organizations, it may be difficult to describe the high availability requirements for different types of applications, e.g., placing replicas in different racks or placing replicas in different racks within the same enclosure. In addition, with current practices and technology, there is no way for applications to consider replicas of other applications when deciding where to provision one of its replicas. However, applications become more advanced, there may be advantages to having a preference, or even a requirement, for provisioning a potential replica relative to replicas of other applications that are different from the potential replica's associated application. Thus, techniques and mechanisms of the present disclosure provide a solution using labels and a rule based language.

According to various embodiments, storage pools include one or more labels. In such embodiments, the labels allow for rules to be defined. In such embodiments, these rules can be used to select appropriate storage pools for provisioning. Because applications can have many different requirements and performance standards, rule-based provisioning is an improvement over standard distributed systems where data is simply striped across all nodes in a cluster. In addition, because large distributed systems are less likely to be completely homogenous, i.e., having storage devices of all the same type and capacity, rule-based provisioning can provide higher availability and application aware performance efficiencies.

According to various embodiments, as storage pools become used, storage nodes can become unbalanced. In some embodiments, certain events and conditions, such as adding new nodes or removing volumes, trigger a need to rebalance storage across the storage node cluster. In some embodiments, metrics are continuously or periodically evaluated or measured to assess the state of storage pools. If metrics rise above or fall below certain thresholds, a rebalance operation is triggered based off of trigger threshold rules. In some embodiments, trigger threshold rules are user defined.

FIG. 1 illustrates an arrangement of components in a containerized storage system. As will be discussed in greater detail below, such an arrangement of components may be configured such that clustered data storage is implemented, and copies of data stored at a particular storage container node within the cluster may be propagated amongst various other storage container nodes such that multiple copies of the data are available in case one of the storage container nodes fails. In various embodiments, and as will be discussed in greater detail below, one or more constraints may be implemented when determining which nodes to use during clustered data storage.

Accordingly, in various embodiments, nodes may be implemented in various data centers, such as data center 102 and data center 104. As similarly discussed above, a data center may include networked computing devices that may be configured to implement various containerized applications, such as storage nodes discussed in greater detail below. In various embodiments, such data centers and storage nodes may be configured to implement clustered storage of data. As discussed in greater detail below, the clustered storage of data may utilize one or more storage container nodes that are collectively configured to aggregate and abstract storage resources for the purpose of performing storage-related operations. Accordingly, data centers, such as data center 102 and data center 104 may each include various nodes underlying data clusters which may be implemented within a data center or across multiple data centers.

As discussed above, the data centers may include various nodes. For example, data center 102 may include node 122, node 124, node 126, node 128, node 130, and node 132. Moreover, data center may include additional nodes, such as node 134, node 136, node 138, node 140, node 142, and node 144. Such nodes may be physical nodes underlying storage nodes and storage volumes discussed in greater detail below. As shown in FIG. 1, nodes may be included in racks, such as rack 114, rack 116, rack 118, and rack 120. In various embodiments, each rack may be coupled with a switch, such as switch 106, switch 108, switch 110, and switch 112. Such switches may manage the flow of data amongst nodes within a particular rack.

Data centers and components within data centers, such as racks including nodes and their associated switches, may be coupled with routers, such as router 160 and router 162. In various embodiments, such routers may manage the flow of data between data centers and other components that may be coupled with a network, such as network 150. In some embodiments, network 150 may be, at least in part, a local network, or may be a global network such as the internet. Accordingly, network 150 may include numerous components and communications pathways that couple data centers with each other.

Figure 2:
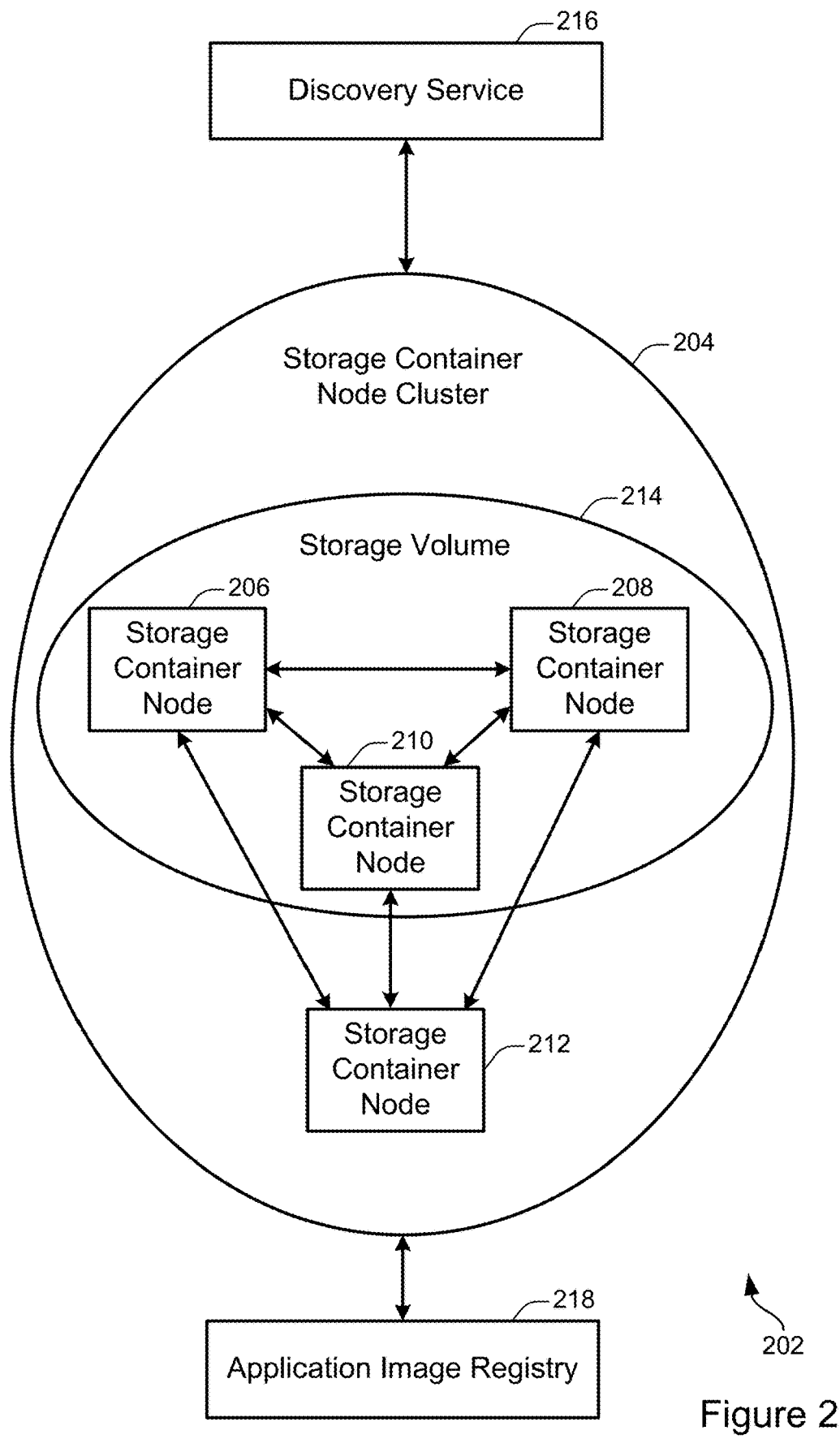
FIG. 2 illustrates an example of a scalable storage container node system, configured in accordance with one or more embodiments.

FIG. 2 illustrates an example of a scalable storage container node system 202. In some embodiments, the scalable storage container node system 202 may be capable of providing storage operations within the context of one or more servers configured to implement a container system. The scalable storage container node system 202 includes a storage container node cluster 204, which includes storage container nodes 206, 208, 210, and 212. The storage container nodes 206, 208, and 210 are combined to form a storage volume 214. The scalable storage container node system 202 also includes a discovery service 216 and an application image layer registry 218.

At 204, the storage container node cluster 204 is shown. According to various embodiments, a storage container node cluster may include one or more storage container nodes collectively configured to aggregate and abstract storage resources for the purpose of performing storage-related operations. Although the scalable storage container node system 202 shows only a single storage container node cluster, implementations of the techniques discussed herein may frequently include thousands or millions of storage container node clusters in a scalable storage container node system.

At 206, 208, 210, and 212, storage container nodes are shown. A storage container node may be configured as discussed with respect to the storage container node system 202 shown in FIG. 2 or may be arranged in a different configuration. Each storage container node may include one or more privileged storage container such as the privileged storage container 316 shown in FIG. 3.

According to various embodiments, storage container nodes may be configured to aggregate storage resources to create a storage volume that spans more than one storage container node. By creating such a storage volume, storage resources such as physical disk drives that are located at different physical servers may be combined to create a virtual volume that spans more than one physical server.

The storage volume may be used for any suitable storage operations by other applications. For example, the containers 210, 212, and/or 214 shown in FIG. 2 may use the storage volume for storing or retrieving data. As another example, other applications that do not exist as containers may use the storage volume for storage operations.

In some implementations, the storage volume may be accessible to an application through a container engine, as discussed with respect to FIG. 2. For instance, a privileged storage container located at the storage container node 206 may receive a request to perform a storage operation on a storage volume that spans multiple storage nodes, such as the nodes 206, 208, 210, and 212 shown in FIG. 2. The privileged storage container may then coordinate communication as necessary among the other storage container nodes in the cluster and/or the discovery service 216 to execute the storage request.

At 214, a storage volume is shown. According to various embodiments, a storage volume may act as a logical storage device for storing and retrieving data. The storage volume 214 includes the storage container nodes 206, 208, and 210. However, storage volumes may be configured to include various numbers of storage container nodes. A storage volume may aggregate storage resources available on its constituent nodes. For example, if each of the storage container nodes 206, 208, and 210 include 2 terabytes of physical data storage, then the storage volume 214 may be configured to include or use up to 6 terabytes of physical data storage.

In some implementations, a storage volume may provide access to data storage for one or more applications. For example, a software application running on any of storage container nodes 206-212 may store data to and/or retrieve data from the storage volume 214. As another example, the storage volume 214 may be used to store data for an application running on a server not shown in FIG. 2.

At 216, a discovery service is shown. According to various embodiments, the discovery service may be configured to coordinate one or more activities involving storage container node clusters and/or storage container nodes. For example, the discovery service may be configured to initialize a new storage container node cluster, destroy an existing storage container node cluster, add or remove a storage container node from a storage container node cluster, identify which node or nodes in a storage container node cluster are associated with a designated storage volume, and/or identify the capacity of a designated storage volume.

In some implementations, a discovery service may be configured to add a storage container node to a storage container node cluster. An example of such a method is described in additional detail with respect to FIG. 4. In some implementations, a discovery service may be configured to facilitate the execution of a storage request.

According to various embodiments, the discovery service may be configured in any way suitable for performing coordination activities. For instance, the discovery service may be implemented as a distributed database divided among a number of different discovery service node. The discovery service may include a metadata server that store information such as which storage container nodes correspond to which storage container node clusters and/or which data is stored on which storage container node. Alternately, or additionally, the metadata server may store information such as which storage container nodes are included in a storage volume.

Figure 3:
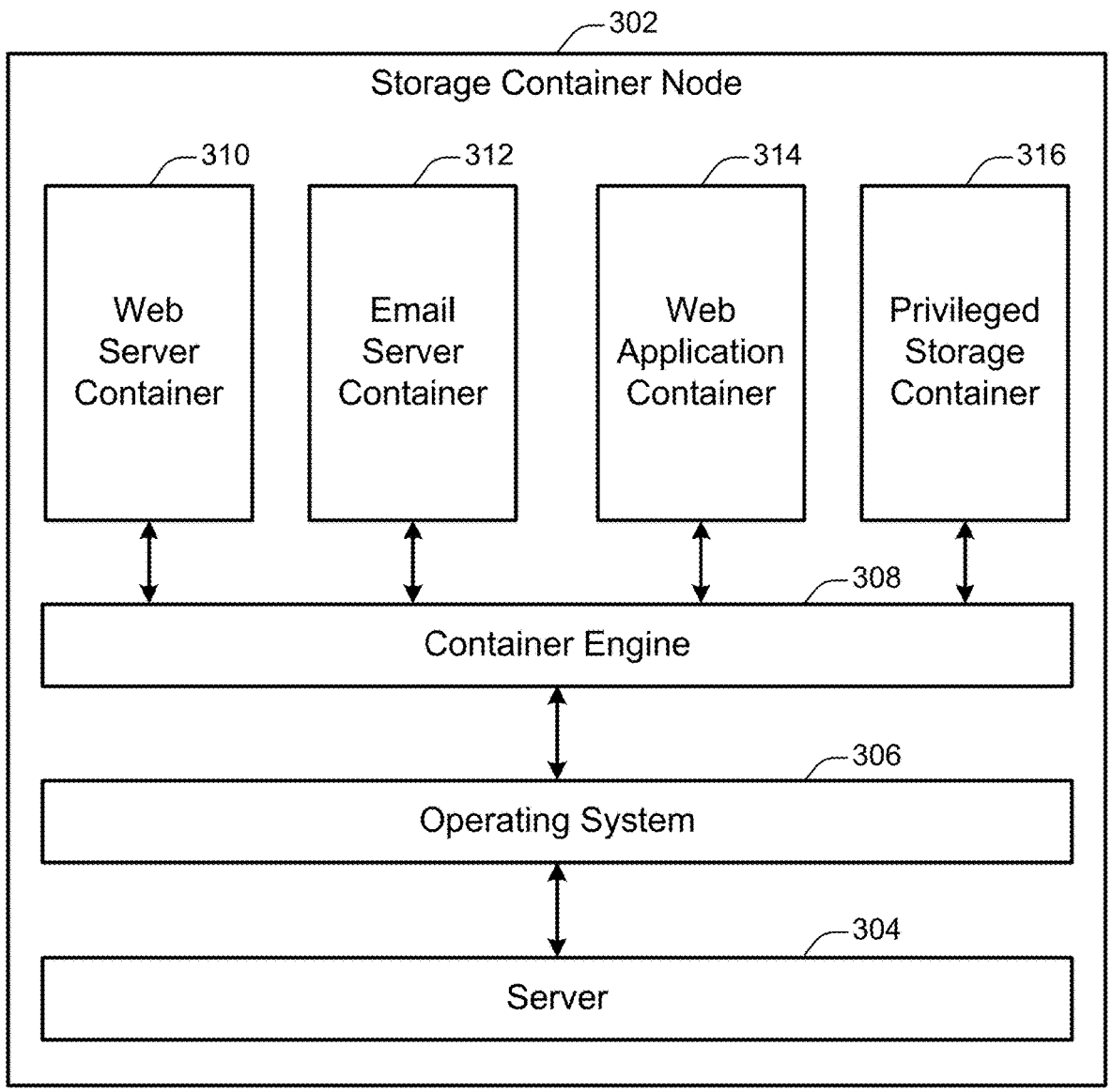
FIG. 3 illustrates an example of a storage container node, configured in accordance with one or more embodiments.

FIG. 3 illustrates an example of a storage container node 302. According to various embodiments, a storage container node may be a server configured to include a container engine and a privileged storage container. The storage container node 302 shown in FIG. 3 includes a server layer 304, an operating system layer 306, a container engine 308, a web server container 310, an email server container 312, a web application container 314, and a privileged storage container 316.

In some embodiments, the storage container node 302 may serve as an interface between storage resources available at a server instance and one or more virtual storage volumes that span more than one physical and/or virtual server. For example, the storage container node 302 may be implemented on a server that has access to a storage device. At the same time, a different storage container node may be implemented on a different server that has access to a different storage device. The two storage nodes may communicate to aggregate the physical capacity of the different storage devices into a single virtual storage volume. The single virtual storage volume may then be accessed and addressed as a unit by applications running on the two storage nodes or at on another system.

At 304, the server layer is shown. According to various embodiments, the server layer may function as an interface by which the operating system 306 interacts with the server on which the storage container node 302 is implemented. A storage container node may be implemented on a virtual or physical server. For example, the storage container node 302 may be implemented at least in part on the server shown in FIG. 5. The server may include hardware such as networking components, memory, physical storage devices, and other such infrastructure. The operating system layer 306 may communicate with these devices through a standardized interface provided by the server layer 304.

At 306, the operating system layer is shown. According to various embodiments, different computing environments may employ different operating system layers. For instance, a physical or virtual server environment may include an operating system based on Microsoft Windows, Linux, or Apple's OS X. The operating system layer 306 may provide, among other functionality, a standardized interface for communicating with the server layer 304.

At 308, a container engine layer is shown. According to various embodiments, the container layer may provide a common set of interfaces for implementing container applications. For example, the container layer may provide application programming interfaces (APIs) for tasks related to storage, networking, resource management, or other such computing tasks. The container layer may abstract these computing tasks from the operating system. A container engine may also be referred to as a hypervisor, a virtualization layer, or an operating-system-virtualization layer.

In some implementations, the separation of the computing environment into a server layer 304, an operating system layer 306, and a container engine layer 308 may facilitate greater interoperability between software applications and greater flexibility in configuring computing environments. For example, the same software container may be used in different computing environments, such as computing environments configured with different operating systems on different physical or virtual servers.

At storage container node may include one or more software containers. For example, the storage container node 302 includes the web server container 220, the email server container 312, and the web application container 314. A software container may include customized computer code configured to perform any of various tasks. For instance, the web server container 220 may provide files such as webpages to client machines upon request. The email server 312 may handle the receipt and transmission of emails as well as requests by client devices to access those emails. The web application container 314 may be configured to execute any type of web application, such as an instant messaging service, an online auction, a wiki, or a webmail service. Although that storage container node 302 shown in FIG. 3 includes three software containers, other storage container nodes may include various numbers and types of software containers.

At 316, a privileged storage container is shown. According to various embodiments, the privileged storage container may be configured to facilitate communications with other storage container nodes to provide one or more virtual storage volumes. A virtual storage volume may serve as a resource for storing or retrieving data. The virtual storage volume may be accessed by any of the software containers 220, 312, and 314 or other software containers located in different computing environments. For example, a software container may transmit a storage request to the container engine 308 via a standardized interface. The container engine 308 may transmit the storage request to the privileged storage container 316. The privileged storage container 316 may then communicate with privileged storage containers located on other storage container nodes and/or may communicate with hardware resources located at the storage container node 302 to execute the request.

In some implementations, one or more software containers may be afforded limited permissions in the computing environment in which they are located. For example, in order to facilitate a containerized software environment, the software containers 310, 312, and 314 may be restricted to communicating directly only with the container engine 308 via a standardized interface. The container engine 308 may then be responsible for relaying communications as necessary to other software containers and/or the operating system layer 306.

In some implementations, the privileged storage container 316 may be afforded additional privileges beyond those afforded to ordinary software containers. For example, the privileged storage container 316 may be allowed to communicate directly with the operating system layer 306, the server layer 304, and/or one or more physical hardware components such as physical storage devices. Providing the storage container 316 with expanded privileges may facilitate efficient storage operations such as storing, retrieving, and indexing data.

Figure 4:
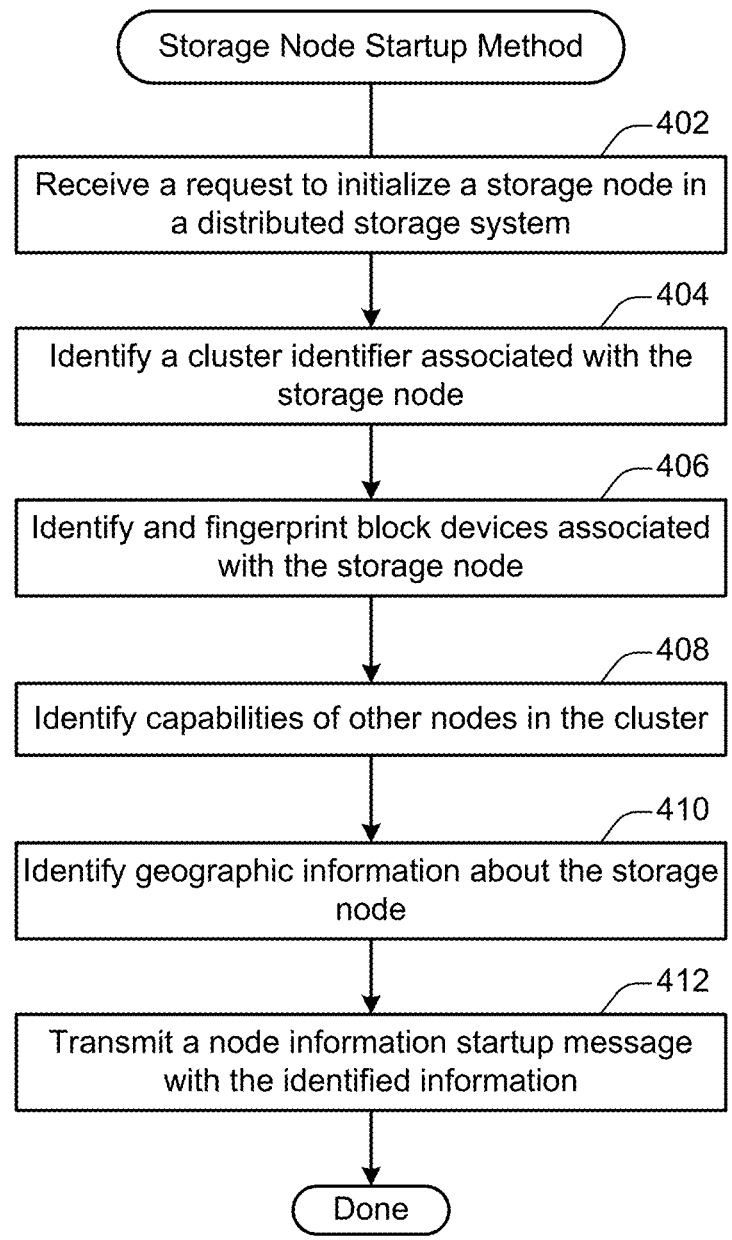
FIG. 4 illustrates a flow chart of an example of a method for starting up a storage node, configured in accordance with one or more embodiments.

FIG. 4 illustrates a flow chart of an example of a method for starting up a storage node. Accordingly, a method, such as method 400, may be implemented to initialize a storage node when that node joins a cluster and becomes available to implement data storage operations. As will be discussed in greater detail below, such an initialization process may include the identification of data associated with various other nodes in the cluster, and such data may be used to generate a cluster hierarchy.

At 402, a request to initialize a storage node in a distributed storage system may be received. According to various embodiments, the request to initialize a new storage container node may be generated when a storage container node is activated. For instance, an administrator or configuration program may install a storage container on a server instance that includes a container engine to create a new storage container node. In various embodiments, the storage node may be included in a distributed storage system. In one example, the distributed storage system may implement storage nodes in clusters. Accordingly, the administrator or configuration program may provide a cluster identifier indicating a cluster to which the storage container node should be added. The storage container node may then communicate with the discovery service to complete the initialization.

At 404, a cluster identifier associated with the storage node may be identified. According to various embodiments, as similarly discussed above, the cluster identifier may be included with the received request. Alternately, or additionally, a cluster identifier may be identified in another way, such as by consulting a configuration file. Accordingly, the cluster identifier may be identified and retrieved based on the request, a configuration file, or from any other suitable source.

At 406, block devices associated with the storage node may be identified. In various embodiments, the block devices may be devices used to store storage volumes in a storage node. Accordingly, a particular storage node may be associated with several block devices. In various embodiments, the block devices associated with the storage node being initialized may be identified based on an input provided by the administrator, or based on a configuration file. In one example, such a configuration file may be retrieved from another node in the identified cluster.

Moreover, the identified block devices may be fingerprinted. In various embodiments, the fingerprinting may identify capabilities of various storage devices, such as drives, that may be utilized by the block devices and/or accessible to the storage node. Such storage devices may be solid state drives (SSDs), solid state hybrid drives (SSHDs), or hard disk drives (HDDs). Types of connections with such storage devices may also be identified. Examples of such connections may be any suitable version of SATA, PATA, USB, PCI, or PCIe. In some embodiments, an input/output (I/O) speed may be inferred based on the device type and connection type. In this way, it may be determined how many storage devices are available to the storage node, how much available space they have, and what type of storage devices they are, as well as how they are connected.

As discussed above, fingerprinting data may include information about underlying physical devices, such as device capacity, I/O speeds and characteristics, as well as throughput and latency characteristics. In various embodiments, such fingerprinting data may be generated based on benchmarking tools that may be implemented and run dynamically, or may have been run previously, and had results stored in a metadata server. In some embodiments, such fingerprinting data may be retrieved from a location in the cloud environment, such as the metadata server or an API server, and such data may be retrieved during the startup process. In various embodiments, such data may be retrieved from a remote location that may include technical specifications or characteristics of the underlying physical devices which may have been determined by a component manufacturer.

At 408, capabilities of other nodes in the cluster may be identified. As discussed above, such capabilities of the other nodes may identify how many storage devices are available to those storage nodes, how much available space they have, and what type of storage devices they are, as well as how they are connected. In various embodiments, capabilities of the other nodes may be one or more performance characteristics, such as I/O capabilities and speeds. Such capabilities may be determined based on devices types of underlying physical devices. For example, a particular type of device may be identified, such as SSDs, and a particular I/O speed may be identified based on the identified device type. As discussed above, capabilities may also be other characteristics of the nodes, such as a storage capacity of the node, which may be determined based on available storage in one or more underlying physical devices. It will be appreciated that storage capacity may refer to total and/or free capacity of a particular storage node, a particular storage device, and/or a particular storage volume. In various embodiments, such capabilities may be determined based on data included in a configuration file which may be propagated among nodes in the cluster. In some embodiments, the identified capabilities and other information are available as labels, as described later in the application.

At 410, geographic information about the storage node may be identified. In various embodiments, the geographic information may be particular geographical characteristics of a physical location of the storage node. For example, such geographic information may include a first identifier that identifies a rack, or other physical device unit, in which the storage node is located. The geographic information may also include a second identifier that identifies a zone, which may be a particular data center. The geographic information may further include a third identifier that identifies a region or geographical area in which the storage node is located. In various embodiments, such geographic information may be stored at each node, and may be determined based on a query issued to a metadata server. Accordingly, the query to the metadata server may be used by the metadata server to determine geographic information, and such geographic information may be provided to the storage node where it is maintained. In some embodiments, a scheduler may be implemented to maintain such geographic information. In various embodiments, geographic regions may be defined by an entity, such as an administrator, or based upon one or more designated regions, such as a time zone or other designated region such as "Eastern U.S.". While examples of a first, second, and third identifier have been described, any suitable number of identifiers may be used.

At 412, a node information startup message may be transmitted. In various embodiments, the node information startup message may include the identified information. Accordingly, the previously described information may be included in a message and may be transmitted to one or more other nodes in the cluster. In this way, the information associated with the storage node that has been initialized may be propagated to other nodes within the cluster.

Figure 5:
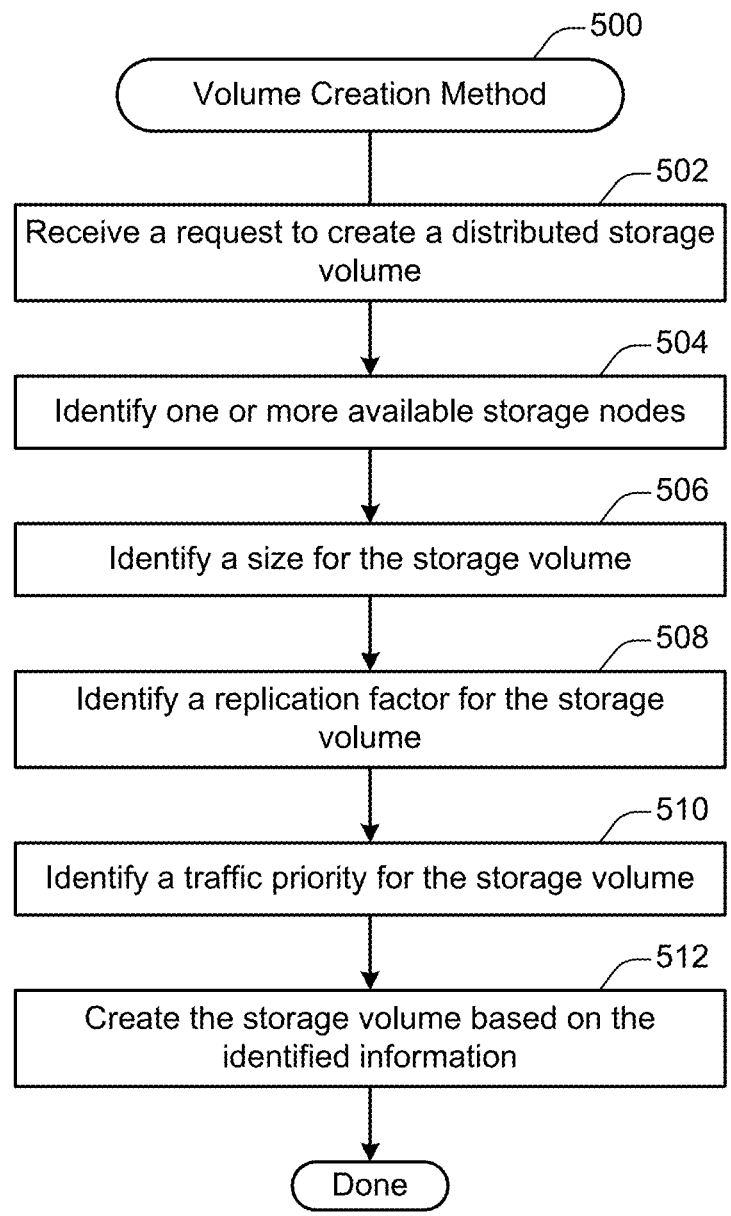
FIG. 5 illustrates a flow chart of an example of a method for creating a storage volume, configured in accordance with one or more embodiments.

FIG. 5 illustrates a flow chart of an example of a method for creating a storage volume. Accordingly, a method, such as method 500, may be implemented to create a storage volume that may be implemented on a storage node. As will be discussed in greater detail below, the creation of the storage volume may include the identification of various features of the storage volume, and such features may be related to or dependent on a particular type of application that is utilizing the storage volume.

At 502, a request to create a distributed storage volume may be received. In various embodiments, the request may be received from an entity or application. For example, the request may be received from an application that is implemented on a particular node. Such a request may be received responsive to the application indicating a storage volume should be created to facilitate execution and implementation of the application or one of its features. In a specific example, the application may be a database or distributed storage application that is configured to implement multiple storage volumes. Accordingly, such an application may issue a request to implement a storage volume to support database functionalities.

At 504, one or more available storage nodes may be identified. In various embodiments, such available storage nodes may be identified based on one or more characteristics of the storage nodes. For example, the storage nodes may have status identifiers which may indicate whether or not a particular storage node is available to implement additional storage volumes, or unavailable and not able to implement additional storage volumes. Such status identifiers may be stored and maintained in a configuration file, and may be propagated among nodes in the cluster. Accordingly, at 504, available storage nodes may be identified based on status identifiers.

At 506, a size for the storage volume may be identified. In various embodiments, the size of the storage volume may be identified based on the request received at 502. For example, the request may include various characteristics of the storage volume to be implemented, such as its size, and such characteristics may have been determined by the application that issued the request. Accordingly, at 506, a size of the storage volume may be identified based on information that was included in the request.

At 508, a replication factor for the storage volume may be identified. In some embodiments, a replication factor may identify a number of storage nodes and/or storage volumes data is to be replicated to within a particular cluster. According to various embodiments, the replication factor may be identified based on the request received at 502. For example, the request may include an indication of a replication factor to be implemented. In another example, the replication factor may be assigned based on a designated value that may be have been determined by an entity, such as an administrator.

At 510, a traffic priority for the storage volume may be identified. In various embodiments, a traffic priority may be a priority or hierarchy that determines and prioritizes which traffic is allocated to available hardware and network resources in which order. Accordingly, a traffic priority may be determined for the storage volume based on one or more characteristics of the storage volume, an application that may be associated with the storage volume, and data that may be associated with the storage volume. For example, a storage volume may be assigned a higher traffic priority if the data being stored in the storage volume is considered to be "dynamic" data that is expected to be read and written frequently, as may be determined based on information included in the request received at 502.

In one specific example, the storage volume may be associated with MySQL data that will be frequently read and re-written to accommodate database operations. In this example, such a storage volume should have low latency I/O characteristics of underlying devices, and would be assigned a high traffic priority. In another example, volumes implemented for streaming purposes also should have low latencies, and may also be assigned high traffic priorities. Additional examples may include volumes implemented using Apache Cassandra or Hadoop, which should have high throughput characteristics of underlying devices, and would also be assigned a high traffic priority. In another example, a storage volume may store backup data that is written once and rarely retrieved. Such a storage volume may be assigned a low traffic priority. In yet another example, a storage volume may be used to implement a file server, where there may be frequent data accesses, but some additional latency may be tolerable. Such a storage volume may be assigned a medium traffic priority. In various embodiments, traffic priorities may be associated with categories that are determined based on an impact to an end user.

At 512, the storage volume may be created based on the identified information. Therefore, based on the identified information one or more storage volumes may be created. In this way, a storage volume may be created that is implemented on an available node, is consistent with a specified size, has been implemented in accordance with a particular replication factor with other identified available storage nodes, and has been assigned a particular traffic priority. As will be discussed in greater detail below, the utilization and implementation of such storage volumes may be further configured to provide high availability, fast data recovery, balanced I/O burden as well as various other features among storage volumes and their underlying storage nodes.

Figure 6:
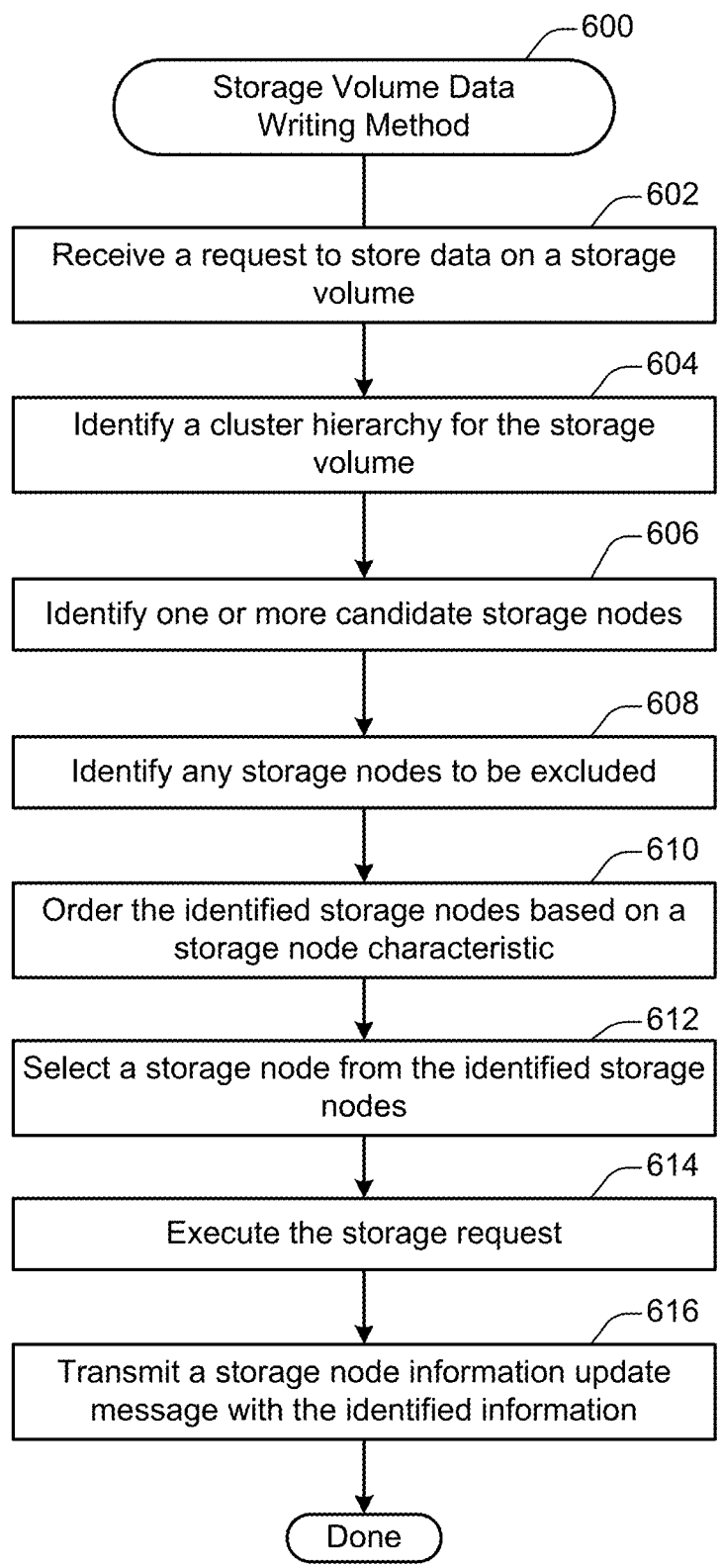
FIG. 6 illustrates a flow chart of an example of a method for writing storage volume data, configured in accordance with one or more embodiments.

FIG. 6 illustrates a flow chart of an example of a method for writing storage volume data. As will be discussed in greater detail below, a method, such as method 600, may implement data storage within one or more clusters of storage nodes while maintaining high availability of the data, fast potential recovery of the data, and balanced I/O burden across the storage nodes of the clusters. Moreover, embodiments disclosed herein may also facilitate the possible implementations of aggregations of storage volumes, as well as various storage volume constraints. In this way, the identification of candidate storage nodes and execution of data storage requests described herein provide improvements in failover tolerance of data, availability of the data, as well as balance in the utilization of storage and network resources.

At 602, a request to store data on a storage volume may be received. In various embodiments, the request may have been generated by an application that has requested to write data to a storage volume that may be implemented on one or more storage nodes, as similarly discussed above with at least respect to FIG. 2. As also discussed above, the storage volume may be implemented as a block device and may be utilized as a storage device for the requesting application. In a specific example, the application may be a database application, and the storage volume may be one of many storage volumes managed by the database application.

At 604, a cluster hierarchy for the storage volume may be identified. In various embodiments, a cluster hierarchy may identify or characterize various features or storage characteristics of the storage nodes within the cluster that is associated with the requesting application. For example, such storage characteristics identified by the cluster hierarchy may be identifiers of storage nodes in the cluster, their current status, their storage capacities, their capabilities, and their geographical features. In various embodiments, such a cluster hierarchy may be retrieved from a particular storage node, as such information may be propagated throughout the cluster. In various embodiments, the cluster hierarchy may characterize or represent the storage nodes based on geographical information, such as region, zone, and rack, and may also include data characterizing capabilities of the nodes, such as total capacity, free capacity, drive type(s), drive speed(s), and types of drive connection(s). In one example, the cluster hierarchy may represent such nodes and geographical information as having a particular structure, such as a "tree". Accordingly, the cluster hierarchy may be stored as a matrix or a network graph that characterizes or represents node-to-node proximity, and is distributed amongst the cluster and globally accessible.

In various embodiments, the cluster hierarchy may further identify physical location information of the storage nodes. For example, the cluster hierarchy may include information that indicates node-to-node proximity on a network graph. In various embodiments, node-to-node proximity may identify whether or not nodes are implemented within the same rack, zone, and/or region. Accordingly, such a network graph may be generated from the perspective of the storage node that initially receives the data storage request, and may identify a node-to-node proximity for all other nodes in the cluster. In various embodiments, such node-to-node proximities may be inferred based on latency information resulting from pings sent to those other nodes. For example, very low latencies may be used to infer that nodes are included in the same rack. Furthermore, existing cluster hierarchies generated by other nodes during their initialization, which may have occurred previously, may be retrieved and used to augment the currently generated cluster hierarchy and/or verify node-to-node proximities of the currently generated cluster hierarchy.

At 606, one or more candidate nodes may be identified. In various embodiments, the candidate nodes may be nodes that may be capable of implementing the storage request consistent with one or more storage parameters. Accordingly, storage parameters may be a set of specified storage characteristics that are features of candidate storage nodes that indicate that they are able to satisfactorily support implementation of the data storage request. More specifically, such candidate storage nodes may be any nodes within a cluster hierarchy that have enough available storage space to execute the storage request, and can also support various other specified characteristics, examples of which may be a desired replicability and latency. As will be discussed in greater detail below, the implementation of such parameters along with additional constraints may be configured to ensure that the execution of the storage request on such candidate nodes is consistent with maintaining high availability of the data, fast potential recovery of the data, balanced I/O burden across the storage nodes of the cluster, possible implementations of aggregations of storage volumes, and one or more storage volume constraints discussed in greater detail below.

As similarly discussed above, the storage parameters, may include specified characteristics. For example, the specified characteristics may identify a specified I/O capability which may have been specified by the requesting application, or may have been determined based on one or more features of the storage volume in which the data is to be stored. In various embodiments, the storage parameters may be compared with the features and characteristics of storage nodes to determine which storage nodes meet the criteria or constraints set forth by the storage parameters. Additional examples of storage parameters may include a geographical location, such as region and rack, a status, and a storage capacity. In a specific example, different regions may be scanned, and candidate storage nodes may be identified for each particular region. Accordingly, different sets of candidate storage nodes may be identified for particular geographical regions.

At 608, one or more nodes may be excluded. In various embodiments, one or more candidate storage nodes may be excluded based on one or more constraints. Such constraints may be specific sets of features or characteristics of the storage nodes, features of the storage volume, or features of the application implemented on the storage node. In various embodiments, the constraints may be included in the data storage request, or may be inferred based on the contents of the request, the features of the storage volume and/or the application associated with the request. Accordingly, the constraints may be storage volume specific constraints, such as whether or not the data storage request is associated with a storage volume that is included in a group of storage volumes, as may be the case with a striped storage volume in which data is striped across a group of storage volumes.

For example, a 100 GB aggregated storage volume may be striped across 10 storage volumes such that each storage volume stores 10 GB of the aggregated storage volume. In this example, the storage volumes may be implemented in the same rack. Accordingly, the constraints may indicate that only storage nodes from that rack should be identified as candidates, and all others should be excluded. Accordingly, such constraints may be configured to implement storage volume specific rules. In various embodiments, the constraints may include various other characteristics, such as application specific replication requirements, and application specific I/O requirements.

Various other constraints may be implemented as well. For example, replication priority may be used to exclude candidate storage nodes. As discussed above, a particular storage node, rack, data center, or region could fail. To protect against such failure, the implementation of replication priority may be guaranteed for a storage volume. In some embodiments, the system may attempt to implement the maximum level of replication priority that a storage node supports. For example, if it is determined that all data needs to be stored on a single rack for fast I/O, then replication of data would not be implemented within the rack, but may be implemented at storage nodes of other racks which may be in other racks, zones, and/or regions. In another example, if it is determined that data needs to be protected against a data center failure, then the data may be split across different zones. In this example, storage nodes utilized for replication of data would exclude storage nodes in the same zone as the storage node that initially receives the data storage request. In this way, various constraints, also referred to herein as data distribution parameters, may be identified based on parameters received and determined during creation of a volume or node, and determined based on I/O patterns, and such constraints may be used to identify nodes that match or meet the constraints. Accordingly, storage nodes that don't meet particular criteria or constraints may be excluded, while storage nodes that do meet the criteria or constraints may be ordered to maximize I/O given those constraints, as will be discussed in greater detail below.

At 610, the identified storage nodes may be ordered based on one or more storage node characteristics. For example, the identified storage nodes may be ordered based on available size. As discussed above, the available size and storage capacity of the storage nodes may have been identified. In various embodiments, the identified candidate storage nodes may be sorted in descending order of available size. In this way, storage nodes with the greatest capacity may be prioritized first, and the storage of data may be balanced among the available storage nodes. In various embodiments, the identified storage nodes may be ordered based on other storage node characteristics as well, such as I/O capabilities. Moreover, the identified candidate storage nodes may be ordered based on combinations of the storage node characteristics.

At 612, one or more storage nodes may be selected from the identified storage nodes. Accordingly, a particular storage node, or several storage nodes, may be selected in accordance with the order set forth at 610, For example, the candidate storage nodes may be ordered at 610, and the first candidate storage node may be selected. In some embodiments, additional storage nodes may be identified to implement one or more other features, such as a replication factor. In another example, a best storage node may be selected from each of several different rack, zones, or regions, and such storage nodes may be used to implement the storage request, as discussed in greater detail below.

At 614, the storage request may be executed. Accordingly, the data included in the storage request may be stored in a storage volume implemented on the identified storage node. Moreover, the data may be replicated to one or more other identified storage nodes in a manner consistent with the previously described order of identified candidate storage nodes as well as a replication factor. For example, if a replication factor indicates that five copies of the data should be stored in other nodes, the data may be stored on an additional five identified candidate nodes as set forth at 610 and 612.

At 616, a storage node information update message may be transmitted. In various embodiments, the storage node information update message may include updated information that identifies the updated features of the storage node at which the storage request was executed. For example, the message may include an updated storage capacity. The message may be sent to the other storage nodes in the cluster thus propagating the information throughout the cluster.

Figure 7:
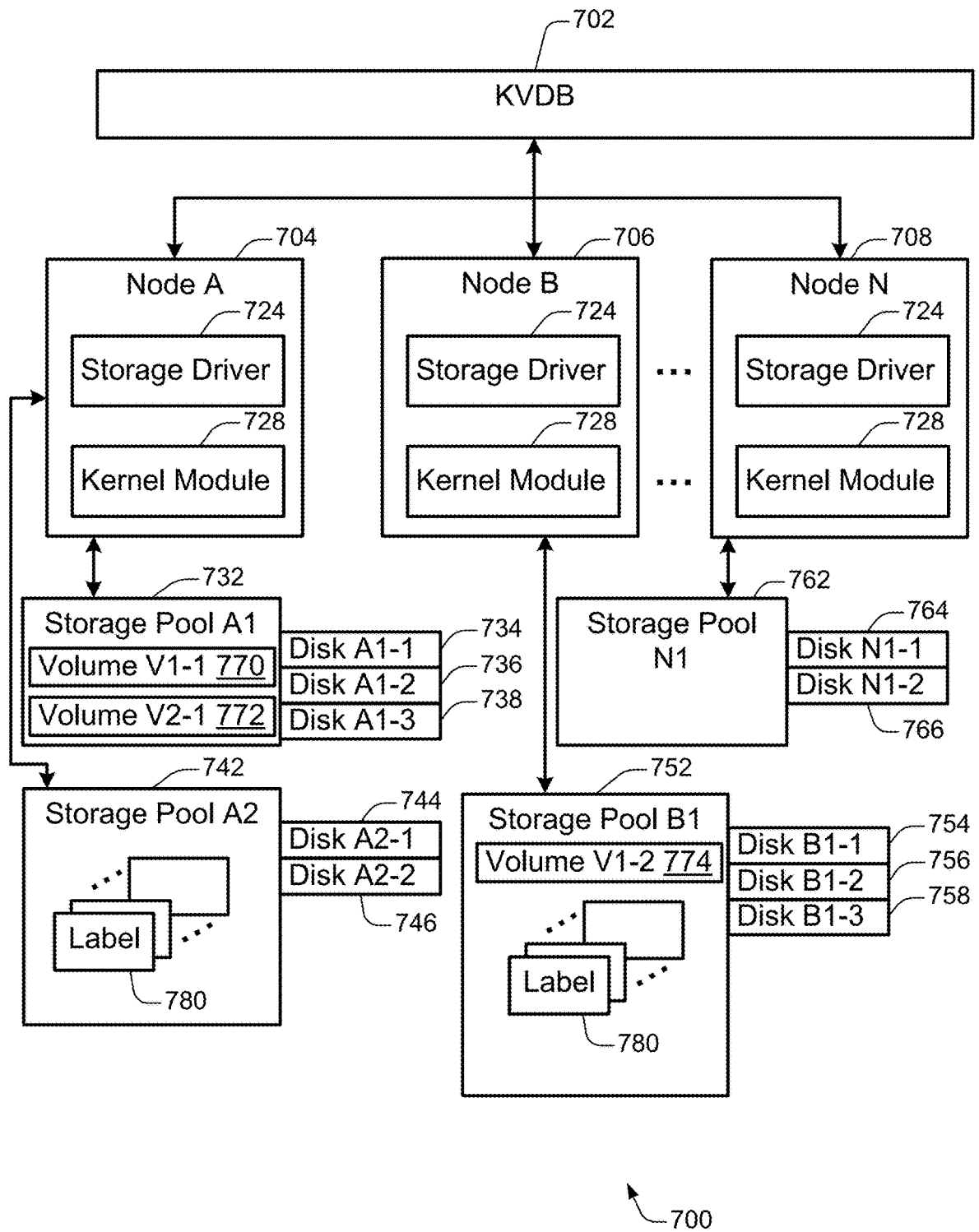
FIG. 7 illustrates an example of an arrangement of components in a distributed storage system, configured in accordance with one or more embodiments.

FIG. 7 illustrates an example of an arrangement of components in a containerized storage system 700, configured in accordance with one or more embodiments. The storage system 700 includes a clustered key-value database (KVDB) 702 in communication with a plurality of application nodes 704, 706, and 708. Each node has implemented thereon a storage driver 724 and a kernel module 728. Each node has access to zero or more storage pools such as the storage pools A1 732, A2 742, B1 752, and N1 762. Each storage pool includes zero or more virtual storage volumes such as the virtual storage volumes V1-1 770, V2-1 772, and V1-2 774. Each virtual storage volume includes storage space on one or more disks associated with the storage pool such as the disks A1-1 734, A1-2 736, A1-3 738, A2-1 744, A2-2 746, N1-1 764, N1-2 766, B1-1 754, B1-2 756, and B1-3 758.

In some embodiments, KVDB 702 is configured to serve as the single source of truth for an entire cluster. In some embodiments, KVDB 702 maintains cluster membership information as well as configuration for every volume. In some embodiments, KVDB 702 also maintains a monotonically increasing cluster version number. In such embodiments, this version number ensures update and communication order in a distributed system.

In some embodiments, KVDB 702 communicates with nodes 704, 706, and 708 solely in a control path. In such embodiments, KVDB 702 is not in the datapath for the nodes. In some embodiments, KVDB 702 is configured to be periodically snapshotted and the key-value space is also periodically saved. Thus, in such embodiments, KVDB 702 can be reconstructed in case of a disaster.

According to various embodiments, the clustered storage system 700 shown in FIG. 7 may be implemented in any of various physical computing contexts. For example, some or all of the components shown in FIG. 7 may be implemented in a cloud computing environment such as Amazon Web Services (AWS), Microsoft Azure, or Google Cloud. As another example, some or all of the components shown in FIG. 7 may be implemented in a local computing environment such as on nodes in communication via a local area network (LAN) or other privately managed network.

In some implementations, a node is an instance of a container system implemented on a computing device. In some configurations, multiple nodes may be implemented on the same physical computing device. Alternately, a computing device may contain a single node.

According to various embodiments, each node may be configured to instantiate and execute one or more containerized application instance. Each node may include many components not shown in FIG. 7. These components may include hardware components, and/or software components, such as those discussed herein.

According to various embodiments, each node may include a storage driver 724. The storage driver 724 may perform any of various types of storage-related operations for the node. For example, the storage driver 724 may facilitate the mounting or unmounting of virtual storage volumes. As another example, the storage driver 724 may facilitate data storage or retrieval requests associated with a mounted virtual storage volume. The storage driver 724 may be substantially similar or identical to the privileged storage container 316 shown in FIG. 3.

In some embodiments, each node may include a kernel module 728. The kernel module may receive from the storage driver a request to unmount a virtual volume. The kernel module may then identify a number of references to the virtual volume. Such a reference may be referred to herein as a block device reference. Each reference may reflect an open file handle or other such interaction between the file system and the virtual volume. If the reference count is zero, then the kernel module may unmount the virtual volume and return a message indicating success. If instead the reference count is positive, then the kernel module may return a message indicating failure.

According to various embodiments, a storage pool may provide access to physical storage resources for a storage node. Each storage node may include some number of disks. The disks may be accessible to the storage nodes via a network. For example, the disks may be located in storage arrays containing potentially many different disks. In such a configuration, which is common in cloud storage environments, each disk may be accessible for potentially many nodes to access. A storage pool such as the pool 732 may include potentially many different disks. In some embodiments, a storage pool includes many different disks of the same type and size. In other embodiments, all the disks in a storage pool have some other common factor to warrant grouping together into the same storage pool.

In some embodiments, storage pools include one or more labels 780. For example, in FIG. 7, storage pools 742 and 752 include one or more labels 780. In some embodiments, all storage pools in a cluster have one or more labels. In other embodiments, only subsets of storage pools in a cluster have one or more labels. Yet in some other embodiments, no storage pools have labels. In some embodiments, individual disks can have one or more labels. In some embodiments, individual nodes or even a group of nodes can have one or more labels. In some embodiments, a node/pool can have the same set of labels as another node/pool. In other embodiments, no node/pool has the same set of labels as another node/pool.

According to various embodiments, the one or more labels can be used in provisioning rules. For example, a provision rule can be written to provision volumes that have random I/O latencies less than 2 ms or io_priority high. Provisioning rules are discussed in more detail below with regard to FIG. 11.

In some embodiments, labels can give hierarchical system topology information. For example, the one or more labels can include information regarding the region, zone, data center (DC), row, rack, hypervisor, and node corresponding to a storage pool or storage node. In some embodiments, labels are implemented as arbitrary strings of the form [labelKey]=[Value]. For example, the labels region="us-east", zone="dc-one", rack="rack-1", and row="20" represent just some of the labels used in the systems provided. In some embodiments, the information in the one or more labels is auto discovered in the cloud from orchestration system labels. In some embodiments, the information in the one or more labels is passed in as environment variables.

According to various embodiments, the virtual storage volumes 770, 772, and 774 are logical storage units created by the distributed storage system, of which the kernel modules and storage drivers are a part. Each virtual storage volume may be implemented on a single disk or may span potentially many different physical disks. At the same time, data from potentially many different virtual volumes may be stored on a single disk. In this way, a virtual storage volume may be created that is potentially much larger than any available physical disk. At the same time, a virtual storage volume may be created in such a way as to be robust to the failure of any individual physical disk. Further, the virtual storage volume may be created in such a way as to allow rapid and simultaneous read access by different nodes. Thus, a single virtual storage volume may support the operation of containerized applications implemented in a distributed fashion across potentially many different nodes.

In some implementations, each virtual storage volume may include zero or more replicas. For example, the storage volume V1-1 770 on the Node A 704 includes the replica V1-2 774 on the Node B 706. Replicating a virtual storage volume may offer any of various computing advantages. For example, each replica may be configured to respond to data read requests, so increasing the replication factor may increase read access bandwidth to the virtual storage volume. As another example, replicas may provide redundancy in the event of a software and/or hardware failure associated with one or more replicas of the storage volume.

Figure 8:
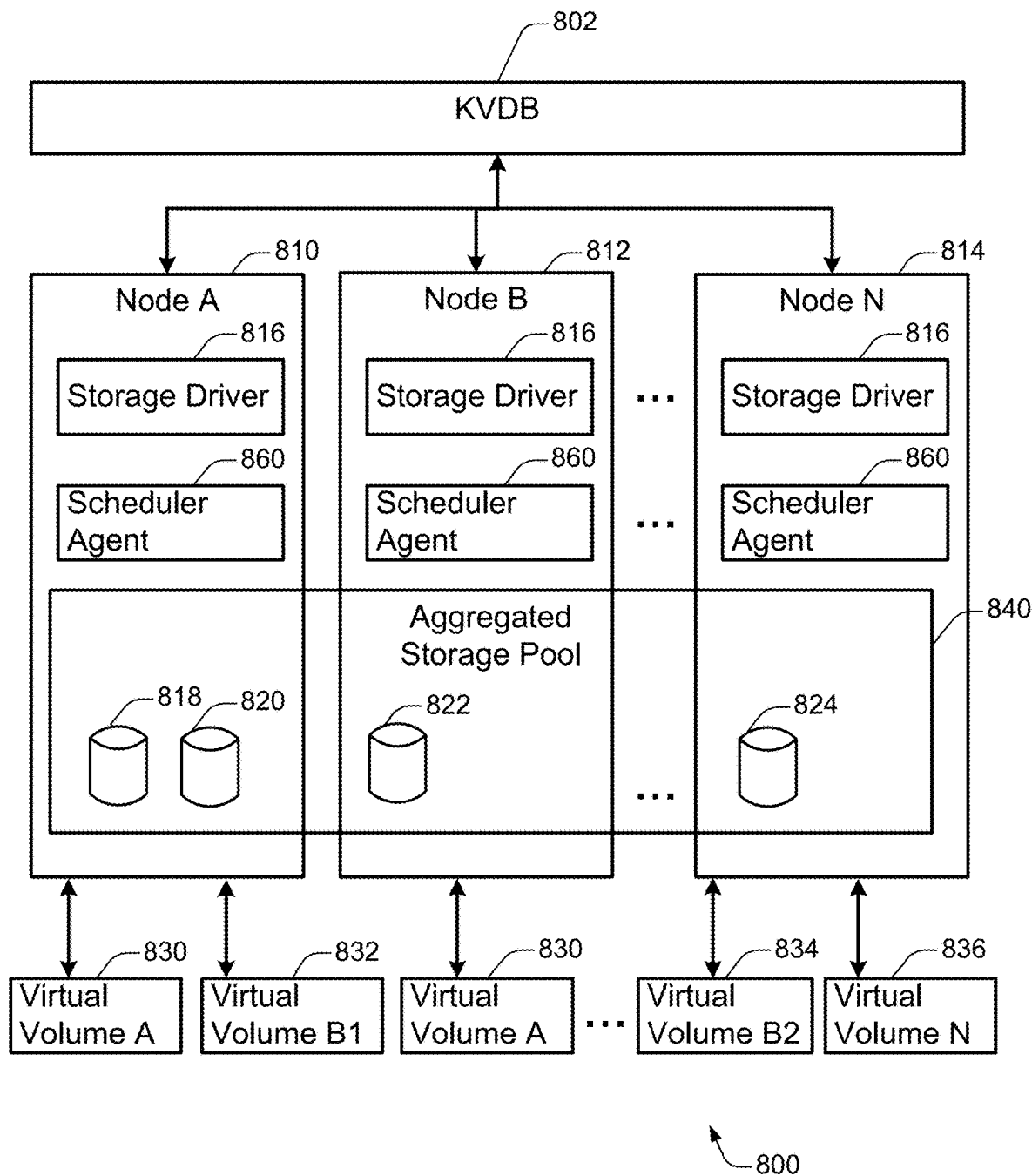
FIG. 8 illustrates an example of an arrangement of components in a clustered storage system, configured in accordance with one or more embodiments.

FIG. 8 illustrates an example of an arrangement of components in a clustered storage system 800, configured in accordance with one or more embodiments. The storage system 800 includes a clustered key-value database (KVDB) 802 in communication with a plurality of storage nodes 810, 812, and 814. Each node has implemented thereon a storage driver 816, In addition, each node can mount one or more of a plurality of virtual volumes 830, 832, 834, and 836. Each virtual volume can include storage space on one or more of a plurality of storage disks 812, 820, 822, and 824 in an aggregated storage pool 840.

According to various embodiments, the clustered storage system 800 shown in FIG. 8 may be implemented in any of various physical computing contexts. For example, some or all of the components shown in FIG. 8 may be implemented in a cloud computing environment such as Amazon Web Services (AWS), Microsoft Azure, or Google Cloud. As another example, some or all of the components shown in FIG. 8 may be implemented in a local computing environment such as on nodes in communication via a local area network (LAN) or other privately managed network.

In some implementations, a node is an instance of a container system implemented on a computing device. In some configurations, multiple nodes may be implemented on the same physical computing device. Alternately, a computing device may contain a single node. An example configuration of a container node is discussed in further detail with respect to FIG. 3.

According to various embodiments, each node may be configured to instantiate and execute one or more containerized application instance. Each node may include many components not shown in FIG. 8. These components may include hardware and/or software components, such as those discussed herein.

According to various embodiments, each node may include a storage driver 816. The storage driver 816 may perform any of various types of storage-related operations for the node. For example, the storage driver 816 may facilitate the mounting or unmounting of virtual storage volumes. As another example, the storage driver 816 may facilitate data storage or retrieval requests associated with a mounted virtual storage volume. In some embodiments, the storage driver 816 may be substantially similar or identical to the privileged storage container 316 shown in FIG. 3.

According to various embodiments, each node may include a scheduler agent 860. The scheduler agent 860 may facilitate communications between nodes. For example, node 810 may communicate with node 812 via scheduler agent 860. The scheduler agent 860 may then communicate with the storage driver 816 to perform an operation such as initiating an application container instance or unmounting a virtual volume.

In some implementations, the disks 818, 820, 822, and 824 may be accessible to the container nodes via a network. For example, the disks may be located in storage arrays containing potentially many different disks. In such a configuration, which is common in cloud storage environments, each disk may be accessible for potentially many nodes to access. A storage pool such as the pool 840 may include potentially many different disks. In FIG. 8, storage pool 840 is an aggregated disk pool that includes disks from different nodes. For example, disk 818 and 820 are on node 810, while disk 822 is on node 812 and disk 824 is on node 814.

According to various embodiments, the virtual storage volumes 830, 832, 834, and 836 are logical storage units created by the distributed storage system. Each virtual storage volume may be implemented on a single disk or may span potentially many different physical disks. At the same time, data from potentially many different virtual volumes may be stored on a single disk. In this way, a virtual storage volume may be created that is potentially much larger than any available physical disk. At the same time, a virtual storage volume may be created in such a way as to be robust to the failure of any individual physical disk. Further, the virtual storage volume may be created in such a way as to allow rapid and simultaneous read access by different nodes. Thus, a single virtual storage volume may support the operation of containerized applications implemented in a distributed fashion across potentially many different nodes.

According to various embodiments, a virtual volume can be replicated across multiple nodes, for instance to support read-only access by different nodes. For example, in FIG. 8, the virtual volume A 830 is replicated across Node A 810 and Node B 812. This ensures that if Node A 810 experiences a failure, then the replica volume A 830 is still accessible. In some embodiments, replicating across failure domains in such a way is important for ensuring high availability.

According to various embodiments, clustered storage system 800 allows for virtual volumes to be striped across nodes in a cluster according to one or more rules. Such provisioning of virtual volumes may be important to fully and efficiently support certain applications. For example, for certain applications such as MySQL, certain volumes such as journal and data volumes should be on the same node. This often occurs when volumes that belong to the same instanced of the application need to be on the same node. Volumes that need to be on the same node are said to have a volume affinity requirement. Referring back to FIG. 8, if volume 830 has affinity with volume 832, then volume 830 and 832 need to be on the same node, e.g., node 810. As another example, for certain applications such as Cassandra, volumes need to be on different nodes. This often occurs when volumes that belong to the same group need to be provisioned across failure domains. Such volumes are said to have a volume anti-affinity requirement. Referring back to FIG. 8, if volume 832 and volume 834 have volume anti-affinity, even though the volumes belong to the same application, then the volumes have to be on different nodes, 810 and 814, as shown in FIG. 8.

According to various embodiments, a virtual volume can be aggregated across multiple nodes. Such a configuration may support distributed and parallel reads and writes to and from the volume. For example, the virtual volume B1 832 and the virtual volume B2 834 shown in FIG. 8 are different data portions of the same virtual volume B.

According to various embodiments, each node may be configured to implement one or more instances of one or more containerized storage applications. In particular embodiments, an application container may correspond to any of a wide variety of containerized applications. For example, as discussed with respect to FIG. 3, a containerized application may be a web server 310, an email server 312, a web application 314, a database, or any of many other types of applications.

In some embodiments, KVDB 802 is configured to serve as the single source of truth for an entire cluster. In some embodiments, KVDB 802 maintains cluster membership information as well as configuration for every volume. In some embodiments, KVDB 802 also maintains a monotonically increasing cluster version number. In such embodiments, this version number ensures update and communication order in a distributed system.

In some embodiments, KVDB 802 communicates with nodes 810, 812, and 814 solely in a control path. In such embodiments, KVDB 802 is not in the datapath for the nodes. In some embodiments, KVDB 802 is configured to be periodically snapshotted and the key-value space is also periodically saved. Thus, in such embodiments, KVDB 802 can be reconstructed in case of a disaster.

Figure 9:
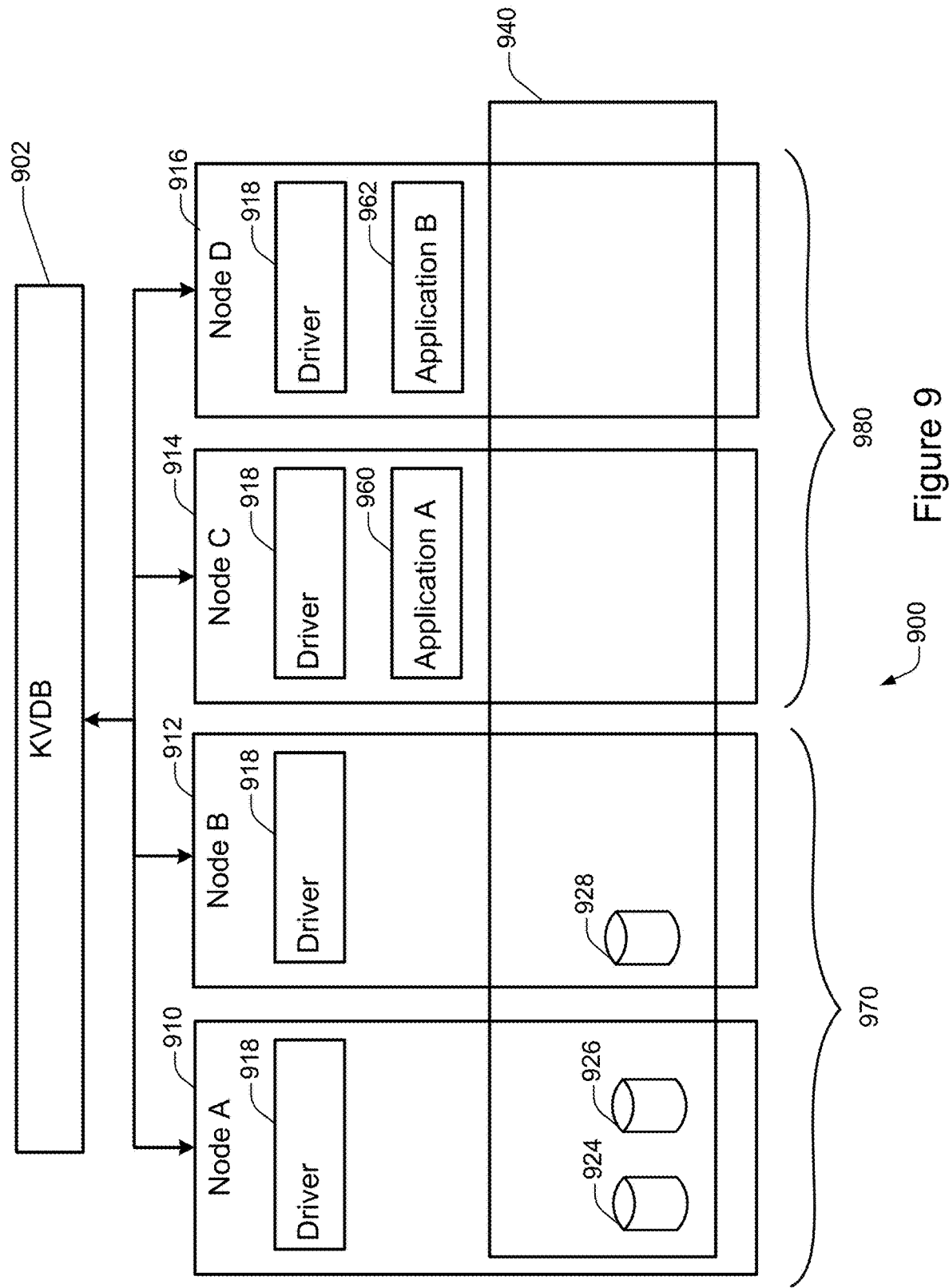
FIG. 9 illustrates an example of a disaggregated deployment model for a clustered storage system, configured in accordance with one or more embodiments.

FIG. 9 illustrates an example of a disaggregated deployment model for a clustered storage system 900. Storage system 900 includes a KVDB 902 connected to nodes 910, 912, 914, and 916. Each node includes a driver 918. Each driver 918 may perform any of various types of application-related or storage-related operations for the node. For example, driver 918 may facilitate the mounting or unmounting of virtual storage volumes on nodes 910 and 912. As another example, driver 918 may facilitate data storage or retrieval requests associated with a mounted virtual storage volume. In some embodiments, driver 918 may be substantially similar or identical to the privileged storage container 316 shown in FIG. 3.

In some embodiments, storage system 900 is similar to storage systems 700 and 800, except for the fact that user applications do not run on storage nodes. Thus, nodes 910 and 912, which are storage nodes in storage cluster 970, do not run user applications. Instead, nodes 914 and 916, which are part of compute cluster 980, run applications 960 and 962, but do not contain any storage disks. In some embodiments, storage cluster 940 includes all of nodes 910, 912, 914, and 916, but disks 924, 926, and 928 are only located on storage nodes 910 and 912.

In some embodiments, the disaggregated model may be useful in cloud environments where instances are autoscaled up to a high number to account for bursts and then scaled back down. In some embodiments, the disaggregated model may also be useful when server architectures are very different in the cluster and there are nodes, e.g., nodes 914 and 916, that are CPU and memory intensive but do not offer any storage. In some embodiments, in the disaggregated model, the resource consumption is limited to that of the storage cluster, resulting in better performance. According to various embodiments, the disaggregated model also allows for compute cluster to be different from storage cluster. In some embodiments, it may be beneficial in the disaggregated model to have all replication traffic go over the storage cluster.

Figure 10:
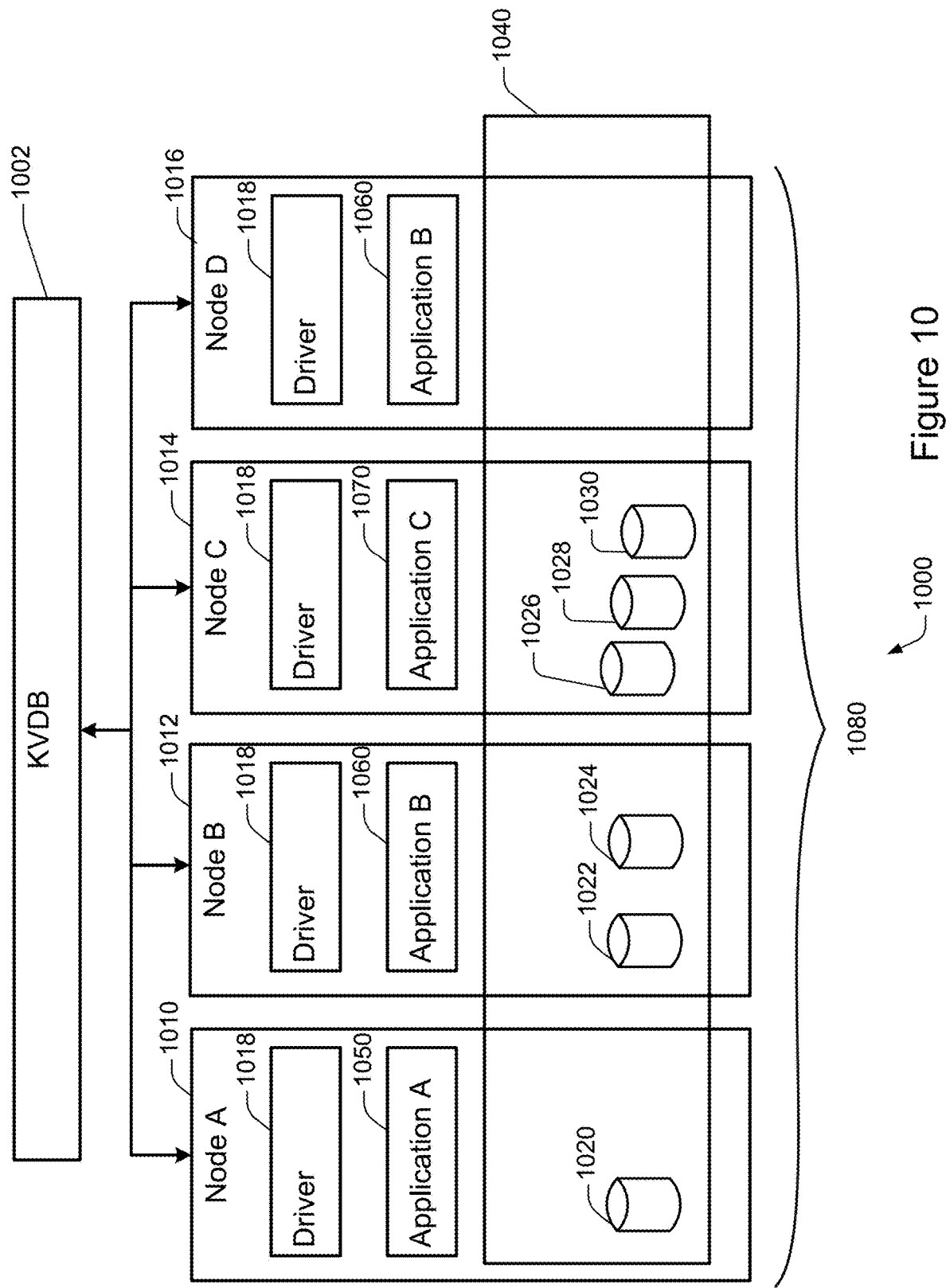
FIG. 10 illustrates an example of a hyperconverged deployment model for a clustered storage system, configured in accordance with one or more embodiments.

FIG. 10 illustrates an example of a hyperconverged deployment model for a clustered storage system 1000. Storage system 1000 includes a KVDB 1002 connected to nodes 1010, 1012, 1014, and 1016. Each node includes a driver 1018. Each driver 1018 may perform any of various types of application-related and storage-related operations for the node. For example, driver 1018 may facilitate the mounting or unmounting of virtual storage volumes on any of the nodes. As another example, driver 1018 may facilitate data storage or retrieval requests associated with a mounted virtual storage volume. In some embodiments, driver 1018 may be substantially similar or identical to the privileged storage container 316 shown in FIG. 3.

In some embodiments, storage system 1000 is similar to storage systems 700 and 800, except for the fact that all nodes are part of compute and storage cluster 1080, and can run user applications, such as applications 1050, 1060, and 1070. In some embodiments, the same application can be run on two different nodes. For example, application 1060 runs on both nodes 1012 and 1016. In some embodiments, storage cluster 1040 includes all of nodes 1010, 1012, 1014, and 1016, which include disks 1020, 1022, 1024, 1026, 1028, and 1030. In some embodiments, even though all nodes are storage nodes, some storage nodes do not contribute actual storage disks for mounting volumes in the storage cluster. In some embodiments, the hyperconverged model benefits from limiting traffic on the network when an application is scheduled on the same node where one of the replicas resides.

Figure 11:
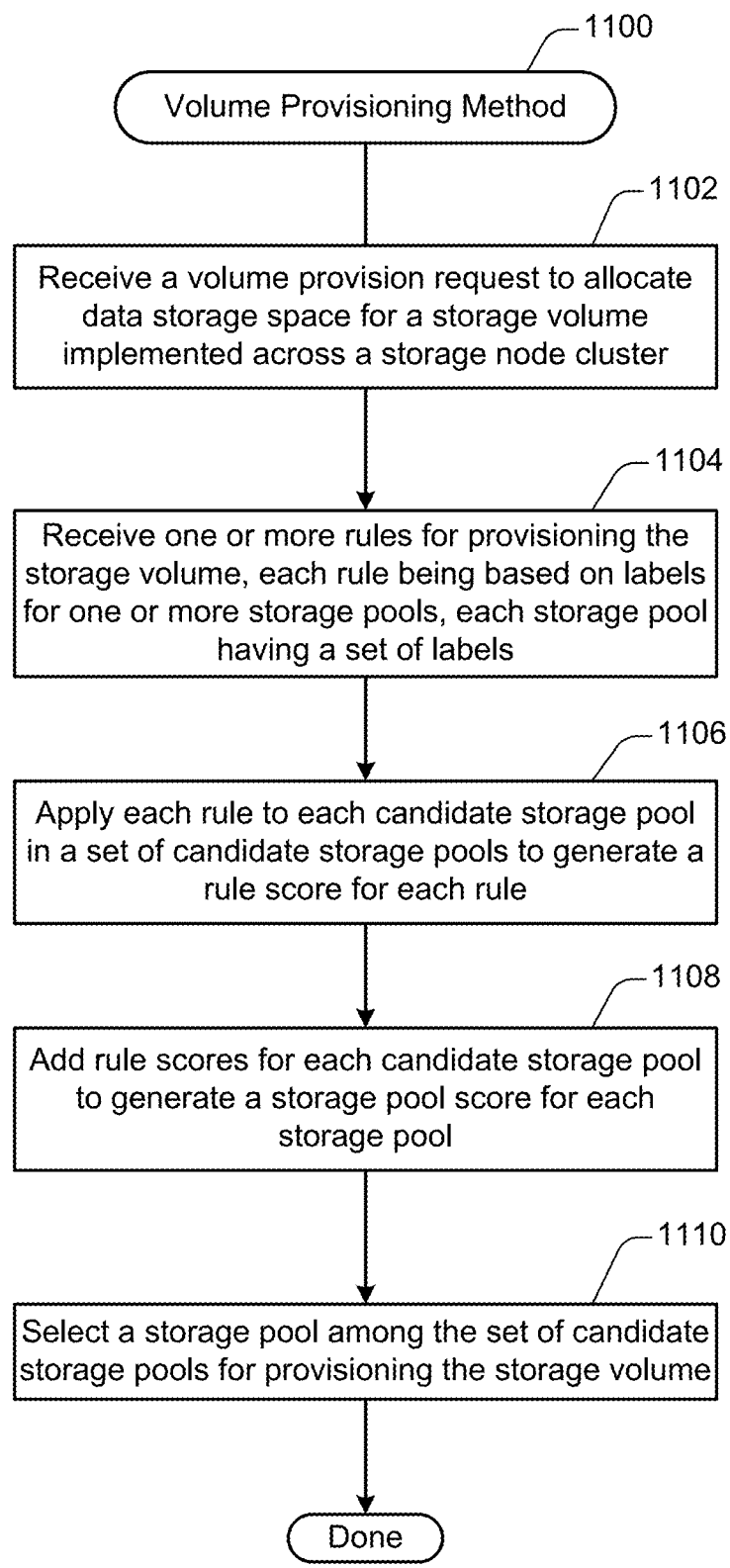
FIG. 11 illustrates a flow chart of an example of a method for volume provisioning, configured in accordance with one or more embodiments.

FIG. 11 illustrates a flow chart of an example of a method 1100 for volume provisioning. As will be discussed in greater detail below, a method, such as method 1100, may implement data storage within one or more clusters of storage nodes while maintaining high availability of the data, fast potential recovery of the data, and balanced I/O burden across the storage nodes of the clusters. Moreover, embodiments disclosed herein may also facilitate the possible implementations of aggregations of storage volumes, as well as various storage volume constraints. In this way, the identification of candidate storage nodes and execution of data storage requests described herein provide improvements in failover tolerance of data, availability of the data, as well as balance in the utilization of storage and network resources.

At 1102, a volume provision request to allocate data storage space for a storage volume implemented across a storage node cluster may be received. In some embodiments, the storage node cluster includes a plurality of storage nodes, where each storage node includes one or more storage devices having storage space allocated for storing data associated with the storage volume. In some embodiments, the storage node cluster is a truly distributed system. In such embodiments, each storage node in the cluster is equal from a control plane, and thus the volume provision request can be processed at any node. In various embodiments, the request may have been generated by an application that has requested to write data to a storage volume that may be implemented on one or more storage nodes, as similarly discussed above with at least respect to FIG. 2. As also discussed above, the storage volume may be implemented as a block device and may be utilized as a storage device for the requesting application. In a specific example, the application may be a database application, and the storage volume may be one of many storage volumes managed by the database application. In some embodiments, each node has system-defined labels, e.g., node-uuid="node-unique-id", as well as topology related labels, e.g., region="us-east", zone="dc-one", rack="rack-1", and row="20". In some embodiments, users can also apply their own labels to nodes, e.g., deployment="green" and enclosure="xyz".

At 1104, one or more rules for provisioning the storage volume may be received. In some embodiments, each rule is based on labels for one or more storage pools. According to various embodiments, storage pools are created by grouping together disks or drives of the same size and same type. In some embodiments, storage pools are then collected into a storage node based on where they are attached. In some embodiments, a single node with different drive sizes and/or types will have multiple storage pools. In some implementations, a storage pool, by default, includes drives written to in a RAID-0 configuration. In some embodiments, for storage pools with at least four drives, the drives can be written to in a RAID-10 configuration. In some embodiments, a single node can have up to 32 different storage pools.

In some embodiments, at the time of storage pool construction, individual drives are benchmarked and categorized as high, medium, or low based on random/sequential input/output per second (IOPS) and latencies. The results of the benchmark and other information are used to generate individual labels for the storage pools. Thus, in some embodiments, each storage pool has a set of labels attached to it, like labels 780 described above with respect to FIG. 7. In some embodiments, each storage pool has its own set of labels. Some examples of storage pool specific labels are io_priority=high, iops=1000, media_type=ssd. In some embodiments, each storage pool also inherits all the labels from its node. Thus, some examples of labels for storage pools include: node=node-id-1, io_priority=high, medium=ssd, zone=us-east, region=east, rack=abc, iops=1000. According to various embodiments, the information in the labels may identify or characterize various features or storage characteristics of the storage pools within the cluster. For example, such storage characteristics identified by the labels may be identifiers of storage pools in the cluster, the storage nodes on which the storage pools are located, their current status, their storage capacities, their capabilities, and their geographical features. In some embodiments, at least some of the labels are determined by the system.

In various embodiments, the labels are auto discovered in the cloud or orchestration system labels. In some embodiments, the label information may be retrieved from a particular storage node, as such information may be propagated throughout the cluster. In various embodiments, the labels may characterize or represent the storage pools based on geographical information, such as region, zone, and rack, and may also include data characterizing capabilities of the nodes, such as total capacity, provisioned capacity, free capacity, drive type(s), drive speed(s), and types of drive connection(s). According to various embodiments, the information in the labels is known to every node in the cluster. Accordingly, each node in the cluster may store information the capabilities of every other node in the cluster.

In various embodiments, the labels may further include topology information, such as physical location information of the storage nodes. For example, the labels may include information that indicates node-to-node proximity on a network graph. In various embodiments, node-to-node proximity may identify whether or not nodes are implemented within the same rack, zone, and/or region. Accordingly, such a network graph may be generated from the perspective of the storage node that initially receives the volume provision request, and may identify a node-to-node proximity for all other nodes in the cluster. In various embodiments, such node-to-node proximities may be inferred based on latency information resulting from pings sent to those other nodes. For example, very low latencies may be used to infer that nodes are included in the same rack. Furthermore, existing topology information may be generated by other nodes during their initialization, which may have occurred previously, may be retrieved and used to augment the information in the labels and/or verify the label information. According to various embodiments, because the nodes in a cluster are topology aware, fault domains are already classified and can easily be identified with labels.

In some embodiments, users can define and or re-assign labels of their choice. In such embodiments, users can even define arbitrary failure domains by assigning labels of their choice. For example, in order to describe a data center application with rooms, with each room having racks, a user can simply assign the labels room=x, and rack=y, to the storage pools. Thus, in some embodiments, users can specify how a volume is provisioned using label-based rules. For example, a volume with three replicas can be created using the following two rules:

Rule #1—replicaAntiAffinity:
    enforcement: required
    topology: rack
Rule #2—replicaAffinity:
    matchExpressions:
        enforcement: required
        key: iops
        operator: greaterThan
        value: 500

The two rules above specify that replicas for the volume must not be placed in the same rack, and the replicas should be placed on pools which have IOPS>500. In some embodiments, each basic rule is defined in the following format:

rule {
    weight
    enforcement
    topologyKey
    list of matchExpressions
    key: <label's key part>
    operator: one of "in|not-in|exists|not-exists|greater-than-|less-than"
    values: <label's value part>
}

In some embodiments, the rule weight is expressed as an integer and represents the score for that rule if a pool matches. In some embodiments, enforcement can be expressed as two values, required and preferred. For required rules, if the rule cannot be satisfied, then the pool is disqualified for provisioning. For preferred rules, if the rule cannot be satisfied, the pool can still be a candidate, but would have less preference.

In some embodiments, the topologyKey field allows the same score to apply to all pools with have the same topologyKey specified in the rule. For example, if the topologyKey field is "rack", then if a pool matches, all pools with the same value as the matching pool for rack will receive the same score. More specifically, for example, if a matching pool had a rack="rack-2" label and the topologyKey field value was "rack", then all pools which have a rack="rack-2" label will get the same score as the matching pool.

One example of a rule that matches all pools within the same "zone" that have the label deployment="green" can be expressed as:
rule {
  enforcement: required
  topology: zone
  list of matchExpressions:
  {
    key: deployment
    operator: in
    values: green
  }
}

In some embodiments, rules can be of two different types: ReplicaAffinity and ReplicaAntiAffinity. ReplicaAffinity rules define the pools that must be selected for provisioning a volume's replica. In some embodiments, the selection is based on the storage pool's properties (which include node properties as well). ReplicaAntiAffinity rules define the pools that must NOT be selected for provisioning a volume's replica. In some embodiments, the selection is based on the storage pool's properties (which include node properties as well). In some embodiments, replica anti-affinity is used only to specify topology/key. In such embodiments, the rule only comes into play once any replica is already selected previously.

At 1106, each rule is applied to each candidate storage pool in a set of candidate storage pools to generate a rule score for each rule. According to various embodiments, one or more candidate storage pools may be identified. In various embodiments, the candidate storage pools may be storage pools that may be capable of implementing the volume provisioning request consistent with one or more parameters in each rule. Accordingly, rule parameters may be a set of specified storage characteristics that are features of candidate storage pools that indicate that they are able to satisfactorily support implementation of the volume provisioning request. More specifically, such candidate storage pools may be any of the storage pools within a cluster that have enough available storage space to execute the storage request, and can also support various other specified characteristics in the rules, examples of which may be a desired replicability, affinity or anti-affinity, IOPS threshold, and latency. As will be discussed in greater detail below, the matching of such rule parameters, or constraints, with the information included in the labels may be configured to ensure that the execution of the volume provisioning request on such candidate storage pools is consistent with maintaining high availability of the data, fast potential recovery of the data, balanced I/O burden across the storage nodes of the cluster. Techniques and mechanisms for selecting the best candidate storage pool for implementing the provisioning request is discussed in greater detail below.

As similarly discussed above, the rule parameters, may include specified requirements or preferences pertaining to the volume in question in relation to the candidate storage pools. For example, the specified characteristics may identify a specified I/O capability which may have been specified by the requesting application, or may have been determined based on one or more features of the storage volume that is to be provisioned. In various embodiments, the rule parameters may be compared with the features and characteristics of the storage pools as described in the labels to determine which storage pools meet the criteria or constraints set forth by the rules. Additional examples of rule parameters may include a geographical location, such as region and rack, a status, and a storage capacity. In a specific example, different regions may be labeled, and candidate storage pools may be identified for each particular region. Accordingly, different sets of candidate storage pools may be identified for particular geographical regions. In some embodiments, all storage pools in a cluster are considered candidate storage pools. In other embodiments, only a subset of the storage pools in a cluster are considered candidate storage pools based on some predetermined criteria.

In some embodiments, the system applies each rule to each candidate storage pool. In some embodiments, each rule returns a score for a particular candidate storage. If a rule is matched, then the rule score would be a positive score, e.g., 10,000. In some embodiments, if the rule is not matched, but the rule is not required, the rule score would be 0. In some embodiments, if the rule is not matched, but the rule is required, the rule score would be a maximum negative score, e.g., −9223372036854775808. In some embodiments, the maximum negative score can be any large negative number as long as it is large enough such that any positive match with the other rules resulting in positive scores for those rules would still not be enough to render the storage pool candidate to be chosen.

Referring back to the two rule volume example presented above, two rules gives two rule scores for each candidate storage pool. After both rules are applied to each of the candidate storage pools, then the rule scores for each of the two rules are added together for each of the candidate storage pools to generate a storage pool score for each candidate storage pool. For example, if there were five candidate storage pools, then each of the five candidate storage pools would receive a rule score for the ReplicaAntiAffinity rule and the ReplicaAffinity rule. Both rule scores would be added together to generate a storage pool score for each of the five candidate storage pools.

In some embodiments, applying the rules requires running a matching algorithm. One example of a matching algorithm can be implemented as follows:
  let MaximumNegativeNumber be −9223372036854775808
  score(affinity-rule, pool)=>return score
    // for the cases where some match expression is satisfied
    for each matchExpression in rule:
      for each label in pool:
        if matchExpression.key==label.key &&
          matchExpression.OperatorMatches(matchExpression.values, label.value)
          return rule.Weight
    // for the cases where no match expression is satisfied
    if rule.enforcement==Required: return MaximumNegativeNumber  // indicates pool cannot be selected
    if rule.enforcement==Preferred: return 0
  score(anti-affinity-rule, pool)=>return score
    // for cases where some match expression is satisfied
    for each matchExpression in rule:
      for each label in pool:
        if matchExpression.key==label.key &&
          // if a match is found—return a negative score
          matchExpression.OperatorMatches(matchExpression.values, label.value)
          // if enforcement type is required—return MaximumNegativeNumber
          if rule.enforcement==Required: return MaximumNegativeNumber
          // if enforcement type is not required—return negative of rule.weight

```
       if  rule.enforcement==Preferred:  return-rule-
          .weight
// for cases where no match expression is satisfied
return 0
```

In the example matching algorithm above, the maximum negative score is set to −9223372036854775808. There are two score modules in the example algorithm, an affinity-rule module and an anti-affinity-rule module. Both modules address two cases during evaluation of the rule against a pool: when a match expression is satisfied and when no match expression is satisfied. Each score module runs a loop for each match expression in the rule against a pool. The match expression loop includes a sub-loop for each label in the pool. When a label matches a match expression for the affinity-rule module, the rule weight, or score, is returned. If no label matches any match expression for the affinity-rule module, then a maximum negative number is returned if the rule is required and a zero is returned if the rule is only preferred. For the anti-affinity-rule module, if a label matches a match expression, then a negative number is returned. If the rule is required, then the maximum negative number is returned. If the rule is only preferred, then the negative of the rule weight, or score, is returned. For the anti-affinity-rule module, if no label matches any match expression, then a score of zero is returned.

At 1108, rule scores are added for each candidate storage pool to generate a storage pool score for each candidate storage pool. In some embodiments, once a candidate storage pool receives a maximum negative score for just a single rule, then no other positive scores can be added to it. In other words, once a rule gives a maximum negative score for a candidate storage pool, the final storage pool score for that candidate storage pool will the maximum negative score.

In the matching algorithm example above, a pool score module can be included and implemented as follows:

```
for each pool:
    pool.Score=0
    for each rule:
        ruleScore=score(rule, pool)
        if ruleScore==MaximumNegativeNumber
            pool.Score=MaximumNegativeNumber
            stop evaluating further rules for this pool.
        else
            pool.Score=pool.Score+ruleScore
```

In the example above, the pool score for each pool is calculated by initializing the initial pool score to be zero and then running a rule loop that sets the new pool score to be the current pool score plus the rule score. If the rule score is the maximum negative score, then pool score is set to the maximum negative number and the rule loop exits early because no further rules need to be evaluated and added.

At 1110, a storage pool is selected among the set of candidate storage pools for provisioning the storage volume. In some embodiments, selecting the storage pool includes comparing each storage pool score to determine which candidate storage pool has the highest storage pool score. In such embodiments, the candidate storage pool that has the maximum storage pool score gets selected to provision the replica. If there are ties, then a storage pool is selected at random from the storage pools with the tied highest scores. If the highest score for all the storage pools is the maximum negative number, then the provisioning algorithm fails.

In some embodiments, if a candidate storage pool does not match a particular rule being applied, the rule score for that particular rule with regard to the candidate storage pool is a maximum negative score and the storage pool score for the candidate storage pool is also the maximum negative score. In some embodiments, the one or more rules allow a user to specify how the storage volume is provisioned across storage nodes in the storage node cluster. In some embodiments, each storage pool comprises a collection of similar storage disks. In some embodiments, storing data for the storage volume across the storage node cluster includes striping the data across only a subset of storage nodes in the storage cluster. In some embodiments, each storage node in the storage node cluster includes a matrix of every other storage node's provisioned, used, and available capacity in every storage pool in the storage node cluster. In some embodiments, each storage node in the storage node cluster knows the categorization of all storage pools as well as the geographical topology of every storage node in the storage node cluster.

In the matching algorithm example given above, a selection module can be included and implemented as follows:

sort each pool such that the pool with the maximum positive score is at the top of list.

if the pool at the top has a MaximumNegativeNumber as the score, then fail provisioning, else select that pool for the replica.

The selection module example above uses a sort function to choose the pool with the highest score. If the pool with the highest score has the maximum negative number, then the provisioning fails.

The following example illustrates applying two rules to six candidate pools for provisioning for Application A using the steps of the method described above. The pools are set up as follows:

node 1: region="us-east",zone="dc1",rack="b"
    pool 1: io_priority=high,region="us-east",zone="dc1",rack="b"
    pool 2: io_priority=low,region="us-east",zone="dc1",rack="b"
node 2: region="us-east",zone="dc2",rack="b"
    pool 1: io_priority=high,region="us-east",zone="dc2",rack="b"
    pool 2: io_priority=low,region="us-east",zone="dc2",rack="b"
node 3: region="us-east",zone="dc2",rack="b"
    pool 1: io_priority=high,region="us-east",zone="dc2",rack="b"
    pool 2: io_priority=low,region="us-east",zone="dc2",rack="b"

Given the setup above, if Application A wants two replicas (e.g., ha-level=2) provisioned with a io_priority=high label in two different zones, then the two rules can be implemented as follows:

```
Rule 1: type: replicaAffinity {
    weight: 10000
    enforcement: required
    list of matchExpressions:
    {
        key: io_priority
        operator: in
        values: high
    }
}
Rule 2: type: replicaAntiAffinity {
    enforcement: preferred
    weight: 100000
    topology: zone
}
```

Rule 1 focuses on io_priority being high and gives a weight of 10,000 if the rule matches. Since it is required, if a pool does not match rule 1, then a max negative score is assigned to that pool. Rule 2 focuses on replicas being provisioned across different zones. Since it is preferred, then a pool in the same zone as another replica is given a negative 100,000, but is not ruled out per se. In the example above, applying rule 1 to all six pools gives the following scores:
Applying rule 1 (replicaAffinity), scores of pools:
 node 1:
  pool 1: 10000 (since it has io_priority=high label)
  pool 2: MaximumNegativeNumber (since it does not have io_priority=high label)
 node 2:
  pool 1: 10000 (since it has io_priority=high label)
  pool 2: MaximumNegativeNumber (since it does not have io_priority=high label)
 node 3:
  pool 1: 10000 (since it has io_priority=high label)
  pool 2: MaximumNegativeNumber (since it does not have io_priority=high label)
Applying rule 2 to the six pools gives the following scores:
Applying rule 2 (replicaAnti-Affinity), scores of pools remain
 node 1:
  pool 1: 10000 (since it has io_priority=high label)
  pool 2: MaximumNegativeNumber (since it does not have io_priority=high label)
 node 2:
  pool 1: 10000 (since it has io_priority=high label)
  pool 2: MaximumNegativeNumber (since it does not have io_priority=high label)
 node 3:
  pool 1: 10000 (since it has io_priority=high label)
  pool 2: MaximumNegativeNumber (since it does not have io_priority=high label)

Notice that the scores remain unchanged after application of rule 2. This is because the rule applies to replicas being provisioned across different zones. Since no pools have been selected yet, no replicas have been made. Consequently, all pools received a score of zero after application of rule 2 at this stage.

In the example given above, since pool 1 from all three nodes have the same score, then a pool is randomly chosen among the top three. For the purposes of this example, pool 1 from node 3 will be randomly selected.

For provisioning the second replica, the first selected pool is removed as a candidate, and the rules are applied again to the remaining candidates. Applying rule 1 to the five remaining candidate pools returns the following scores:
Applying rule 1 (replicaAffinity), scores of pools:
 node 1:
  pool 1: 10000 (since it has io_priority=high label)
  pool 2: MaximumNegativeNumber (since it does not have io_priority=high label)
 node 2:
  pool 1: 10000 (since it has io_priority=high label)
  pool 2: MaximumNegativeNumber (since it does not have io_priority=high label)
 node 3:
  pool 2: MaximumNegativeNumber (since it does not have io_priority=high label)

Once again, pool 1 from nodes 1 and 2 receive a positive score of 10,000. After applying rule 2, the scores are updated as follows:
Applying rule 2 (replicaAnti-Affinity)
 node 1:
  pool 1: 0//total score: 10000
  pool 2: 0//total score: MaximumNegativeNumber
 node 2:
  pool 1: −100000//total score: (−100000+10000=−99000)
  pool 2: −100000 // total score: (−100000+ MaximumNegativeNumber=MaximumNegativeNumber)
 node 3:
  pool 2: −100000 // total score: (−100000+ MaximumNegativeNumber=MaximumNegativeNumber)

In the example above, after applying rule 2 to the remaining candidates for the second round, both pools from node 2, as well as pool 2 from node 3, receive −100,000 because both nodes have a zone of "dc2". This means that the system would prefer not to select any pools from zone="dc2", since the first replica is selected from there.

After applying rule 2, the total scores for each remaining candidate pool are sorted, giving the following results:
1) Node1pool1=10,000
2) Node2pool1=−99,000
3) Node1pool2=MaximumNegativeNumber
3) Node2pool2=MaximumNegativeNumber
3) Node3pool2=MaximumNegativeNumber Since pool 1 from node 1 has the highest score, then that pool is selected for provisioning the second replica for Application A. Thus, the volume provisioning algorithm selected pool 1 from node 3 and pool 1 from node 1 to provision the two replicas.

Method 1100 describes a method for implementing a rule-based provisioning system that allows for heterogeneous distributed systems to maintain high availability, capacity management, and performance. To avoid hot spots in a cluster, current clustered distributed storage systems shard volumes across however many nodes are in a cluster. For example, if a cluster has 100 nodes, then data is sharded across all 100 nodes. However, this only works if the cluster is homogenous, e.g., every node looks the same from a CPU, memory, and storage disk standpoint. In heterogeneous distributed systems, avoiding hot spots in such a manner is very difficult and sometimes not possible. In addition, sharding data to avoid hot spots in such a manner only works in a disaggregated system. In a hyperconverged system sharding data in such a manner can still lead to hot spots on the active compute nodes. By implementing a rule-based provisioning system, techniques and mechanisms presented herein allow for efficient sharding across similar disk pools in a heterogeneous system. In addition, such system can even identify and select the best type of disk pools for provisioning certain volumes.

In some embodiments, rule-based provisioning may not be enough. There may be certain situations where optimization includes provisioning based on the requirements and preferences of the applications running on the nodes. Thus, in some embodiments, application aware provisioning can provide provisioning based on rules that are application specific. FIGS. 12-17 describe examples of a system for implementing application aware provisioning.

Figure 12:
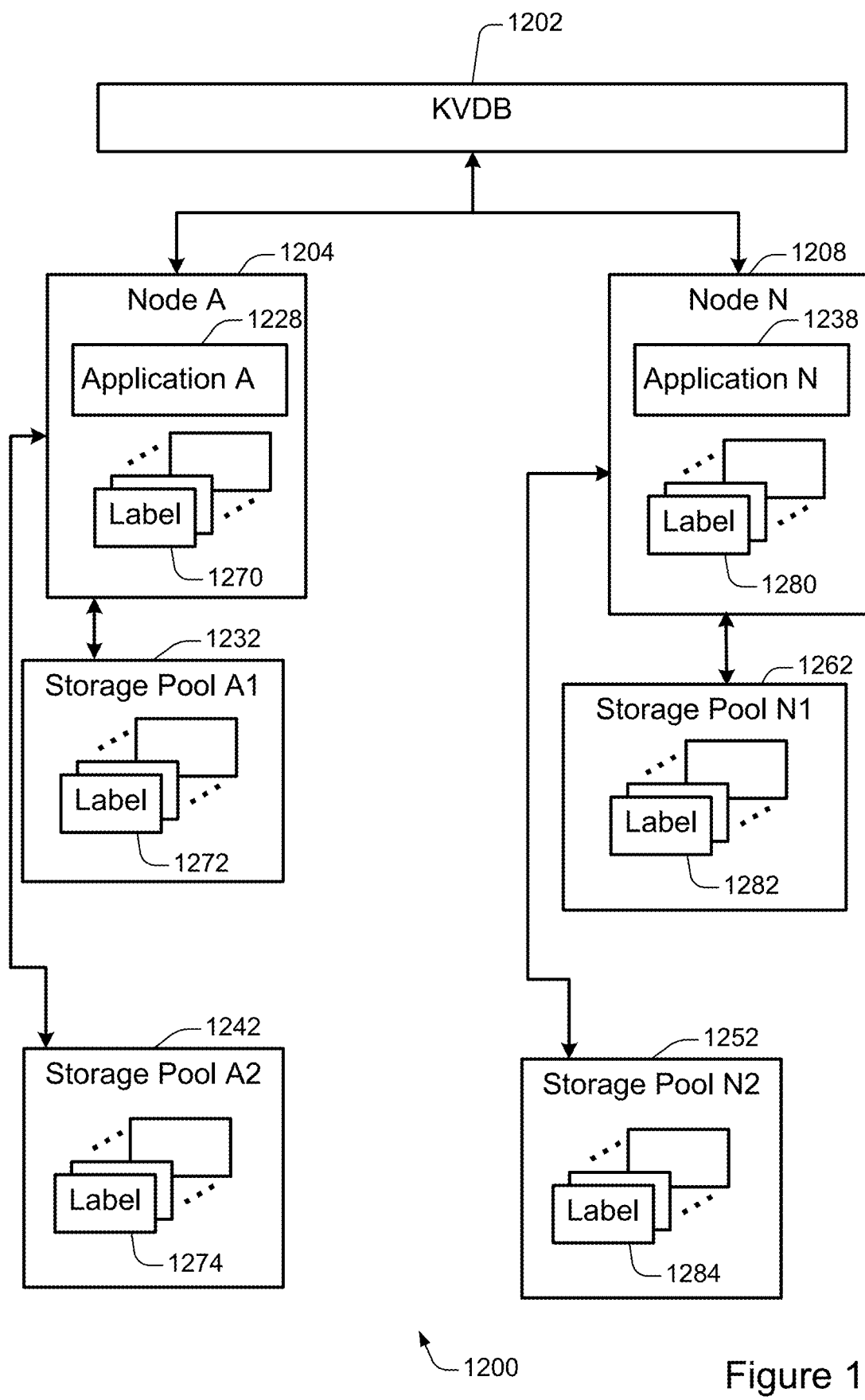
FIG. 12 illustrates an example of labels being used in a distributed storage system, configured in accordance with one or more embodiments.

FIG. 12 illustrates an example of labels being used in a distributed storage system 1200, configured in accordance with one or more embodiments. The storage system 1200 includes a clustered key-value database (KVDB) 1202 in communication with a plurality of application nodes 1204 and 1208. Node A 1204 has Application A 1228 running on it, while Node N 1208 has Application N 1238 running on it. Each node has access to zero or more storage pools such as the storage pools A1 1232, A2 1242, N1 1262, and N2 1252. Each storage pool includes storage space on one or more disks associated with the storage pool in order to store zero or more volumes. FIG. 12 shows a state of system 1200 where no volumes are currently stored on any of the storage pools.

In some embodiments, KVDB 1202 is configured to serve as the single source of truth for an entire cluster. In some embodiments, KVDB 1202 maintains cluster membership information as well as configuration for every volume, if any. In some embodiments, KVDB 1202 also maintains a monotonically increasing cluster version number. In such embodiments, this version number ensures update and communication order in a distributed system.

In some embodiments, KVDB 1202 communicates with nodes 1204 and 1208 solely in a control path. In such embodiments, KVDB 1202 is not in the datapath for the nodes. In some embodiments, KVDB 1202 is configured to be periodically snapshotted and the key-value space is also periodically saved. Thus, in such embodiments, KVDB 1202 can be reconstructed in case of a disaster.

According to various embodiments, the clustered storage system 1200 shown in FIG. 12 may be implemented in any of various physical computing contexts. For example, some or all of the components shown in FIG. 12 may be implemented in a cloud computing environment such as Amazon Web Services (AWS), Microsoft Azure, or Google Cloud. As another example, some or all of the components shown in FIG. 12 may be implemented in a local computing environment such as on nodes in communication via a local area network (LAN) or other privately managed network.

In some implementations, a node is an instance of a container system implemented on a computing device. In some configurations, multiple nodes may be implemented on the same physical computing device. Alternately, a computing device may contain a single node.

According to various embodiments, each node may be configured to instantiate and execute one or more containerized application instance. Each node may include many components not shown in FIG. 12. These components may include hardware components, and/or software components, such as those discussed herein.

According to various embodiments, a storage pool may provide access to physical storage resources for a storage node. Each storage node may include some number of disks. The disks may be accessible to the storage nodes via a network. For example, the disks may be located in storage arrays containing potentially many different disks. In such a configuration, which is common in cloud storage environments, each disk may be accessible for potentially many nodes to access. A storage pool such as pool 1232 may include potentially many different disks. In some embodiments, a storage pool includes many different disks of the same type and size. In other embodiments, all the disks in a storage pool have some other common factor to warrant grouping together into the same storage pool.

In some embodiments, the nodes have one or more labels associated with the nodes. For example, Node A 1204 has labels 1270, while Node N 1208 has labels 1280. In addition, the storage pools also include one or more labels, such as labels 1272, 1274, 1282, and 1284.

According to various embodiments, the one or more labels can be used in provisioning rules. For example, a provision rule can be written to provision volumes that have random I/O latencies less than 2 ms or io_priority high. Provisioning rules are discussed in previously with regard to FIG. 11.

In some embodiments, labels can give hierarchical system topology information. For example, the one or more labels can include information regarding the region, zone, data center (DC), row, rack, hypervisor, and node corresponding to a storage pool or storage node. In some embodiments, labels are implemented as arbitrary strings of the form [labelKey]=[Value]. For example, the labels region="us-east", zone="dc-one", rack="rack-1", and row="20" represent just some of the labels used in the systems provided. In some embodiments, the information in the one or more labels is auto discovered in the cloud from orchestration system labels. In some embodiments, the information in the one or more labels is passed in as environment variables.

In some embodiments, each storage pool inherits the labels of its respective node. For example, Storage Pool A1 1232 has labels 1272, which inherit labels 1270 from Node A 1204. Similarly, Storage Pool A2 1242 has labels 1273, which also inherit labels 1270. Analogously labels 1282 and 1284 inherit labels 1280.

Figure 13:
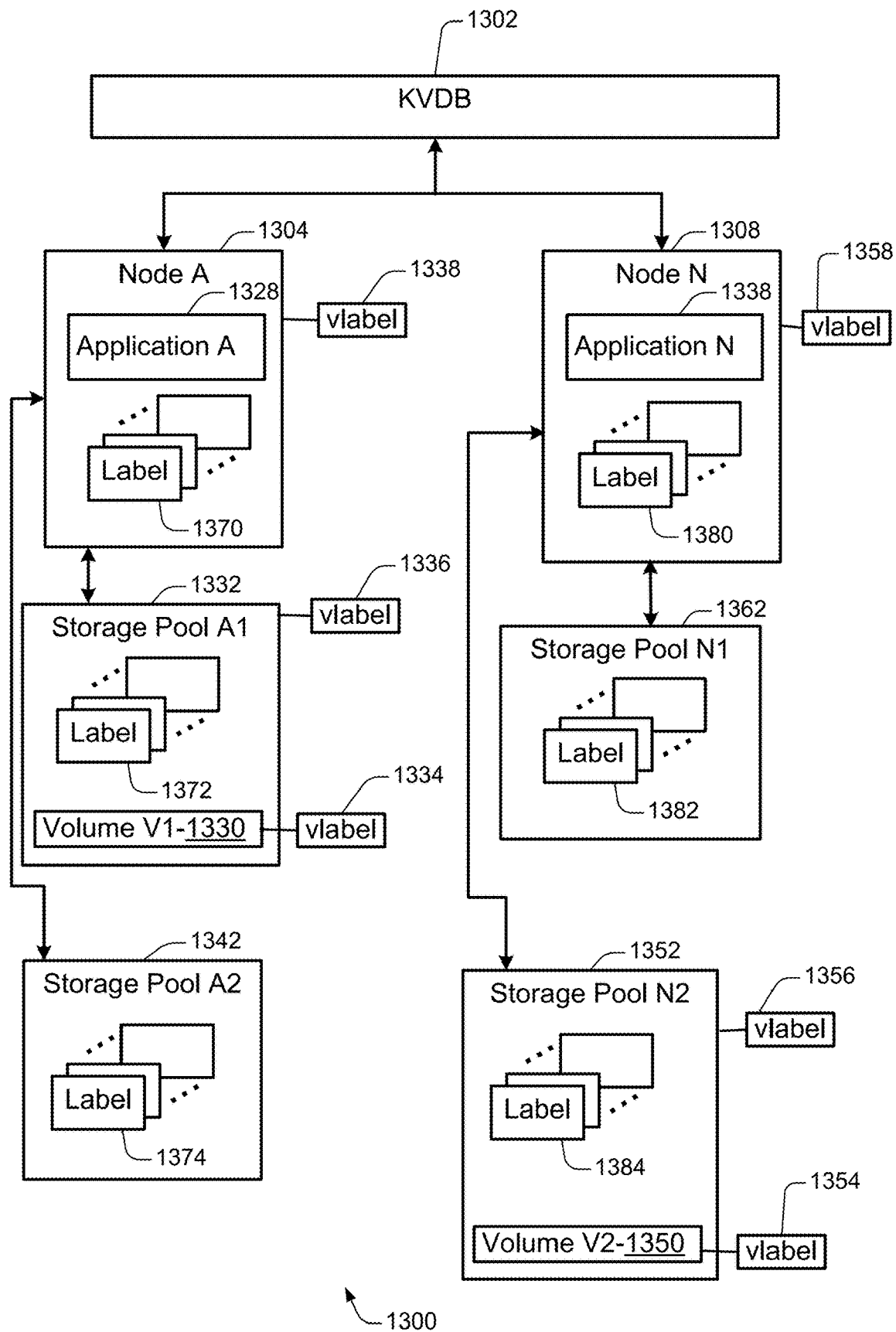
FIG. 13 illustrates an example of labels being used in distributed storage system that supports application aware provisioning, configured in accordance with one or more embodiments.

FIG. 13 illustrates an example of labels being used in distributed storage system 1300 that supports application aware provisioning, configured in accordance with one or more embodiments. System 1300 is analogous to system 1200, except with volumes created and stored in storage pools. Like storage system 1200, storage system 1300 includes a clustered key-value database (KVDB) 1302 in communication with a plurality of application nodes 1304 and 1308. Node A 1304 has Application A 1328 running on it, while Node N 1308 has Application N 1338 running on it. Each node has access to zero or more storage pools such as the storage pools A1 1332, A2 1342, N1 1362, and N2 1352. Each storage pool includes storage space on one or more disks associated with the storage pool in order to store zero or more volumes. FIG. 13 shows a state of system 1300 where two volumes, volume V1 1330 and volume V2 1350, are currently stored on some of the storage pools.

System 1300 includes analogous features and elements to system 1200, and as such, incorporates all the descriptions of the analogous elements. One difference is the provisioning of volumes in storage pools. As shown in FIG. 13, volume V1 1330 is created and stored on storage pool A1 1332. In some embodiments, the provisioning of volume V1 1330 on storage pool A1 1332 was application aware. In such embodiments, volume V1 1330 also receives a volume specific label 1334. In some embodiments, such a label may take the form "app=[application name]." For example, vlabel 1334 may be "app=Application A," corresponding to Application A 1328. In some embodiments, storage pool A1 1332 also receives a volume specific label, vlabel 1336. In some embodiments, such a label reflects the same application label as vlabel 1334. In some embodiments, even node A 1304 receives a volume specific label vlabel 1338, which reflects the same application label as vlabels 1334 and 1336. Similarly, volume V2 1350 receives vlabel 1354, and storage pool N2 1352 and node N 1308 receive corresponding vlabels 1356 and 1358, respectively. Although vlabel 1334 was described as corresponding with Application A 1328, it should be noted that vlabel 1334 can also contain information identifying Application N 1338 in alternative embodiments. Thus, the volume specific vlabels do not necessarily have to identify the application running on the node where the volume is located. In some embodiments, the volume specific labels do not even identify any application, but rather contain entirely different information altogether.

In some embodiments, the nodes and storage pools inherit the volume specific labels associated with the specific volume or volume replica stored. In some embodiments, these labels remain with the pool/node as long as the pool has the volume or volume replica. In such embodiments, the volume specific label is applied when the volume or volume replica is created and then subsequently deleted when the volume or volume replica is deleted.

For simplicity, system 1300 is shown with only one volume on each storage pool. However, multiple volumes can be stored on any storage pool. In such cases, each volume has their own specific label and the storage pool and the corresponding node all receive the volume specific labels corresponding to each volume stored in the storage pool. Thus, a storage pool and/or node can have multiple volume specific labels.

As previously mentioned, the volume specific labels allow system 1300 to implement application aware provisioning. This is because the volume specific labels allow for the system to provision the volumes according to requirements or preferences of an application. The information regarding these labels is available through KVDB 1302, which communicates with nodes 1304 and 1308. The volume specific labels allow for a level of granularity finer than traditional storage systems, which concentrate on storage and not the applications themselves. This finer level of granularity is what allows the system to be able to implement application aware provisioning.

In some embodiments, in order to implement application awareness into a system, two more rules may be defined: a volume-affinity-rule and a volume-anti-affinity-rule. The volume-affinity-rule selects pools that satisfy the rule, using only volume labels of the pool when matching the rule. The volume-anti-affinity-rule selects pools which do not satisfy this rule, using only volume labels of the pool when matching the rule.

Figure 14:
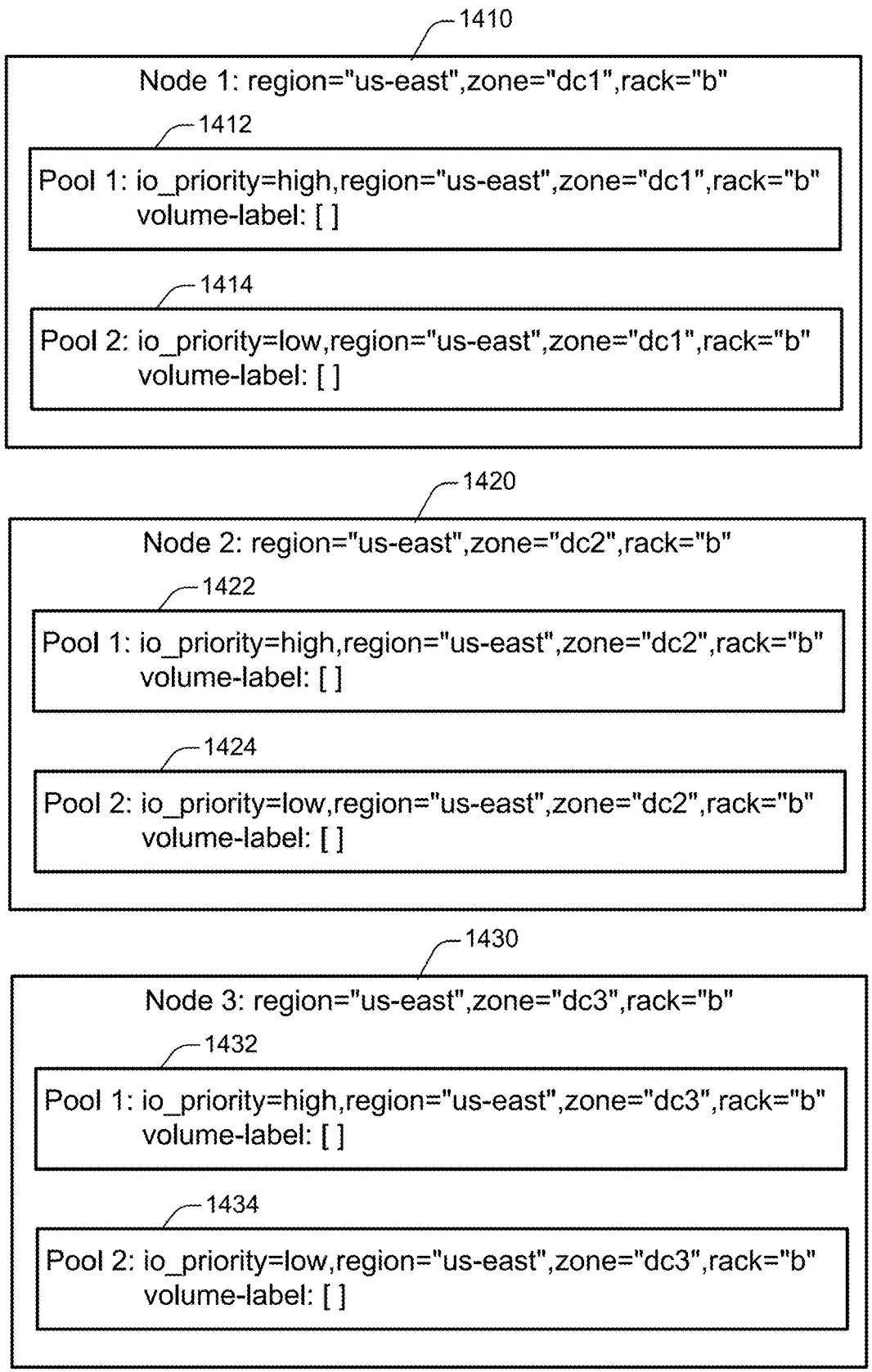
FIG. 14 illustrates an example of candidate storage pools before provisioning a volume, configured in accordance with one or more embodiments.

FIGS. 12 and 13 demonstrate how a system can be configured to implement application aware provisioning. The following example demonstrates how application aware provisioning can be implemented on a set of candidate storage pools. The setup of the nodes and candidate pools in a distributed system 1400 for this example is reflected in FIG. 14. In FIG. 14, node 1 1410 has zone "dc1," node 2 1420 has zone "dc2," and node 3 1430 has zone "dc3." In the example, an application named Cassandra is running on a node and wants to create two separate volumes such that each of the volumes is on a different zone. In this example, the rule list is only one rule:

rule {
  type: volume-anti-affinity {
  enforcement: required
  weight: 10000
  topology: zone
  list of matchExpressions:
    {
    key: app
    operator: in
    values: cassandra
    }
  }
}

It should be noted that the weight for the rule is 10,000. However, since it is a "requirement" enforcement rule, then any non-compliance receives the max negative score. If the enforcement field were "preferred," then a weight of 10,000 would be given for compliance and non-compliance would receive a score of zero for the rule. For the first volume, 1 replica is selected using the above rule. As shown in FIG. 14, currently the pools only have pool and node labels because no replicas for any volumes were created. Thus, applying the volume-anti-affinity rule above, each of pools 1412, 1414, 1422, 1424, 1432, and 1434 receive a score of zero, since there is no match. After applying the rule to the candidate pools for the first time, the scores for each candidate pool are as follows:

node 1:
  pool 1: 0
  pool 2: 0
  node 2:
  pool 1: 0
  pool 2: 0
  node 3:
  pool 1: 0
  pool 2: 0

Figure 15:
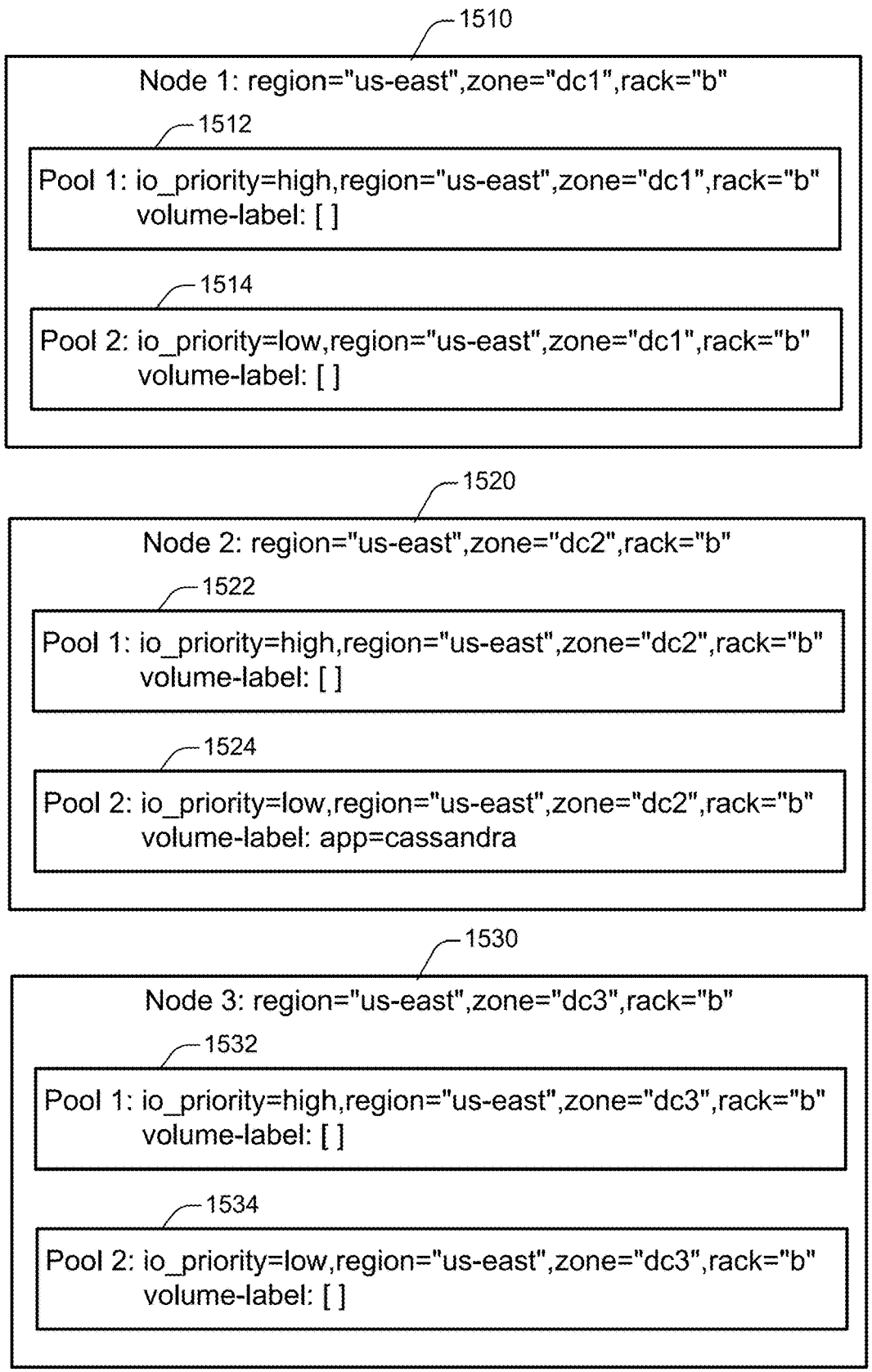
FIG. 15 illustrates an example of storage pools after an application aware provisioning of a volume, configured in accordance with one or more embodiments.

As with rule-based provisioning described above, ties are resolved by randomly selecting a node and pool pair. In this example, pool 2 1424 of node 2 1420, is randomly selected to host the replica of the first volume. Since a new volume is created, the pool which hosts the new volume replica now inherits the volume labels. FIG. 15 reflects the state of the system 1400 in FIG. 14 after a new volume is created. System 1500 is analogous to system 1400, except that pool 2 1524 in node 2 1520 now has the volume label app=Cassandra.

For creating the second volume, a replica needs to be selected once again by applying the same rule above. Since the rule specifies the topology field to be "zone," the system uses the zone label to determine other pools. Meaning, any pools within the same "zone" as a pool with a Cassandra label is disqualified from consideration. Referring back to the example, now, only pools 1512, 1514, 1532, and 1534 do not match the volume-anti-affinity rule. Thus, pools 1512, 1514, 1532, and 1534 still receive a score of zero. Pool 1524, however, does match the volume-anti-affinity rule, since it now has the volume label app=Cassandra. Since pool 2 1524 matches, it receives the maximum negative score. In addition, because pool 2 1524 has the zone of "dc2," any pools with the same "dc2" zone are also matched by the rule. Thus, pool 1 1522 also has zone=dc2, then pool 1 1522 also receives the maximum negative number. Thus, after applying the rule a second time to all the candidate pools, the scores are reflected as follows:

node 1:
  pool 1: 0
  pool 2: 0
  node 2:
  pool 1: MaximumNegativeNumber
  pool 2: MaximumNegativeNumber
  node 3:
  pool 1: 0
  pool 2: 0

Once again, sorting by score, there is a tie between pools 1512, 1514, 1532, and 1534, since each of those pools has a score of zero. Thus, for the second volume, pool 1 1512 is randomly selected. In the example given above, the objective of not selecting the same zone for two different volumes, based on application awareness, was achieved. Although not shown in FIG. 15, in some embodiments, node 2 1520 also inherits volume label app=Cassandra. However, for the purposes of this example, having the node inherit the label was not necessary to achieve the goal. Thus, in some embodiments, the nodes do not necessarily inherit the same volume labels as the pools on which the volumes are created, so long as the rules are configured such that application aware provisioning may still be achieved.

Figure 16:
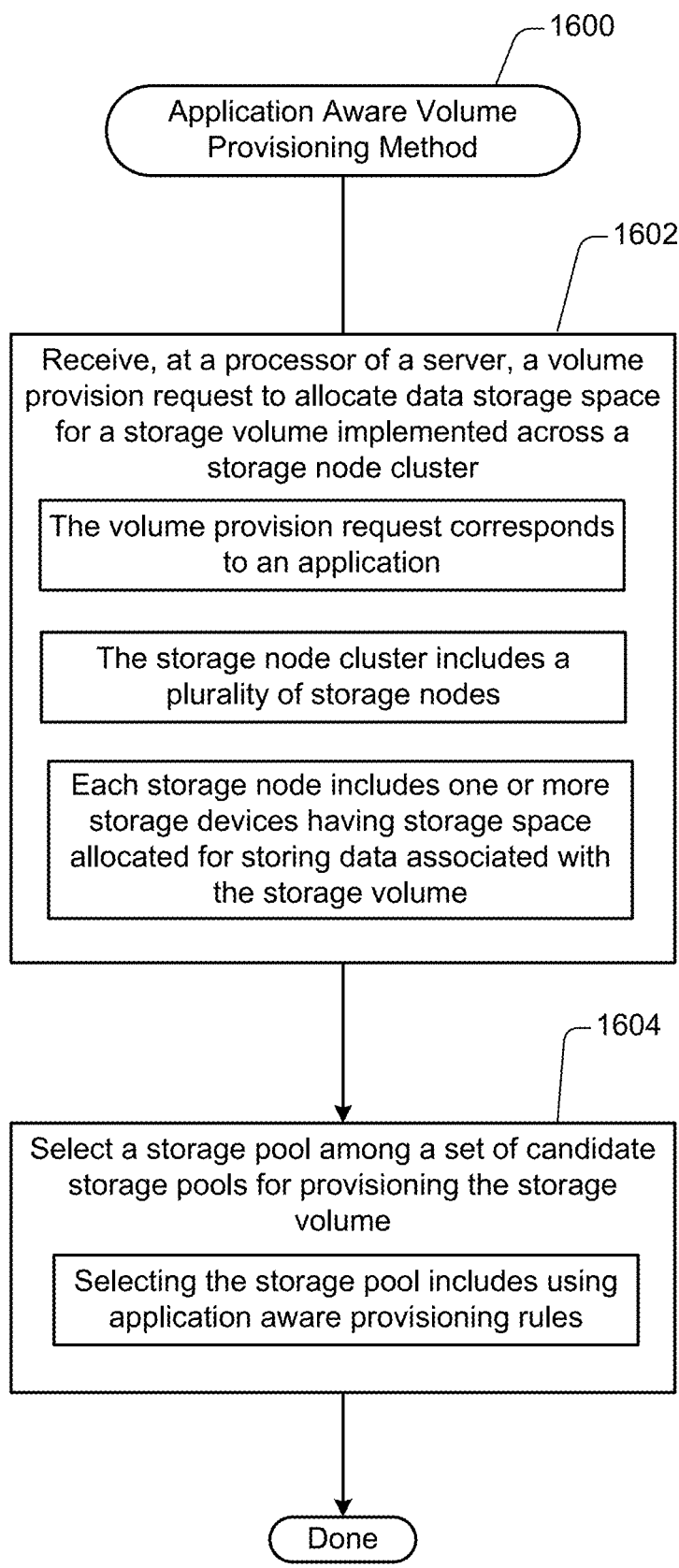
FIG. 16 illustrates a flow chart of an example of a method for application aware volume provisioning, configured in accordance with one or more embodiments.

FIG. 16 illustrates a flow chart of an example of a method for application aware volume provisioning, configured in accordance with one or more embodiments. Method 1600 can be implemented on any of the systems disclosed herein.

Method 1600 begins with receiving (1602), at a processor of a server, a volume provision request to allocate data storage space for a storage volume implemented across a storage node cluster. In some embodiments, the volume provision request corresponds to an application. In some embodiments, the storage node cluster includes a plurality of storage nodes. In some embodiments, each storage node includes one or more storage devices having storage space allocated for storing data associated with the storage volume.

After the provisioning request is received, a storage pool among a set of candidate storage pools is selected (1604) for provisioning the storage volume. In some embodiments, selecting the storage pool includes using application aware provisioning rules. In some embodiments, the application aware provisioning rules include a volume affinity rule or a volume anti-affinity rule. Volume affinity and anti-affinity rules are described in further detail below. In some embodiments, selecting a storage pool among a set of candidate storage pools for provisioning the storage volume includes using volume labels corresponding to pools and/or nodes. In some embodiments, volume specific labels allow for application aware provisioning when combined with a rule-based approach, as described above.

In some embodiments, the volume labels identify the application. However, in other embodiments, the volume labels can be any volume specific label as long as it allows the system to implement application aware provisioning. In some embodiments, volume labels can contain any information, even if not used for application aware provisioning.

In some embodiments, application aware provisioning rules depend on requirements or preferences of the application. As shown in the examples above, applications such as Cassandra may require that volumes be provisioned on different physical devices. In addition, application aware provisioning rules even allow the system to handle arbitrary, or even user defined, requirements for replica placement.

In some embodiments, selecting a storage pool among a set of candidate storage pools includes choosing the candidate storage pool with the highest volume rule score. As described above with rule-based provisioning, scores can be assigned to candidate pools after rules are applied. The candidate pools with the highest scores are selected to store the volume replica. In some embodiments, in the case of candidate pools with the same scores, a candidate pool with the highest tied score is randomly selected.

In some embodiments, a selected pool is assigned a new volume label if a volume label is not already assigned to the selected pool. In some embodiments, the pool and its corresponding node both inherit the volume label of a volume. In some embodiments, the labels of each pool and node are available to other nodes via the KV DB.

The steps and methods disclosed above are presented in terms of rule-based provisioning and application aware provisioning. However, steps of different methods can be mixed and matched to achieve the desired goals for a system design. For example, some rule-based provisioning steps can be combined with application aware provisioning to achieve desired goals. In addition, different elements of systems disclosed can also mixed and matched to achieve the desired result.

Method 1600 describes a method for application aware provisioning. Application aware provisioning offers many improvements over standard storage based provisioning in a containerized application environment. One improvement is that applications have great flexibility with regard to fault domain creation. For example, applications with specific requirements, such as Cassandra, can be implemented in the containerized application system and not worry about its application specific requirements, such as two volumes being provisioned in different zones, being accidentally violated, as the case in standard virtualized systems that do not have application aware provisioning.

Another improvement provided by the techniques and mechanisms presented herein is performance. If a system has 100 volumes and only 5 are known to be active, the ability to describe the resources during provisioning can help minimize the chances that the 5 active volumes end up on the same node, thereby minimizing the chances of performance delays caused by random provisioning. In addition, rule-based and/or application aware provisioning ensures that backing storage can provide a certain level of performance. Further, application aware provisioning protect against the I/O bandwidth being consumed by certain types of applications by being capable of discerning the type of applications themselves. For example, a storage system would not want to run test and prod applications on the same server because the test application would start consuming resources that the prod application would normally need from the I/O bandwidth in order to maintain a certain threshold level of performance. Standard provisioning in current distributed storage systems would not be able to discern application types to prevent this issue. However, this problem can be solved using a provisioning rule.

Yet another example of improvements the techniques and mechanisms presented herein provide is that of volume anti-affinity. Current distributed storage systems decoupled provisioning of storage volumes from the applications. Thus, applications with different storage requirements may run less effectively, depending on the volume placements on the storage nodes. The techniques and mechanisms presented herein provide an improvement over current distributed systems because the rule-based volume provisioning allows for application aware volume provisioning. Thus, high availability, capacity management, and performance can be maintained no matter the type of application. For example, in current systems, a 100 GB aggregated storage volume may be striped across 10 storage volumes such that each storage volume stores 10 GB of the aggregated storage volume. However, because storage is virtualized, the storage volumes may all end up on the same physical device on the backend. This can be problematic for database applications like Cassandra because one of the requirements for Cassandra is that there is no single point of failure. However, if all the volumes land on the same physical device on the backend, then in that case, there is technically a single point of failure, which is unacceptable for running a Cassandra application. Thus, the techniques and mechanisms provide an improvement to distributed systems technology by implementing label-based rules that can take into account the anti-affinity requirements of applications, such as Cassandra, to ensure that the volumes land on different physical devices. Consequently, these label based rules provide more efficient and efficacious volume provisioning while maintaining capacity management, high availability, and performance for a variety of applications.

Yet another example of the improvements the techniques and mechanisms presented herein provide is the ability to co-locate, or the ability to specify volume affinity. As mentioned above, current distributed storage systems shard data across all nodes in a cluster. However, some applications benefit from hyperconverged access to storage volumes or access to two volumes from the same datacenter.

Current systems lack the ability to co-locate for certain applications, but this type of affinity can be implemented using provision rules.

In some embodiments, by default, volumes are provisioned throughout the cluster and across configured failure domains to provide fault tolerance. While this default manner of operation works well in many scenarios, a user may wish to control how volumes and replicas are provisioned more explicitly. Thus, in some embodiments, the user can control provisioning by creating a VolumePlacementStrategy API object.

Within a VolumePlacementStrategy API object, a user can specify a series of rules which control volume and volume replica provisioning on nodes and pools in the cluster based on the labels they have.

Figure 17:
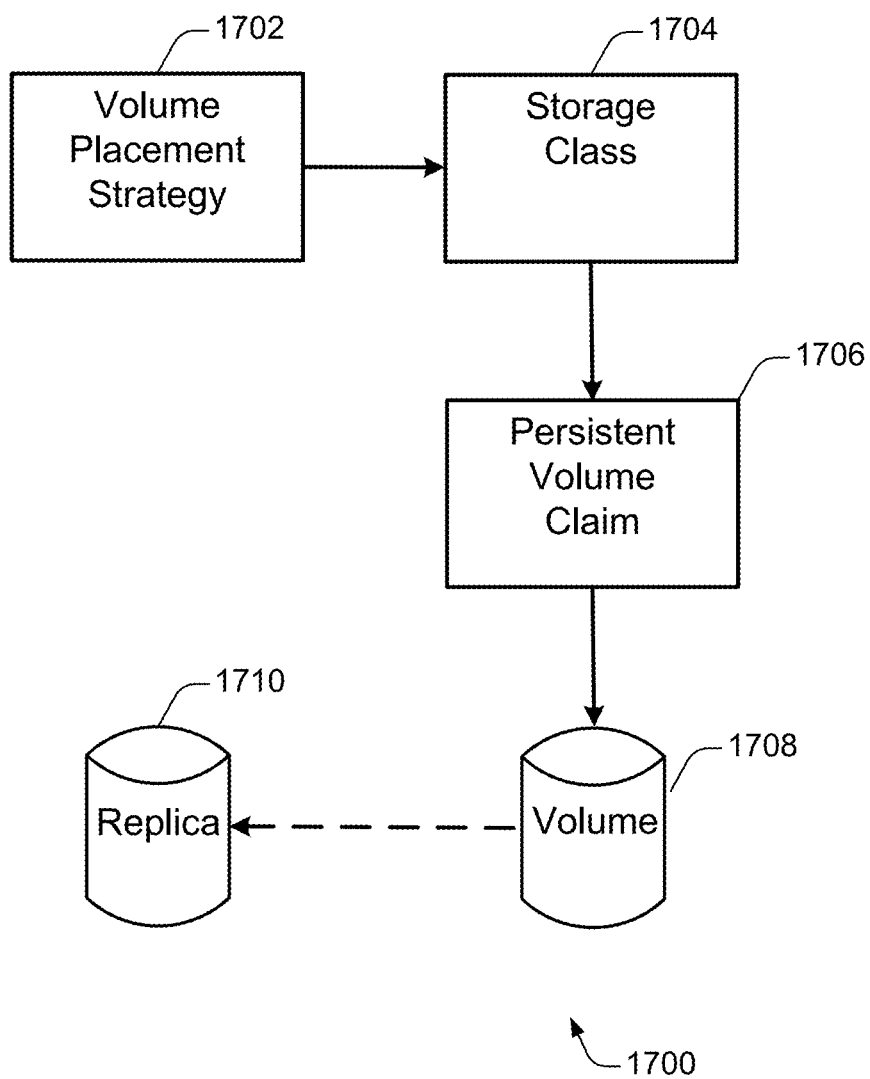
FIG. 17 illustrates a block diagram of class relationships in an example application programming interface (API), configured in accordance with one or more embodiments.

FIG. 17 illustrates a block diagram showing class relationships in an example API setup. API 1700 shows a VolumePlacementStrategy object 1702 linking to a StorageClass object 1704. In some embodiments, the link is achieved via a StorageClass placement_strategy parameter. In some embodiments, a user can make a request for storage via a PersistentVolumeClaim (PVC) object 1706, which refers to the StorageClass object 1704. In such embodiments, all PVCs 1706 that refer to StorageClass 1704 must consequently adhere to the linked VolumePlacementStrategy 1702 rules. Volumes 1708 that are provisioned from the PVCs are placed, and have their replicas 1710 placed, according to the rules defined in the placement strategy.

Figure 18:
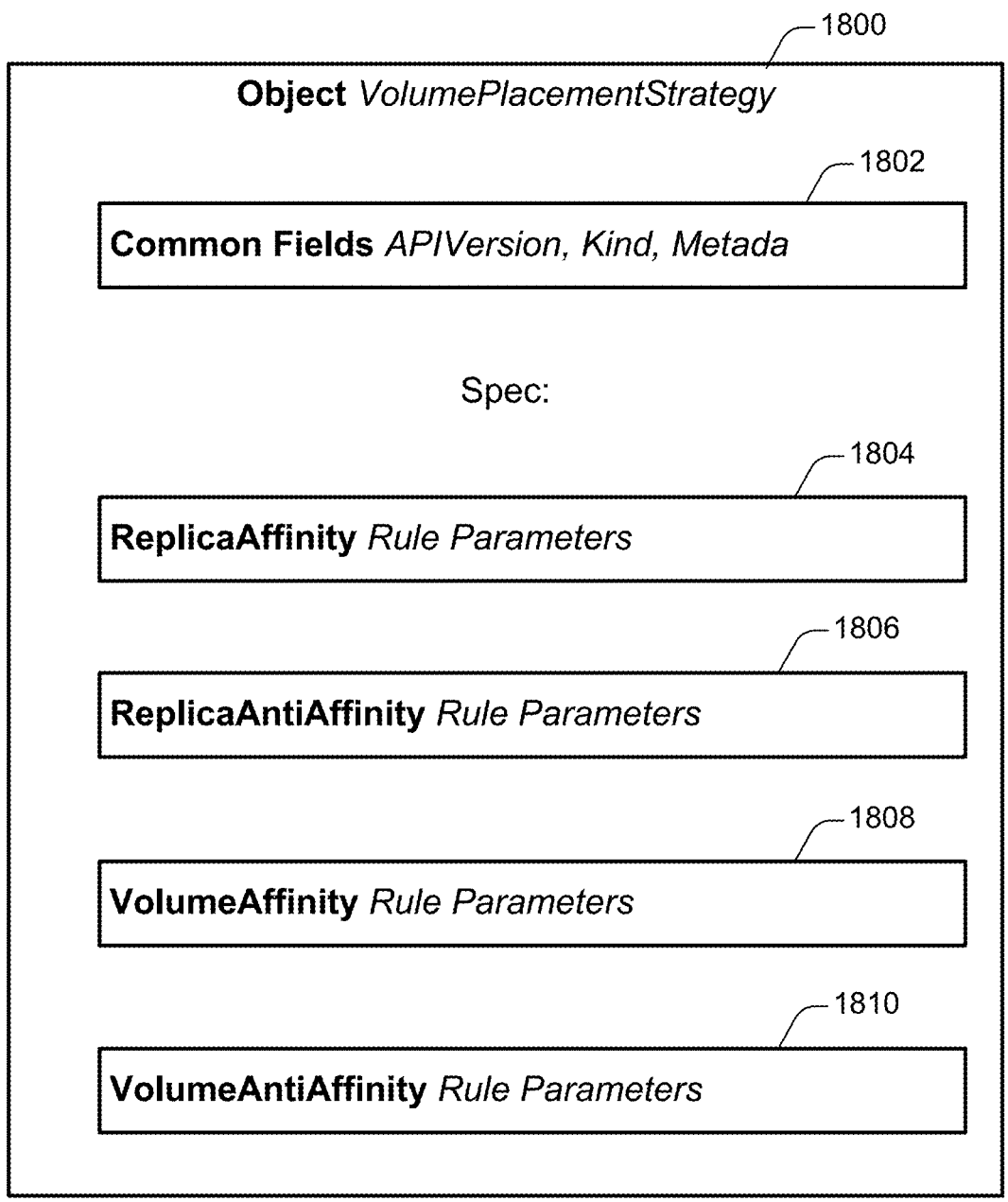
FIG. 18 illustrates an example of a VolumePlacementStrategy object, configured in accordance with one or more embodiments.

According to various embodiments, a user can define a placement strategy by creating a VolumePlacementStrategy object and adding affinity rule sections to the specification section of the object. FIG. 18 illustrates an example of a VolumePlacementStrategy object 1800. In some embodiments, a user can create VolumePlacementStrategy object 1800 by first creating a YAML file. In some embodiments, the user can then specify a few common fields 1802, such as apiVersion, kind, and metadata. Then, the user can add in affinity or anti-affinity rules to the specification section. Affinity and anti-affinity rules instruct the system on where to place volumes and volume replicas within the cluster.

The replicaAffinity section 1804 allows the user to specify rules relating replicas within a volume. The user can use these rules to place replicas of a volume on nodes or pools which match the specified labels in the rule. The user can constrain the replicas to be allocated in a certain failure domain by specifying the topology key used to define the failure domain.

The replicaAntiAffinity section 1806 allows the user to specify a dissociation rule for replicas within a volume. The user can use this to allocate replicas across failure domains by specifying the topology key of the failure domain.

The volumeAffinity section 1808 allows the user to colocate volumes by specifying rules that place replicas of a volume together with those of another volume for which the specified labels match.

The volumeAntiAffinity section 1810 allows the user to specify dissociation rules between 2 or more volumes that match the given labels. This section can be used when the user wants to exclude failure domains, nodes or storage pools that match the given labels for one or more volumes.

One example of a VolumePlacementStrategy object 1800 is reproduced below:
//common fields
apiVersion: portworx.io/v1beta2
kind: VolumePlacementStrategy
metadata:
  name: <your_strategy_name>
spec:
  replicaAffinity: <1>
  key: media_type <2>
  operator: In <3>
  values:
    "SSD"<4>

The example above instructs the system how to perform provisioning under a single replicaAffinity rule. In the example, replicaAffinity directs the system to create replicas under the preferred conditions defined beneath it. The key specifies the media_type label, which directs the system to create replicas on pools which have the "media_type" label. The operator specifies the In operator, directing the system to create replicas in the media type. The values parameter specifies the SSD label, directing the system to create replicas on SSD pools.

In some embodiments, how a user chooses to place and distribute the volumes and replicas depends on the kinds of apps the user is running on the cluster, the cluster topology, and the user's goals. The following examples illustrate two common uses of VolumePlacementStrategies: volume placement use-case and replica placement use-case.

Use-Case 1: Volume Placement Use-Cases

One example of a volume placement use-case is when an application relies on multiple volumes, such as a webserver. If the volumes are distributed over multiple nodes, the app may be subject to latency, and the cluster may become congested with unnecessary network activity. The user can avoid this by creating a VolumePlacementStrategy object, which colocates the app's volumes on the same set of nodes and pools, using the following:
apiVersion: portworx.io/v1beta2
kind: VolumePlacementStrategy
metadata:
  name: webserver-volume-affinity
spec:
  volumeAffinity:
    matchExpressions:
      key: app
        operator: In
        values:
          webserver If an app performs replication internally, such as Cassandra, then the user would want to distribute volumes across failure zones. Otherwise, a node failure may disrupt services. The user can avoid this by creating a VolumePlacementStrategy object, which distributes the app's volumes over multiple failure zones, using the following:
apiVersion: portworx.io/v1beta2
kind: VolumePlacementStrategy
metadata:
  name: webserver-volume-affinity
spec:
  volumeAntiAffinity:
    topologyKey: failure-domain.beta.kubemetes.io/zone Use-Case 2: Replica Placement Use-Cases One example of a replica placement use-case is when an app has a replication factor of 2. If the user does not distribute replicas across failure zones, a node failure may disrupt services. The user can avoid this by creating a VolumePlacementStrategy object, which distributes the app's replicas over multiple failure zones, using the following:
spec:
  replicaAntiAffinity:
    topologyKey: failure-domain.beta.kubemetes.io/zone Another example of a replica placement use-case is when an app is running on a cloud cluster. Some cloud providers' zones can be more expensive, depending on demand. A user can avoid this by creating a VolumePlacementStrategy object, which restricts the app's replicas to a cheaper zone, using the following:

spec:
  replicaAffinity:
  matchExpressions:
    key: failure-domain.beta.kubernetes.io/zone
      operator: NotIn
      values:
        "us-east-1 a"

In some embodiments, in the heterogeneous systems described above, each node has a collection of disks which are grouped together into pools. In such embodiments, each pool has a set of labels assigned to them (e.g., iops, medium, node, zone, region, rack, etc.), as well as property labels (e.g., total space, used space, provisioned space, etc.). In some embodiments, each pool may host replicas for multiple volumes.

In some embodiments, over a period of time, pools and volumes may be added, used, or removed, thereby causing imbalance in terms of provisioning and pool usage. Many different events and conditions can cause imbalances. For example, adding new nodes/pools to a cluster or removing volumes form a cluster can cause imbalances. Certain conditions, such as when pools become full, or when nodes/pool fail, can also cause imbalances.

Imbalances cause inefficient usage of storage space in storage node clusters. Imbalances can also hinder capacity, high availability, and performance. For example, if certain nodes become full, they no longer have capacity for new storage. In addition, if a node is storing a lot of volumes, then it may not be able to guarantee a minimum IOPS needed to service certain volumes it is storing. Further, if a node fails, then movement of volumes from that node to another working node may become necessary. However, in order to maintain a certain level of capacity, high availability, and performance, certain rules need to be in place. The goal of these rules is to keep all nodes/pools equally busy (proportional to its capacity) to get the best IOPS or bandwidth per cluster. Thus, the techniques and mechanisms disclosed herein provide a rule based rebalancing method 1900, as shown in FIG. 19.

FIGS. 19A-19B illustrate rebalancing in a cluster, configured in accordance with one or more embodiments. FIG. 19A shows a cluster 1900 with six pools, 1910, 1920, 1930, 1940, 1950, and 1960. Pools 1910, 1920, and 1940 all store volume V1 replicas 1902. Pools 1930, 1940, and 1950 all store volume V2 replicas 1904. FIG. 19A shows an initial state of the cluster before rebalancing. As can be seen in FIG. 19A, pool 1960 does not store any volumes and is thus idle. In some instances, a balanced cluster is defined as one that has (approximately) the same amount of provisioned volumes and used space on each of the pools in the cluster. Thus, cluster 1900, as depicted in FIG. 19A will need to be rebalanced.

FIG. 19B illustrates cluster 1900 after a rebalance operation has been performed. In FIG. 19B, a volume V1 replica 1902 has been moved from pool 1940 to pool 1960. As can be seen in the figures, cluster 1900 is more balanced in FIG. 19B than in 19A. Details of an example rebalance operation is described below.

Figure 20:
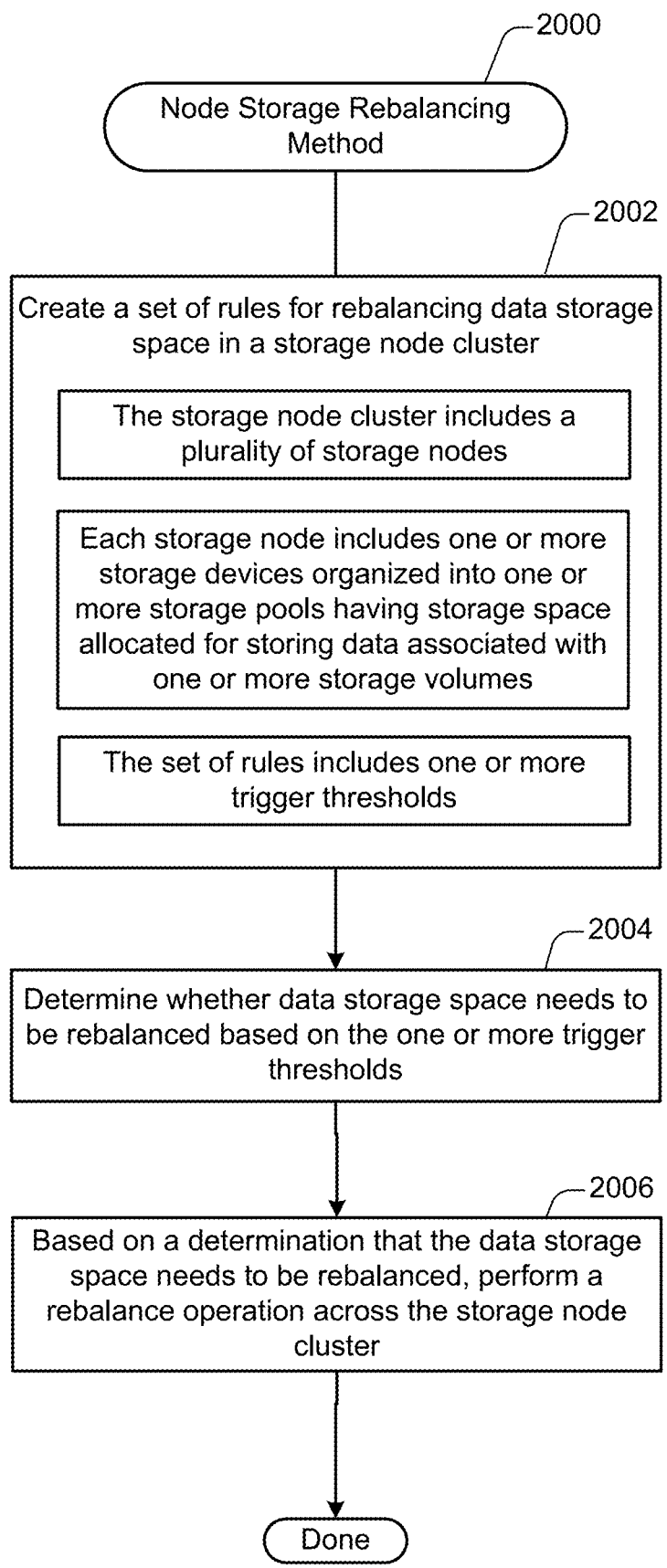
FIG. 20 illustrates a method for node storage rebalancing, configured in accordance with one or more embodiments.

FIG. 20 illustrates a method for node storage rebalancing, configured in accordance with one or more embodiments. Method 2000 presents a high level view or how to rebalance storage nodes in a cluster.

At 2002, method 2000 includes creating a set of rules for rebalancing data storage space in a storage node cluster. In some embodiments, the storage node cluster includes a plurality of storage nodes. In some embodiments, each storage node includes one or more storage devices organized into one or more storage pools having storage space allocated for storing data associated with one or more storage volumes. In some embodiments, the set of rules includes one or more trigger thresholds. In some embodiments, the trigger thresholds are user defined.

At 2004, method 2000 also includes determining whether data storage space needs to be rebalanced based on the one or more trigger thresholds. In some embodiments, the one or more trigger thresholds includes overload or underload trigger thresholds. In some embodiments, determining whether data storage space needs to be rebalanced includes first finishing any pending work on all pools. Next, a set of candidate pools is determined. Then, a metric mean value is calculated for each of a plurality of metrics. In some embodiments, for each candidate pool, a current metric value is evaluated for each of the plurality of metrics. In some embodiments, the current metric value can be a current measured value for a metric, e.g., 50 GB of used space. In some embodiments, the current metric value can be a delta value derived from a current measured metric, e.g., a difference between the current measured used space and a cluster mean. In some embodiments, for each candidate pool, the candidate pool is marked as a candidate source pool if a current metric value is over a source trigger threshold. Similarly, for each candidate pool, the candidate pool is marked as a candidate target pool if a current metric value is under a target trigger threshold.

At 2006, based on a determination that the data storage space needs to be rebalanced, method 2000 concludes with performing a rebalance operation across the storage node cluster. In some embodiments, the rebalance operation includes selecting from user identified pools or using all pools in the cluster by default. In some embodiments, the rebalance operation includes selecting a set of candidate pools for rebalance, wherein each storage pool in the set of candidate pools is initially marked as "candidate none". In some embodiments, performing the rebalance operation includes, for each candidate source pool, discovering and sorting allocated volumes on the candidate source pool. Then, for each pool, a closest fit volume is nominated based on how much allocation needs to be moved. Last, for each pool, an appropriate destination pool to move the closest fit volume is found. In some embodiments, finding the appropriate destination pool includes checking volume provisioning rules to see if the closest fit volume can even be moved. In some embodiments, finding the appropriate destination pool includes checking to see if moving the closest fit volume would keep the candidate source pool within trigger thresholds. In some embodiments, finding the appropriate destination pool includes moving the closest fit volume if the volume provisioning rules and the trigger thresholds allow the closest fit volume to be moved.

In some embodiments, performing the rebalance operation includes: for each candidate target pool: finding an appropriate donor pool by finding a closest fit volume that can be moved to the candidate target pool; and moving the closest fit volume from the appropriate donor pool to the candidate target pool if volume provisioning rules and trigger thresholds allow the closest fit volume to be moved. In some embodiments, during the rebalance operation, if a storage pool has a volume moved from or into the storage pool, then the storage pool is subsequently marked as used such that the storage pool cannot be reused during the rest of the rebalance operation. In some embodiments, marking the storage pool as used includes marking the storage pool such that it cannot be used until the currently running volume operation is completed. In some embodiments, the one or more trigger thresholds are based on a used size metric or a provisioned size metric. In some embodiments, the rebalance operation includes an internal loop operation that continuously moves volumes from one storage pool to another until it is determined that the data storage space no longer needs to be rebalanced.

FIG. 20 illustrates a high level view of a method for rebalancing storage nodes in a cluster. According to various embodiments, this method can be implemented in a variety of different ways. One example implementation involves an algorithm that utilizes customized API definitions. FIGS. 22A-22D illustrate an example of one such algorithm. Algorithm 2200 utilizes four customized object definitions. More specifically, algorithm 2200 involves four definitions, a Job definition, a Parameters definition, a TriggerThresholdRules definition, and a StopThresholdRules definition.

Figure 21A:
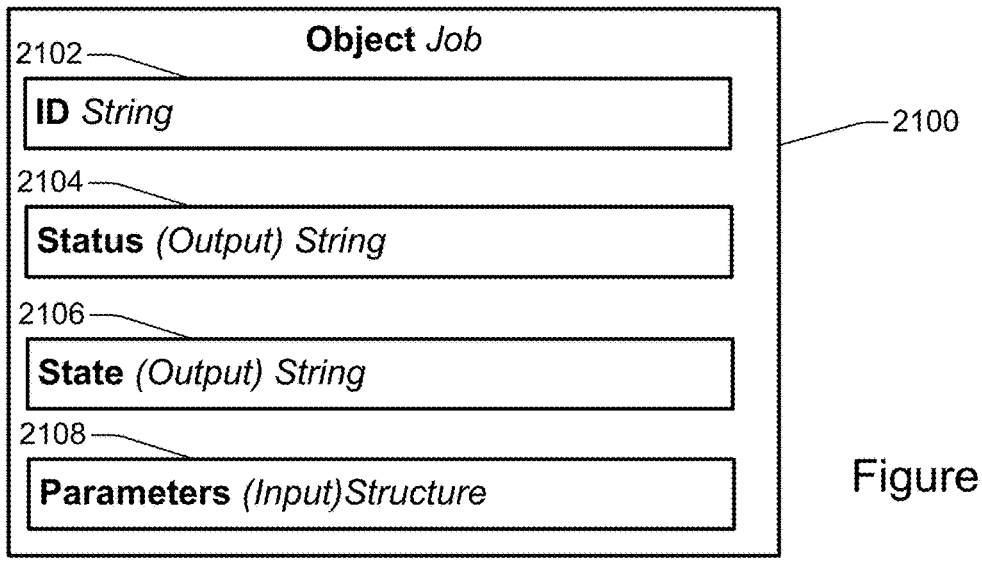
FIGS. 21A-21C illustrate examples of Job, Parameters, and ThesholdRules objects, configured in accordance with one or more embodiments.
Figure 21B:
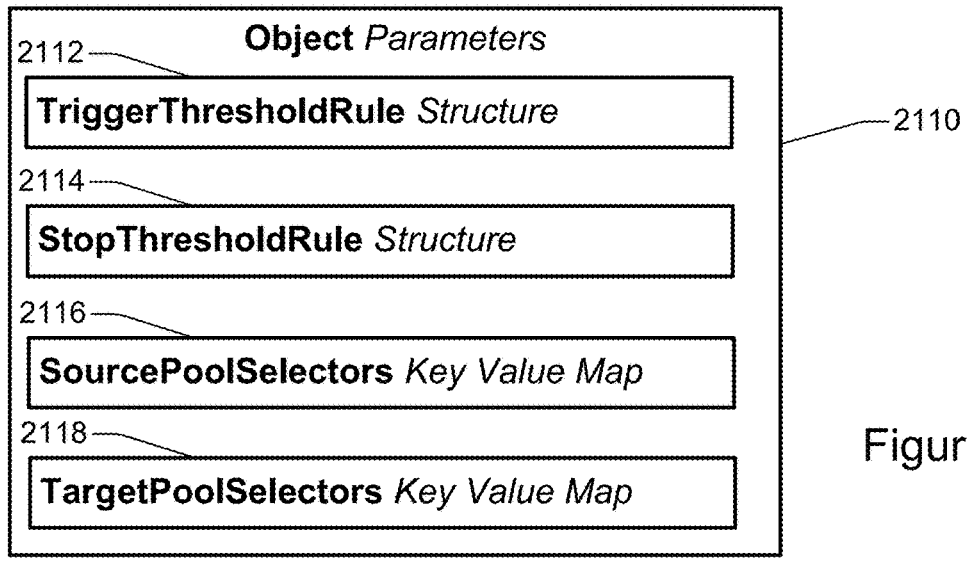
Figure 21C:
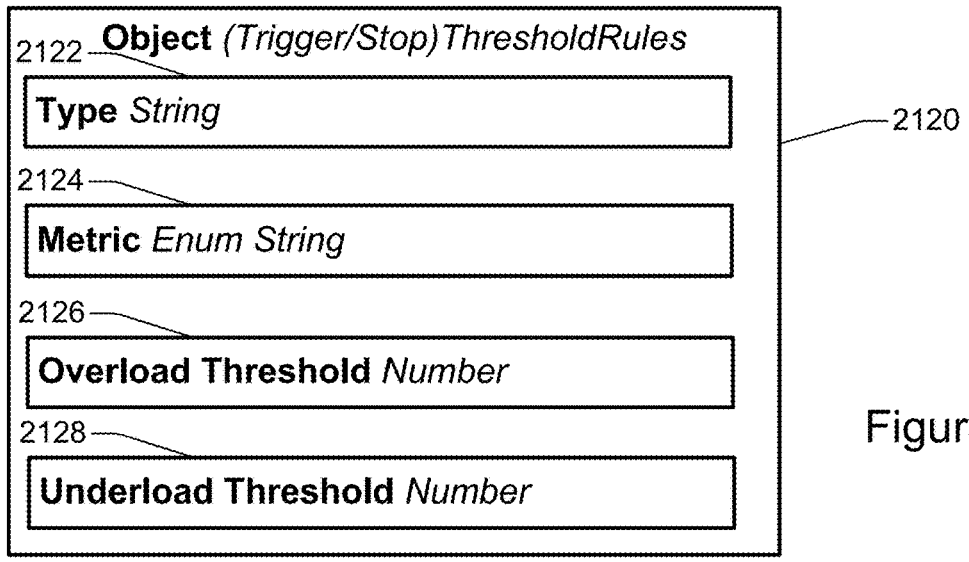
Figure 22A:
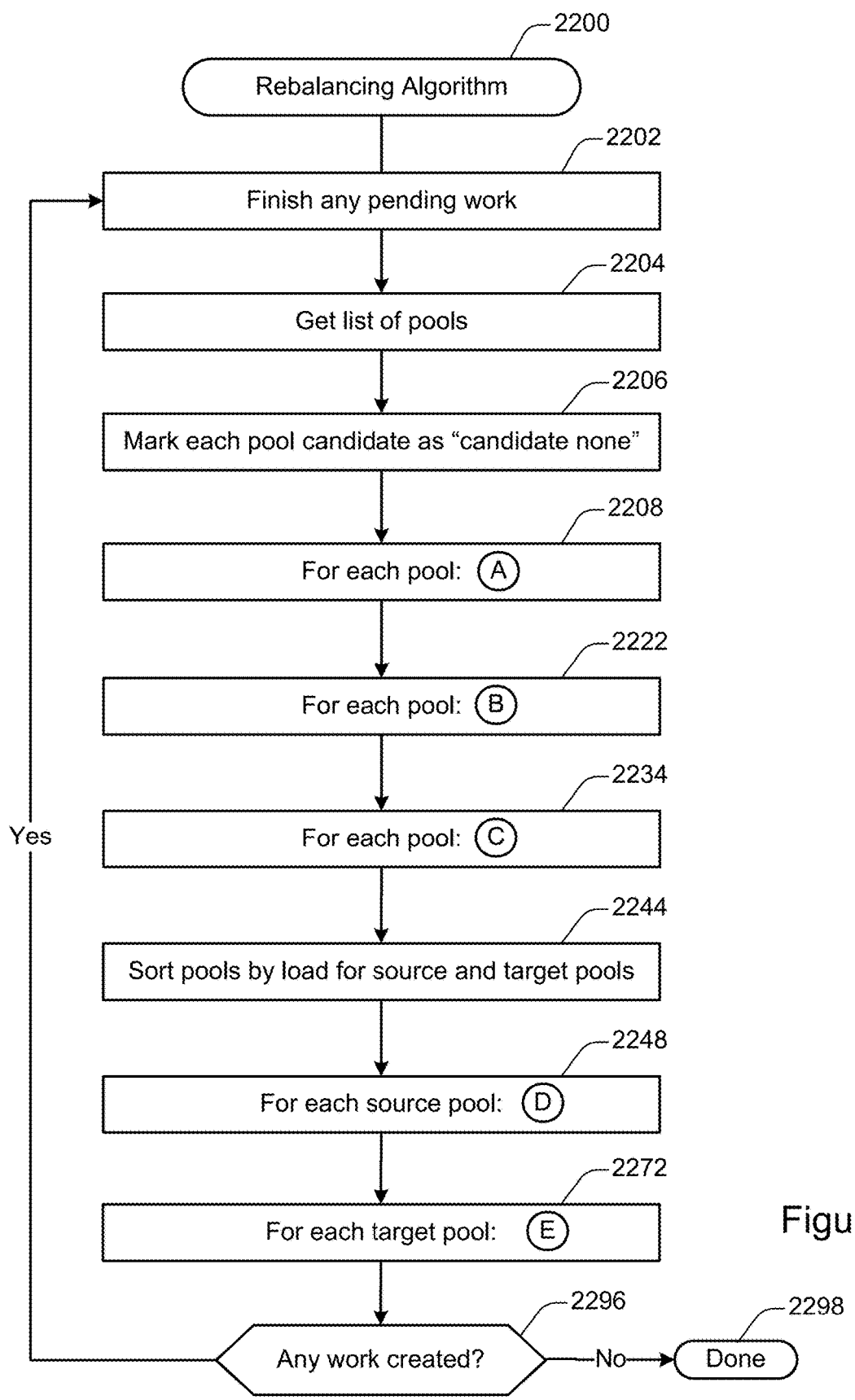
FIGS. 22A-22D illustrate an example algorithm for rebalancing, configured in accordance with one or more embodiments.
Figure 22B:
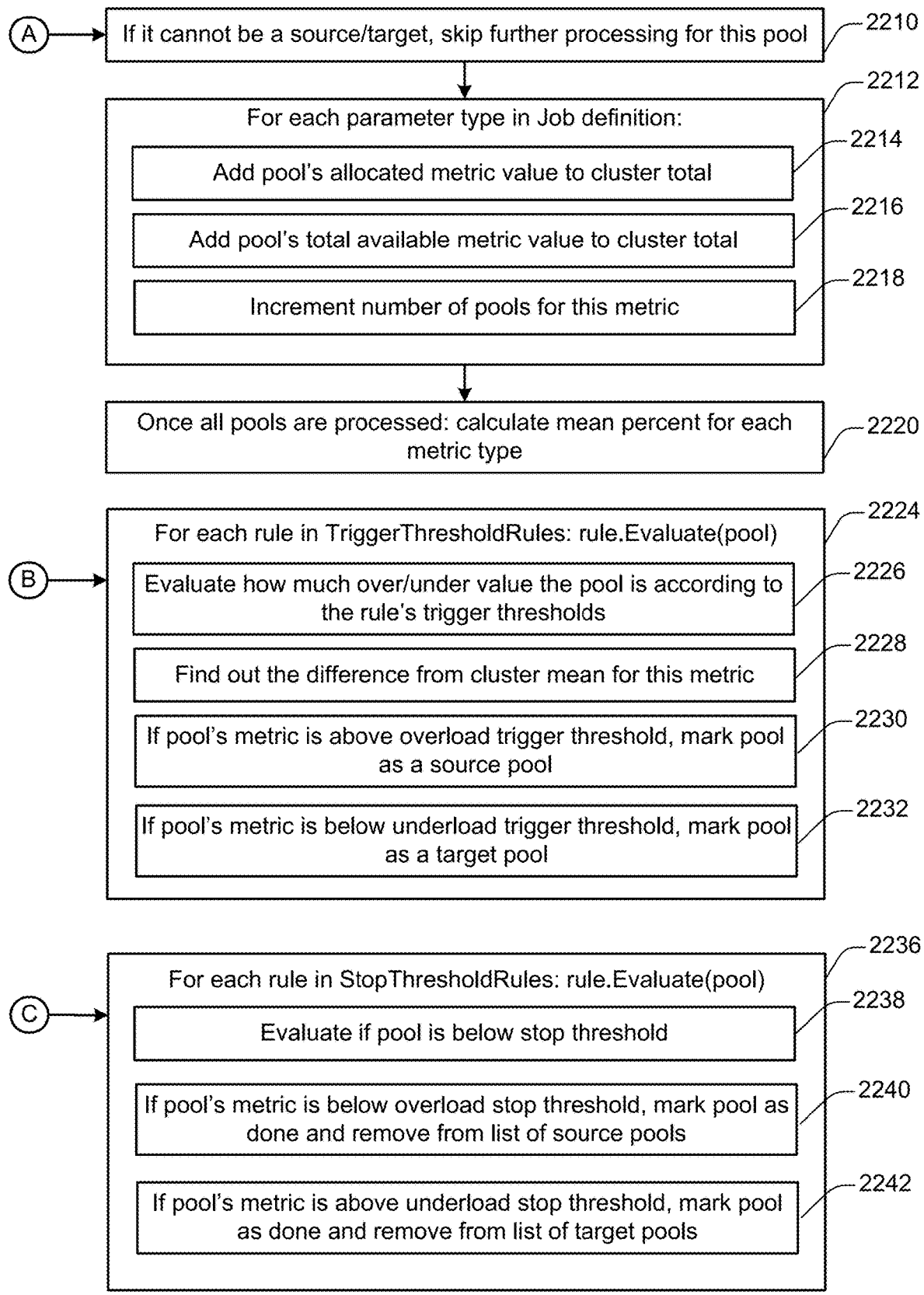
Figure 22C:
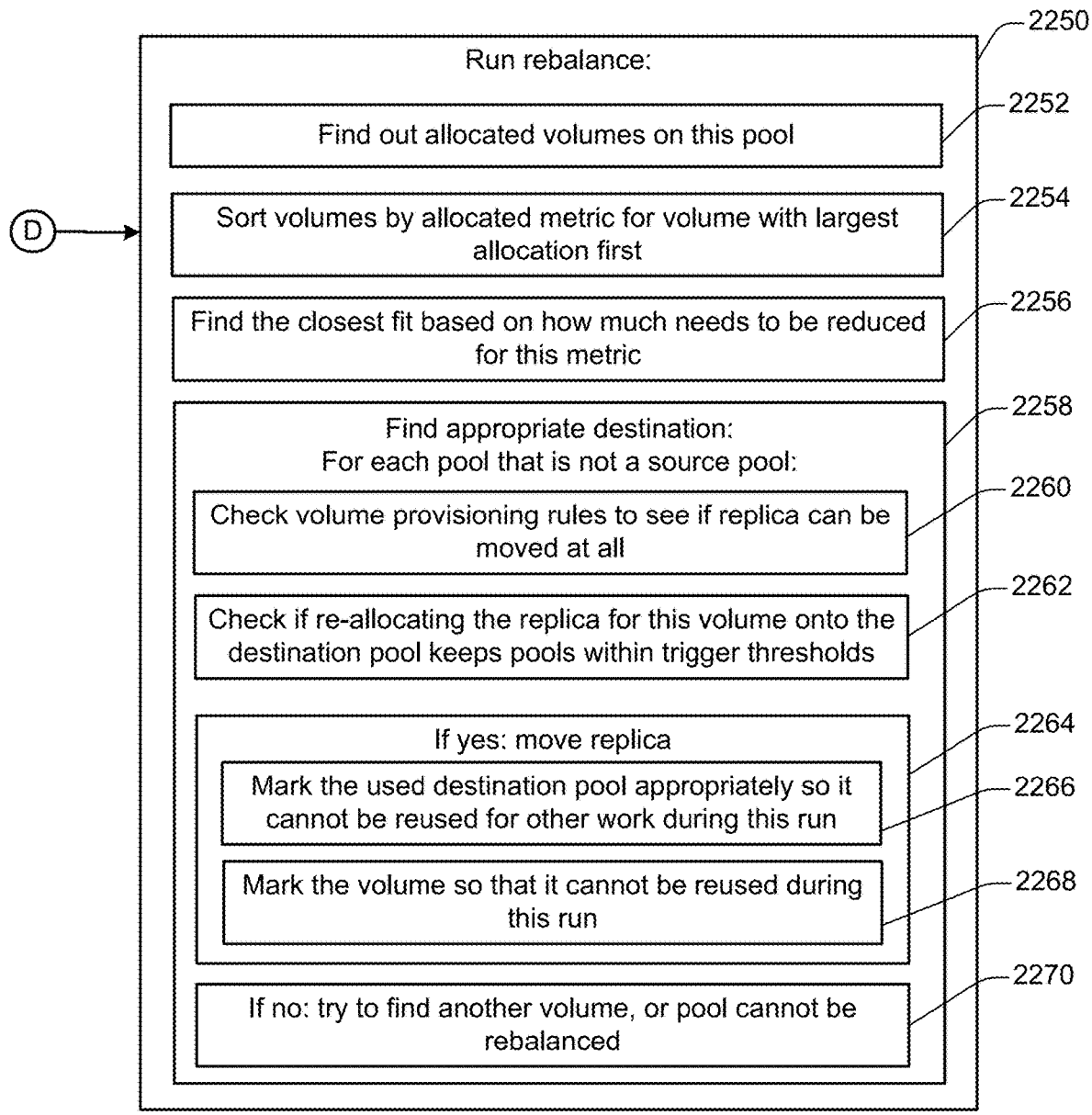
Figure 22D:
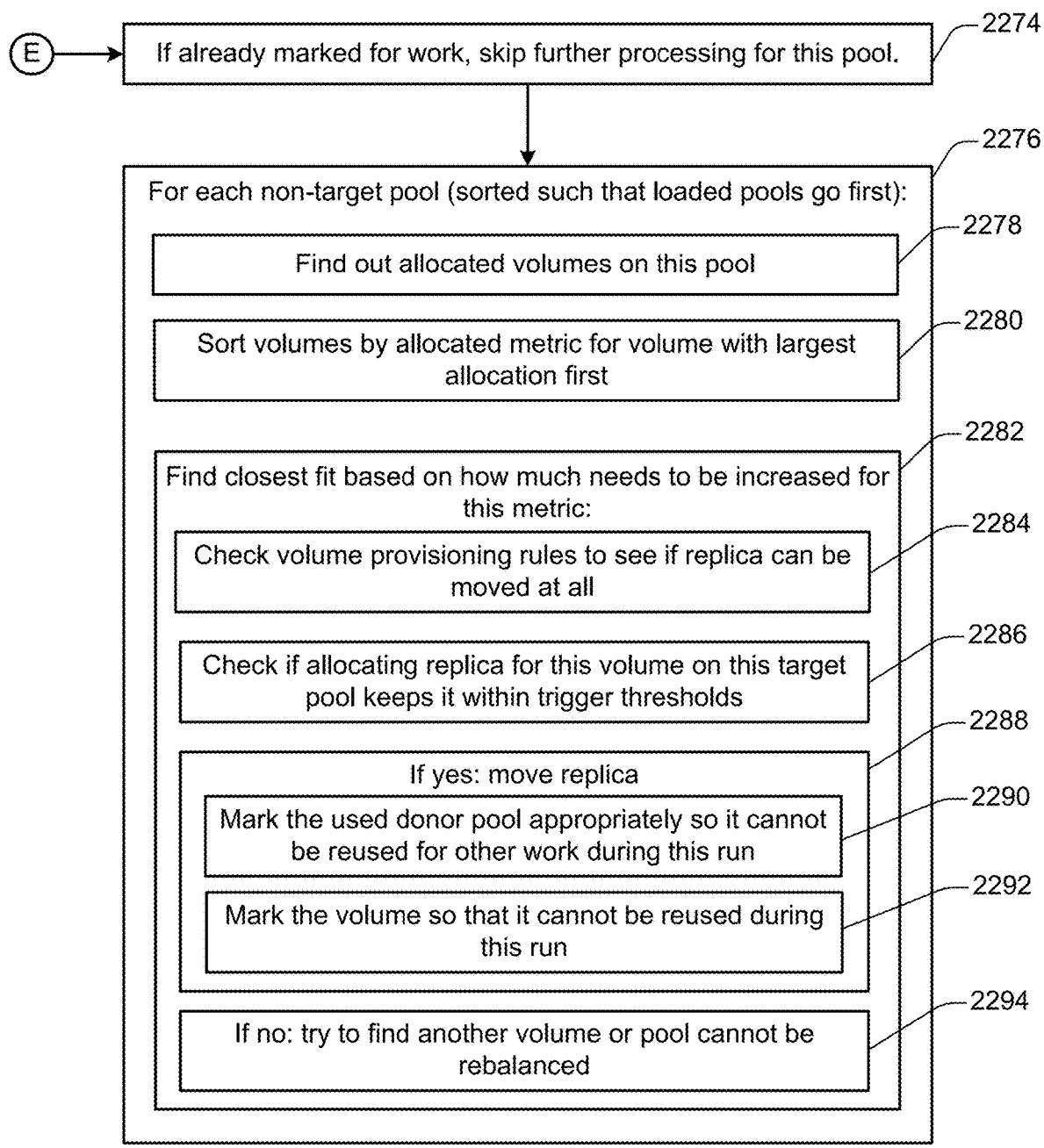

FIGS. 21A-21C illustrate examples of Job, Parameters, and ThesholdRules objects, configured in accordance with one or more embodiments. In some embodiments, a rebalance "job" can be represented as a Job object 2100, as shown in FIG. 21A. Job object 2100 includes four fields, ID 2102, Status 2104, State 2106, and Parameters 2108. ID 2102 is simply a string that identifies the particular job in order for the system to distinguish between different jobs. Status 2104 is a string that is returned. Status 2104 returns the rebalance status of the job, e.g., "complete" or "incomplete." In some embodiments, status 2104 can be used to return additional information about the state of the job. In some embodiments, Status 2104 is empty while the job is initiated and running and returns when the job finishes. State 2106 is an enum string that is also returned. State 2106 is an enum string, meaning it can only be certain acceptable forms of strings, such as "running," "pending," "paused," "cancelled," "done," etc. State 2106 returns a current state of the job. Parameters 2108 is an input structure that includes parameters defined in a request for the rebalance job. An example Parameters object 2110 is represented in FIG. 21B.

FIG. 21B illustrates a Parameters object 2110. Parameters object 2110 includes four fields, a TriggerThresholdRules 2112, a StopThresholdRules 2114, a SourcePoolSelectors 2116, and a TargetPoolSelectors 2118. Both TriggerThresholdRules 2112 and StopThresholdRules 2114 are structures that contain a list of rules. TriggerThresholdRules 2112 includes a list of trigger threshold rules that trigger a rebalance operation. StopThresholdRules includes a list of stop threshold rules that determine when to stop the rebalance operation. SourcePoolSelectors 2116 and TargetPoolSelectors 2118 are both key value maps of labels associated with pools. In some embodiments, they determine which pools can be selected for sources or pools in the algorithm.

FIG. 21C illustrates a (Trigger/Stop)ThresholdRules object 2120. In some embodiments, both TriggerThresholdRules objects and StopThresholdRules objects have the same structure. ThresholdRules object 2120 includes Type 2122, Metric 2124, Overload Threshold 2126, and Underload Threshold 2128. Type 2122 is a string that represents what type of value represented by the thresholds. For example, Type 2122 can be "absolute percent," which means the trigger threshold value is met when the actual metric percent is hit. For example, if the type is "absolute percent," and the threshold was 70% of used space, then a rebalance operation may be triggered once the storage pool reaches 70% of used space. As another example, Type 2122 can be "delta percent," which represents the difference between the absolute percent and the cluster mean. In some embodiments, a "cluster mean" is defined as the sum of the current metric value of all pools divided by the sum of the maximum metric value for each pool, converted to a percentage. In some embodiments, the type of metric is used space or provisioned space, or any other metric (e.g., IOPS), in the cluster divided by the total storage capacity of a cluster. For example, if the total storage capacity of a cluster is 100 GB, and the total used space in the cluster is 25 GB, then the cluster mean for used space is 25%. Similarly, if the total provisioned space is 50 GB, then the cluster mean for provisioned space is 50%. Metric 2124 is an enum string that identifies for what type of metric the rule is being used. For example, Metric 2124 can be "used space," "provisioned space," "number of volumes," etc. Overload Threshold 2126 is a number that represents a limit, above which will trigger a rebalance operation. Underload Threshold 2128 is a number that represents a limit, below which will trigger a rebalance operation.

In some embodiments, StopThresholdRules object 2120 only comes into play during "absolute percent" type triggers. This is because an absolute percent type trigger will tell when to rebalance, but does not tell when to stop the rebalance operation. By contrast, in such embodiments, StopThresholdRules object 2120 is unnecessary for "delta percent" type triggers because as soon as the difference from the cluster mean is no longer above the trigger threshold, then the rebalance operation will no longer trigger (a form of automatically stopping). In some embodiments, StopThresholdRules 2120 still come into play as an optimization, even with delta percent type triggers in order to "overbalance," meaning balance more than necessary, the cluster to reduce the frequency of triggering rebalance operations. For example, if a delta percent trigger threshold is 20%, then rebalancing resumes as long as the metric is 20% higher than the cluster mean. However, in optimized systems, a StopThresholdRule object 2120 can override the passive stop of the delta percent trigger by forcing the rebalance operation to keep rebalancing until the delta percent is within a smaller number, say 5%, from the cluster mean.

With the object definitions defined above, a detailed explanation of an example rebalance algorithm can be presented below. For further clarification, an example scenario is presented as follows. For the purposes of this example, cluster 1900 of FIG. 19A will have the following metrics:

Pool 1: V1 (5 GB)—5 GB Provisioned, 1 GB Used/100 GB
Pool 2: V1 (5 GB)—5 GB Provisioned, 1 GB Used/100 GB
Pool 3: V2 (10 GB)—10 GB Provisioned, 3 GB Used/100 GB
Pool 4: V2 (10 GB), V1 (5 GB)—15 GB Provisioned, 4 GB Used/100 GB
Pool 5: V2 (10 GB)—10 GB Provisioned, 3 GB Used/100 GB
Pool 6: idle—0 GB Provisioned, 0 GB Used/100 GB As shown above, Pools 1 and 2 both have volume replicas V1, which is provisioned 5 GB of space. Each V1 also used only 1 GB of space. Pools 3 and 5 both have volume replicas V2, which is provisioned 10 GB of space, with only 3 GB used. Pool 4 has both volumes V1 and V2, meaning a total of 15 GB provisioned and 4 GB used. For simplicity, each pool has a total capacity of 100 GB. The total capacity of the cluster is 600 GB. The total provisioned space for the cluster is 45 GB. The total used space for the cluster is 12 GB. Thus, the cluster mean for provisioned space is 45/600=7.5%. The cluster mean for used space is 12/600=2%.

For the purpose of this example, a request to rebalance nodes has been received with the following definition:
Job Definition:
    ID=Aa1
    Status=" "
    State="running"
    Parameters
    TriggerThresholdsRules
    [
        {Type: "Delta Percent",
        Metric: "Provisioned Space",
        OverloadThreshold: 5,
        UnderloadThreshold: 5,
        },
        {Type: "Delta Percent",
        Metric: "Used Space",
        OverloadThreshold: 2,
        UnderloadThreshold: 2,
        }
    ]
    StopThresholdsRules
    [
        {Type: "Delta Percent",
        Metric: "Provisioned Space",
        OverloadThreshold: 1,
        UnderloadThrehold: 1,
        },
        {Type: "Delta Percent",
        Metric: "Used Space",
        OverloadThreshold: 1,
        UnderloadThrehold: 1,
        }
    ]
    SourcePoolSelectors={ }
    TargetPoolSelectors={ }

As seen above, the Status is because the job is currently running. There is a trigger for provisioned space and used space. For provisioned space, the trigger threshold is a deviation of 5% from the cluster mean. For used space, the trigger threshold is a deviation of 2% from the cluster mean. There are also stop thresholds but they can be ignored in this example because the Type is "delta percent." For the purpose of this example, the initial metrics for each pool in FIG. 19A is Pool 1 (5%), Pool 2 (5%), Pool 3 (10%), Pool 4 (15%), Pool 5 (10%), Pool 6 (0%), Running the algorithm using these rules should yield a movement of V1 from Pool 4 to Pool 6 because initially, the provisioned space metric for Pool 4 (15%) has a difference of 7.5% from the cluster mean (7.5%), which should trigger an overload threshold, thereby causing a rebalance operation that will move V1 to Pool 6. Similarly, Pool 6 would have triggered an underload threshold, thereby causing a rebalance operation from Pool 4 to Pool 6 because 0% is more than 5% difference away from the cluster mean of 7.5%. However, as will be seen below, only one trigger threshold will be used because once the rebalance operation completes a move from Pool 4 to Pool 6, Pool 6 would no longer meet the underload trigger threshold.

FIGS. 22A-22D illustrate an example algorithm for rebalancing, configured in accordance with one or more embodiments. Algorithm 2200 begins at 2202 with finishing all pending work. In some embodiments, this includes checking any of the pools to see if any previously created work has been completed. If not, then the system waits until all previously created pending work is completed. At 2204, the system gets a list of pools as potential candidates. At 2206, each pool is marked as "candidate none." In some embodiments, candidate none refers to being neither a candidate source nor candidate target.

At 2208, a sub-process is performed for each pool. Sub-process 2208 includes determining (2210) whether the pool cannot be a source or target based on SourcePoolSelectors or TargetPoolSelectors. If the pool cannot be either a source or target, then the pool is skipped and marked as cannot be used for further processing in the rebalance operation. Sub-process 2208 also includes step 2212.

At 2212, a loop is performed for each parameter type in the job definition. The loop includes adding (2214) the pool's allocated metric value (either used space or provisioned space) to the cluster total. In some embodiments, the cluster total initially starts with 0 GB. For example, after evaluating provisioned space metric for Pool 1, the cluster total for provisioned space is 5 GB. After evaluating Pool 2, the cluster total for provisioned space increases to 10 GB. After evaluating Pool 6, the cluster total for provisioned space will be 45 GB. Next, loop 2212 includes adding (2216) the pool's total available metric value (total capacity) to the cluster total. For example, after evaluating Pool 1, the cluster total for capacity is 100 GB. After evaluating Pool 2, the cluster total for capacity is increased to 200 GB. After evaluating Pool 6, the cluster total for capacity will be 600 GB. Next, loop 2212 includes incrementing (2218) the number of pools by 1, meaning the total number of pools evaluated is increased by 1. Once loop 2212 finishes processing all the pools, the system calculates (2220) a cluster mean (total allocated*100/total capacity) for each metric type. For example, the cluster mean for provisioned space is 45*100/600=7.5. The cluster mean for used space is 12*100/600=2.

At 2222, another sub-process is performed for each pool. Sub-process 2222 includes yet another loop 2224 that is performed for each rule in TriggerThresholdRules. Each loop 2224 performs a rule.Evaluate(pool) function call. The rule.Evaluate(pool) function call includes evaluating (2226) how much over/under value the pool is according the rule's trigger thresholds. In some embodiments, the evaluate function includes finding out (2228) the difference between a particular pool metric from the cluster mean, if the rule type is "delta percentage" or "delta mean." If the pool metric is above the overload trigger threshold specified in TriggerThresholdRules, then the pool is marked (2230) as a source pool. If the pool metric is below the underload trigger threshold specified in TriggerThresholdRules, then the pool is marked (2232) as a target pool.

At 2234, yet another sub-process is performed for each pool. Sub-process 2234 includes yet another loop 2236 that is performed for each rule in StopThresholdRules. Each loop 2236 performs a rule.Evaluate(pool) function call. If the pool metric is below the overload stop threshold specified in StopThresholdRules, then the pool is marked (2240) as done and the pool is removed from the list of source pools. If the pool metric is above the underload stop threshold specified in StopThresholdRules, then the pool is marked (2242) as done and the pool is removed from the list of target pools. In some embodiments, sub-process 2234 is only performed when the Type is "absolute percentage" or if the system is configured for an optimization as explained above.

At 2244, pools are sorted by load for source and target pools. In some embodiments, for source pools, the pools with the highest load for removal are processed first. In some embodiments, for target pools, pools with the highest load to be added are processed first.

At 2248, a sub-process is performed for each source pool. Sub-process 2248 includes actually performing (2250) the rebalance operation. Rebalance operation 2250 includes finding out (2252) all allocated volumes on the source pool being sub-processed. The volumes are then sorted (2254) by allocated metric for volumes with the largest allocation first. Then, the "closest fit" volume is found (2256) based on how much needs to be reduced for this metric. For example, if 5 GB needs to be moved, and there are two volumes, a 10 GB volume replica and a 5 GB volume replica, then the 5 GB volume replica will be the closest fit. Since the replication level for volumes must be maintained, an appropriate destination node or pool is found (2258). In some embodiments, the term "destination" is used to differentiate form the list of target pools defined above. However, "destination" pool and "target pool" are not mutually exclusive. An appropriate destination pool can turn out to be a target pool marked earlier in the previous steps.

Finding (2258) an appropriate destination pool includes running a loop for each pool that is not a source pool. Loop 2258 includes checking (2260) volume provisioning rules to see if the closest fit volume replica can be moved at all. For example, in some instances, volume provisioning rules described above may prevent moving the volume replica from the pool in sub-processing. Next, loop 2258 includes checking (2262) to see if moving, or re-allocating, the volume replica form the source pool to the destination pool will keep the destination pool within any rebalance thresholds. In other words, the system determines whether moving the volume replica will cause a new imbalance. If moving the volume will keep the pools within trigger thresholds, then replica is moved (2264) from the source pool to the destination pool. Once a replica is moved, after a destination pool is selected, the used destination pool is marked (2266) appropriately such that it cannot be reused for other work during this run of the rebalance operation. In other words, once a replica move operation begins, it is marked as used until the replica move operation completes. In addition, the volume is also marked (2268) such that it cannot be reused during this run of the rebalance operation.

If moving the volume replica does cause the pool to cross new trigger thresholds, then the volume replica is not moved, and the system tries to find (2270) another volume for the destination. In other words, if moving a volume replica from the source pool to the destination pool will trigger a new rebalance operation to be performed on the source (due to the underload trigger threshold being met), or trigger a new rebalance operation to be performed on the destination pool (due to the overload trigger threshold on the destination pool being met), then the move is not performed and the system attempts to find (2270) another volume. For example, if moving a 10 GB volume replica from a source pool triggers a 5 GB underload threshold on the source pool, then the volume will not be moved. Similarly, if moving a 10 GB volume replica to the destination pool triggers a 5 GB overload threshold on the destination pool, then the volume will not be moved. In some embodiments, if another volume cannot be found, then the source pool cannot be rebalanced.

At 2272, a sub-process is performed for each target pool. If the target pool was already marked for work in step 2266 above, then the target pool is skipped (2274) from further processing. Otherwise, a rebalance operation is run which includes a loop 2276 for each non-target pool. In some embodiments, each non-target pool is also sorted such that loaded pools go first. Loop 2276 includes finding out (2278) all allocated volume on the non-target pool. Then, the volumes are sorted (2280) by allocated metric for volumes with the largest allocation first. Then, the "closest fit" volume is found (2282) based on how much needs to be increased for this metric. For example, if the target pool is 5 GB shy of the threshold, then a 5 GB volume replica will be the closest fit. Since the replication level for volumes must be maintained, an appropriate donor node or pool also needs to be found. In some embodiments, the term "donor" is used to differentiate form the list of source pools defined above. However, "donor" pool and "source pool" are not mutually exclusive. An appropriate donor pool can turn out to be a source pool marked earlier in the previous steps.

Finding (2282) an appropriate destination pool includes running a loop for each pool that is not a target pool. Loop 2282 includes checking (2284) volume provisioning rules to see if the closest fit volume replica can be moved at all. Next, loop 2282 includes checking (2286) to see if moving, or re-allocating, the volume replica from the donor pool to the target pool will keep the donor pool within any rebalance thresholds. In other words, the system determines whether moving the volume replica will cause a new imbalance. If moving the volume will keep the pools within trigger thresholds, then replica is moved (2288) from the donor pool to the target pool. Once a replica is moved, the used donor pool is marked (2290) appropriately such that it cannot be reused for other work during this run of the rebalance operation. In addition, the volume is also marked (2292) such that it cannot be reused during this run of the rebalance operation, or until the volume's replica move operation is complete.

If moving the volume replica does cause the donor pool, or even the target pool, to cross new trigger thresholds, then the volume replica is not moved, and the system tries to find (2294) another volume for the target pool. In other words, if moving a volume replica from the donor pool to the target pool will trigger a new rebalance operation to be performed on the donor (due to the underload trigger threshold being met), or trigger a new rebalance operation to be performed on the target pool (due to the overload trigger threshold on the target pool being met), then the move is not performed and the system attempts to find (2270) another volume. In some embodiments, if another volume cannot be found, then the target pool cannot be rebalanced.

At 2296, the system determines whether any work was created during this run. If yes, then algorithm 2200 returns to step 2202 and runs again. If no work was created during this run then the rebalance job is marked complete (2298). In some embodiments, the job then returns a status of "complete."

Algorithm 2200 illustrates just one example algorithm that can be used to technically implement a rebalance method 2000. According to various embodiments, the rebalance method can be run on any of the nodes in the cluster, for example, the node with the lowest ID. According to various embodiments, the system will monitor the progress by keeping a list of changes to the volumes. In some embodiments, if a volume is changed, then the system checks the list of volumes on which work was created. In some embodiments, the system utilizes a configurable timeout function. The timeout function may prove useful if a rebalance job has stalled for whatever reason. In some embodiments, if the timeout is triggered, then rebalance work on the volume is cancelled and the volume is marked as not useable again.

The rule based rebalancing techniques described above provide many advantages over conventional distributed storage systems. One advantage is that rule based rebalancing provides an extremely flexible way of describing the organization of the nodes/pools in a storage node cluster into any failure domain that the user desires, based on user defined/system provided labels, for example, by allowing metrics to be described as labels. Another advantage is that rule based rebalancing provides an extremely flexible rule based way of controlling the entire rebalance operation, thus allowing the rebalance operation to suit the needs of any environment and any requirement without needing to write a new algorithm for rebalancing. Yet another advantage of rule based rebalancing is that it is extensible, since a system can simply add more rules for different metric types (e.g., the number of volumes if all volumes are of the same size, I/O operations served by the pool, etc.) to modify the output of the rebalance equation.

Figure 23:
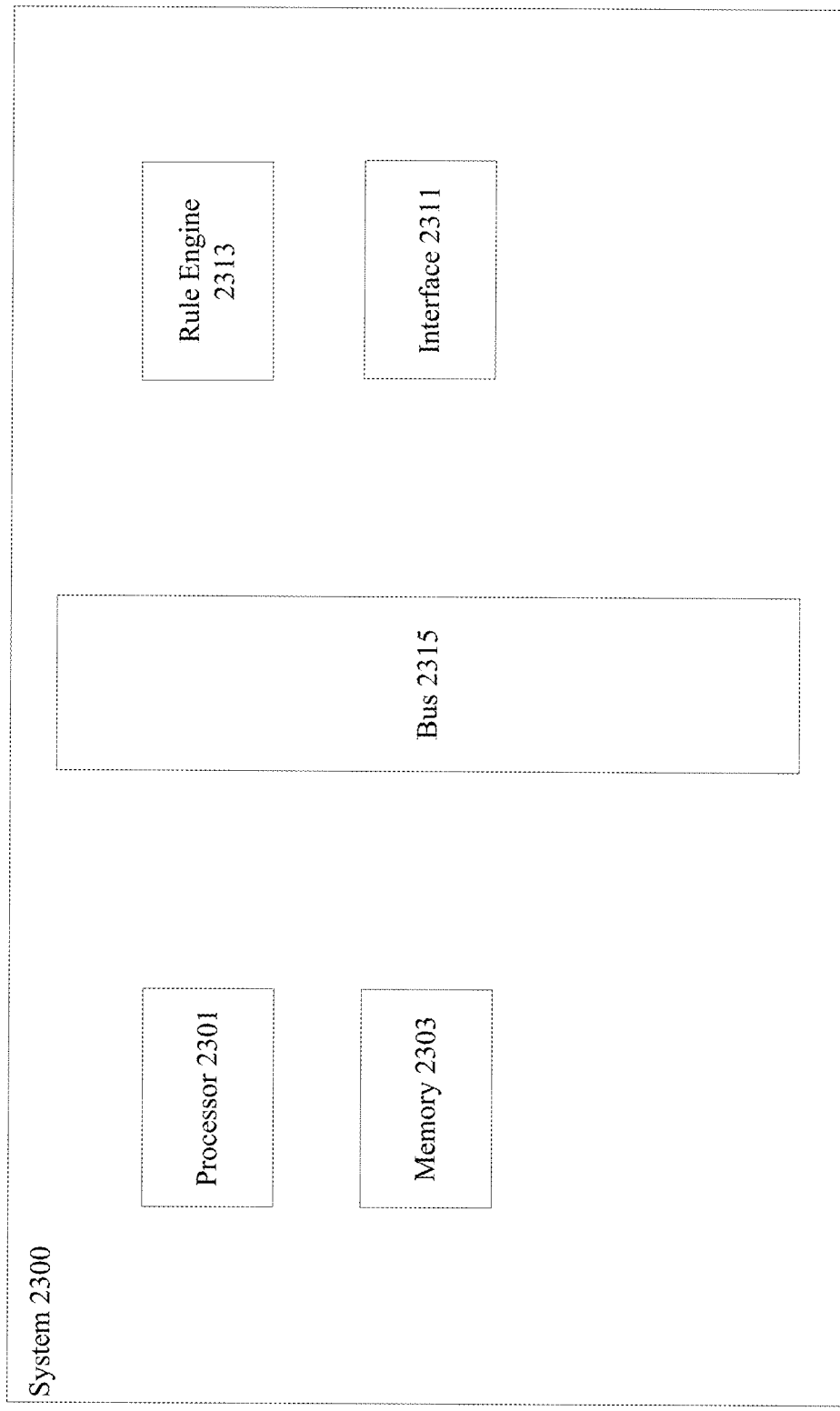
FIG. 23 illustrates an example of a computer system, configured in accordance with one or more embodiments.

According to various embodiments, the techniques and mechanisms described herein can be run on computer systems. FIG. 23 illustrates one example of a computing system. In some embodiments, system 2300 is a server. According to particular embodiments, a system 2300 suitable for implementing particular embodiments of the present disclosure includes a processor 2301, a memory 2303, an interface 2311, a rule engine 2313, and a bus 2315 (e.g., a PCI bus or other interconnection fabric) and operates as a storage container node. When acting under the control of appropriate software or firmware, the processor 2301 is responsible for containerized storage operations. Various specially configured devices can also be used in place of a processor 2301 or in addition to processor 2301. The interface 2311 is typically configured to send and receive data packets or data segments over a network. In some embodiments, rule engine 2313 is a software module configured to perform the techniques and mechanisms presented herein. In some embodiments, rule engine 2313 is a specialized processor configured to perform the techniques and mechanisms presented herein.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 2300 is a server configured to run a container engine. For example, the system 2300 may be configured as a storage container node as shown in FIG. 1. The server may include one or more hardware elements as shown in FIG. 23. In some implementations, one or more of the server components may be virtualized. For example, a physical server may be configured in a localized or cloud environment. The physical server may implement one or more virtual server environments in which the container engine is executed. Although a particular server is described, it should be recognized that a variety of alternative configurations are possible. For example, the modules may be implemented on another device connected to the server.

In the foregoing specification, the present disclosure has been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure.

What is claimed is:

1. A method for node storage rebalancing comprising:
accessing a set of rules for rebalancing data storage space in a storage node cluster, the storage node cluster including a plurality of storage nodes that each include a plurality of storage pools, wherein the storage node cluster manages the storage pools to provide volumes that the storage node cluster exposes for mounting by clients, and wherein the storage node cluster implements the set of rules, the set of rules including a trigger threshold;
determining, based on metrics of the respective storage pools, that the trigger threshold has been met; and
based on the determining that the trigger threshold has been met, performing a rebalance operation across the storage node cluster, the rebalance operation comprising
selecting source storage pools from among the storage pools, the selecting of the source storage pools comprising
determining a first metric of a first storage pool included in a group of candidate storage pools,
determining that the first metric is greater than a cluster mean metric for the storage node cluster, and
marking, based on the determining that the first metric is greater than the cluster mean metric, the first storage pool as a source storage pool included in the source storage pools
selecting target storage pools from among the storage pools, the selecting of the target storage pools comprising
determining a second metric of a second storage pool included in a group of candidate storage pools,
determining that the second metric is less than the cluster mean metric for the storage node cluster, and
marking, based on the determining that the second metric is less than the cluster mean metric, the second storage pool as a target storage pool included in the target storage pools, and
moving entire volumes from the source storage pools to the target storage pools the moving comprising
determining, based on the first metric, a volume allocation amount that needs to be moved from the first storage pool marked as the source storage pool to the second storage pool marked as the target storage pool,
selecting, based on the volume allocation amount, a closest fit volume on the first storage pool, the closest fit volume most closely fitting the volume allocation amount,
determining, based on a checking of a volume provisioning rule, that the closest fit volume can be moved from the first storage pool to the second storage pool, determining that moving the closest fit volume would keep the first and second storage pools within the trigger threshold, and moving, based on the determining that the closest fit volume can be moved from the first storage pool to the second storage pool and the determining that moving the closest fit volume would keep the first and second storage pools within the trigger threshold, the closest fit volume from the first storage pool to the second storage pool.

2. The method of claim 1, wherein the trigger threshold is user defined.

3. The method of claim 1, wherein the rebalance operation includes selecting from user identified storage pools or using all storage pools in the storage node cluster by default.

4. The method of claim 1, wherein performing the rebalance operation includes:

selecting a target storage pool to move a volume to, wherein the selecting includes:
checking a volume provisioning rule to determine if the volume can be moved in accordance with the volume provisioning rule; and
checking to determine if moving the volume would keep the source storage pool, or the target storage pool, within the trigger threshold.

5. The method of claim 1, wherein performing the rebalance operation includes:

selecting a closest fit volume that can be moved to a target storage pool; and
moving the selected closest fit volume from a corresponding source storage pool to the target storage pool if a volume provisioning rule and the trigger threshold allow the closest fit volume to be moved.

6. The method of claim 1, wherein during the rebalance operation, a source storage pool has a volume moved to a target storage pool, and based thereon the source storage pool is prevented from being reused during the rest of the rebalance operation.

7. The method of claim 1, wherein the trigger threshold is evaluated against a used-size metric or a provisioned-size metric.

8. The method of claim 1, wherein the rebalance operation includes a loop operation that repeatedly moves volumes from the source storage pools to the target storage pools until it is determined that the volumes no longer need to be rebalanced.

9. The method according to claim 1, wherein the rebalancing operation evens a distribution, among the storage pools, of storage space used by the volumes.

10. The method according to claim 1, wherein the trigger threshold comprises an amount or ratio of deviation of space used or free on a storage pool relative to a mean of space used or free on the storage pools.

11. The method according to claim 1, further comprising selecting storage pools for inclusion in the source storage pools and the target storage pools by evaluating metrics of the respective storage pools against the trigger threshold.

12. A system comprising:

a storage node cluster, the storage node cluster including a plurality of storage nodes that each include a plurality of storage pools, each storage pool storing volumes, wherein the storage node cluster manages the storage pools to expose the volumes for mounting by clients; and
a processor configured to:

access a set of rules for rebalancing the volumes in the storage node cluster, the set of rules including a trigger threshold;
determine whether the volumes need to be rebalanced by evaluating the trigger threshold against metrics of the respective storage pools; and
based on a determination that the volumes need to be rebalanced, perform a rebalance operation across the storage node cluster, the rebalance operation comprising selecting source storage pools from among the storage pools, the selecting of the source storage pools comprising
determining a first metric of a first storage pool included in a group of candidate storage pools,
determining that the first metric is greater than a cluster mean metric for the storage node cluster, and
marking, based on the determining that the first metric is greater than the cluster mean metric, the first storage pool as a source storage pool included in the source storage pools
selecting target storage pools from among the storage pools, the selecting of the target storage pools comprising
determining a second metric of a second storage pool included in a group of candidate storage pools,
determining that the second metric is less than the cluster mean metric for the storage node cluster, and
marking, based on the determining that the second metric is less than the cluster mean metric, the second storage pool as a target storage pool included in the target storage pools, and
moving entire volumes from the source storage pools to the target storage pools the moving comprising
determining, based on the first metric, a volume allocation amount that needs to be moved from the first storage pool marked as the source storage pool to the second storage pool marked as the target storage pool,
selecting, based on the volume allocation amount, a closest fit volume on the first storage pool, the closest fit volume most closely fitting the volume allocation amount,
determining, based on a checking of a volume provisioning rule, that the closest fit volume can be moved from the first storage pool to the second storage pool,
determining that moving the closest fit volume would keep the first and second storage pools within the trigger threshold, and
moving, based on the determining that the closest fit volume can be moved from the first storage pool to the second storage pool and the determining that moving the closest fit volume would keep the first and second storage pools within the trigger threshold, the closest fit volume from the first storage pool to the second storage pool.

13. The system of claim 12, wherein the trigger threshold is user defined.

14. The system of claim 12, wherein the source storage pools are selected from user identified storage pools.

15. The system of claim 12, wherein the source storage pools are selected based on space used or space available thereon.

16. The system of claim 12, wherein performing the rebalance operation includes:

selecting a closest fit volume on a source storage pool based on an amount of storage determined to be moved; and selecting a target storage pool to move the closest fit volume to, wherein selecting the target storage pool includes:

determining (i) that the closest fit volume can be moved while satisfying a provisioning rule, and (ii) that moving the closest fit volume to the target storage pool would satisfy the trigger threshold, and based on the determining, moving the closest fit volume to the target storage pool.

17. The system of claim 12, wherein performing the rebalance operation includes:

moving a volume from a source storage pool to a target storage pool based on evaluating a volume provisioning rule and the trigger threshold.

18. The system of claim 12, wherein during the rebalance operation, if a storage pool has a volume moved from or into the storage pool, then the storage pool is subsequently marked as used, which causes the storage pool to not be reused for the rebalance operation.

19. The system of claim 12, wherein the metrics comprised used-size metrics or provisioned-size metrics.

20. A non-transitory computer readable medium having instructions stored thereon for performing a method, the method comprising:

accessing a set of rules for rebalancing data storage space in a storage node cluster, the storage node cluster including a plurality of storage nodes that each include a plurality of storage pools, wherein the storage node cluster manages the storage pools to provide volumes that the storage node cluster exposes for mounting by clients, and wherein the storage node cluster implements the set of rules, the set of rules including a trigger threshold;

determining that the volumes need to be rebalanced by evaluating the trigger threshold against metrics of the respective storage pools; and based on the determining that the volumes need to be rebalanced, performing a rebalance operation across the storage node cluster, the rebalance operation comprising selecting source storage pools from among the storage pools, the selecting of the source storage pools comprising determining a first metric of a first storage pool included in a group of candidate storage pools, determining that the first metric is greater than a cluster mean metric for the storage node cluster, and marking, based on the determining that the first metric is greater than the cluster mean metric, the first storage pool as a source storage pool included in the source storage pools selecting target storage pools from among the storage pools, the selecting of the target storage pools comprising determining a second metric of a second storage pool included in a group of candidate storage pools, determining that the second metric is less than the cluster mean metric for the storage node cluster, and marking, based on the determining that the second metric is less than the cluster mean metric, the second storage pool as a target storage pool included in the target storage pools, and moving entire volumes from the source storage pools to the target storage pools the moving comprising determining, based on the first metric, a volume allocation amount that needs to be moved from the first storage pool marked as the source storage pool to the second storage pool marked as the target storage pool, selecting, based on the volume allocation amount, a closest fit volume on the first storage pool, the closest fit volume most closely fitting the volume allocation amount, determining, based on a checking of a volume provisioning rule, that the closest fit volume can be moved from the first storage pool to the second storage pool, determining that moving the closest fit volume would keep the first and second storage pools within the trigger threshold, and moving, based on the determining that the closest fit volume can be moved from the first storage pool to the second storage pool and the determining that moving the closest fit volume would keep the first and second storage pools within the trigger threshold, the closest fit volume from the first storage pool to the second storage pool.

\* \* \* \* \*